(12) United States Patent
Ericksen et al.

(10) Patent No.: US 11,549,565 B2
(45) Date of Patent: *Jan. 10, 2023

(54) METHOD AND APPARATUS FOR AN ADJUSTABLE DAMPER

(71) Applicant: Fox Factory, Inc., Duluth, GA (US)

(72) Inventors: Everet Owen Ericksen, Santa Cruz, CA (US); George O'Neal, Scotts Valley, CA (US); Matt McLellan, Fremont, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/888,720

(22) Filed: May 30, 2020

(65) Prior Publication Data
US 2020/0292025 A1 Sep. 17, 2020

Related U.S. Application Data

(63) Continuation of application No. 16/046,497, filed on Jul. 26, 2018, now Pat. No. 10,670,106, which is a (Continued)

(51) Int. Cl.
*F16F 9/512* (2006.01)
*B60G 17/016* (2006.01)
*B60G 17/019* (2006.01)

(52) U.S. Cl.
CPC ........ *F16F 9/5126* (2013.01); *B60G 17/0161* (2013.01); *B60G 17/01908* (2013.01); *F16F 9/512* (2013.01)

(58) Field of Classification Search
CPC .......... B60G 17/0161; B60G 17/01908; B60G 17/018; B60G 17/019; F16F 9/512; F16F 9/5126; F16F 9/50; F16F 9/465
See application file for complete search history.

(56) References Cited

U.S. PATENT DOCUMENTS

| 435,995 A | 9/1890 | Dunlop |
| 1,078,060 A | 11/1913 | Newman |
| (Continued) | | |

FOREIGN PATENT DOCUMENTS

| DE | 1555311 A1 | 8/1970 |
| DE | 3241901 A1 | 5/1984 |
| (Continued) | | |

OTHER PUBLICATIONS

European Search Report for European Application No. 19193903.2, 6 pages, dated Oct. 19, 2021 (dated Oct. 19, 2021).

(Continued)

*Primary Examiner* — Robert A. Siconolfi
*Assistant Examiner* — Mahbubur Rashid

(57) ABSTRACT

A method for controlling vehicle motion is described. The method includes: comparing a measured acceleration value associated with a movement of a vehicle component of a vehicle with a predetermined acceleration threshold value that corresponds to the vehicle component, wherein the vehicle component is coupled with a frame of the vehicle via at least one vehicle suspension damper; monitoring a state of at least one valve within at least one vehicle suspension damper of the vehicle, wherein the state controls a damping force within the at least one vehicle suspension damper; and based on the comparing and the monitoring, regulating damping forces within the at least one vehicle suspension damper by actuating the at least one valve to adjust to a desired state, such that an acceleration of the frame is reduced.

13 Claims, 22 Drawing Sheets

Related U.S. Application Data continuation of application No. 14/251,446, filed on Apr. 11, 2014, now Pat. No. 10,047,817, which is a continuation-in-part of application No. 13/934,067, filed on Jul. 2, 2013, now Pat. No. 10,060,499, which is a continuation-in-part of application No. 13/843,704, filed on Mar. 15, 2013, now Pat. No. 9,033,122, said application No. 14/251,446 is a continuation-in-part of application No. 13/485,401, filed on May 31, 2012, now abandoned, and a continuation-in-part of application No. 12/684,072, filed on Jan. 7, 2010, now abandoned, and a continuation-in-part of application No. 13/189,216, filed on Jul. 22, 2011, now Pat. No. 9,239,090, which is a continuation-in-part of application No. 13/010,697, filed on Jan. 20, 2011, now Pat. No. 8,857,580, and a continuation-in-part of application No. 13/175,244, filed on Jul. 1, 2011, now Pat. No. 8,627,932.

(60) Provisional application No. 61/709,041, filed on Oct. 2, 2012, provisional application No. 61/667,327, filed on Jul. 2, 2012, provisional application No. 61/491,858, filed on May 31, 2011, provisional application No. 61/645,465, filed on May 10, 2012, provisional application No. 61/143,152, filed on Jan. 7, 2009, provisional application No. 61/296,826, filed on Jan. 20, 2010, provisional application No. 61/361,127, filed on Jul. 2, 2010.

(56) References Cited

U.S. PATENT DOCUMENTS

| | | | |
|---|---|---|---|
| 1,307,502 | A | 6/1919 | Martin |
| 1,313,763 | A | 8/1919 | Thomas |
| 1,409,849 | A | 3/1922 | Haeberlein |
| 1,468,652 | A | 9/1923 | Storey et al. |
| 1,492,731 | A | 5/1924 | Kerr |
| 1,560,477 | A | 11/1925 | Kessler |
| 1,571,788 | A | 2/1926 | Bramlette, Jr. |
| 1,575,973 | A | 3/1926 | Coleman |
| 1,655,786 | A | 1/1928 | Guerritore et al. |
| 1,923,011 | A | 8/1933 | Moulton |
| 1,948,600 | A | 2/1934 | Templeton |
| 1,970,239 | A | 8/1934 | Klaas |
| 2,018,312 | A | 10/1935 | Moulton |
| 2,098,119 | A * | 11/1937 | White ............ F17C 13/04 137/115.01 |
| 2,115,072 | A | 4/1938 | Hunt et al. |
| 2,122,407 | A | 7/1938 | Chisholm |
| 2,186,266 | A | 1/1940 | Henry |
| 2,259,437 | A | 10/1941 | Dean |
| 2,354,340 | A | 7/1944 | Utter |
| 2,363,867 | A | 11/1944 | Isely |
| 2,492,331 | A | 12/1949 | Spring |
| 2,518,553 | A | 8/1950 | Kieber |
| 2,540,525 | A | 2/1951 | Howarth et al. |
| 2,559,633 | A | 7/1951 | Maurice et al. |
| 2,588,520 | A | 3/1952 | Halgren et al. |
| 2,697,600 | A | 12/1954 | Gregoire |
| 2,705,119 | A | 3/1955 | Ingwer |
| 2,725,076 | A | 11/1955 | Hansen et al. |
| 2,729,308 | A | 1/1956 | Koski et al. |
| 2,778,378 | A | 1/1957 | Presnell |
| 2,784,962 | A | 3/1957 | Sherburne |
| 2,809,722 | A | 10/1957 | Smith |
| 2,838,140 | A | 6/1958 | Rasmusson et al. |
| 2,846,028 | A | 8/1958 | Gunther |
| 2,853,974 | A | 9/1958 | Hewitt |
| 2,879,971 | A | 3/1959 | Demay |
| 2,883,181 | A | 4/1959 | Hogan et al. |
| 2,897,613 | A | 8/1959 | Davidson et al. |
| 2,924,304 | A | 2/1960 | Patriquin |
| 2,941,629 | A | 6/1960 | Etienne et al. |
| 2,967,065 | A | 1/1961 | Schwendner |
| 2,973,744 | A | 3/1961 | Hennells |
| 2,991,804 | A | 7/1961 | Merkle |
| 3,003,595 | A | 10/1961 | Patriquin et al. |
| 3,056,598 | A | 10/1962 | Sutton et al. |
| 3,071,394 | A | 1/1963 | John |
| 3,073,586 | A | 1/1963 | Hartel et al. |
| 3,074,709 | A | 1/1963 | Ellis et al. |
| 3,085,530 | A | 4/1963 | Williamson |
| 3,087,583 | A | 4/1963 | Bruns |
| 3,107,753 | A | 10/1963 | Georgette et al. |
| 3,127,958 | A | 4/1964 | Szostak |
| 3,175,645 | A | 3/1965 | Schafer et al. |
| 3,202,413 | A | 8/1965 | Colmerauer |
| 3,206,153 | A | 9/1965 | Burke |
| 3,207,270 | A | 9/1965 | Ellis |
| 3,216,535 | A | 11/1965 | Schultze |
| 3,238,850 | A | 3/1966 | Desmarchelier |
| 3,284,076 | A | 11/1966 | Gibson |
| 3,286,797 | A | 11/1966 | Leibfritz et al. |
| 3,405,625 | A | 10/1968 | Carlson et al. |
| 3,419,849 | A | 12/1968 | Anderson et al. |
| 3,420,493 | A | 1/1969 | Kraft et al. |
| 3,447,644 | A | 6/1969 | Duckett |
| 3,494,606 | A | 2/1970 | Hanchen |
| 3,528,700 | A | 9/1970 | Janu et al. |
| 3,537,722 | A | 11/1970 | Moulton |
| 3,556,137 | A | 1/1971 | Billeter et al. |
| 3,559,027 | A | 1/1971 | Arsem |
| 3,560,033 | A | 2/1971 | Barkus |
| 3,575,442 | A | 4/1971 | Elliott et al. |
| 3,584,331 | A | 6/1971 | Richard et al. |
| 3,603,575 | A | 9/1971 | Arlasky et al. |
| 3,605,960 | A | 9/1971 | Singer |
| 3,618,972 | A | 11/1971 | Buhl |
| 3,621,950 | A | 11/1971 | Lutz |
| 3,650,033 | A | 3/1972 | Behne et al. |
| 3,701,544 | A | 10/1972 | Stankovich |
| 3,714,953 | A | 2/1973 | Solvang |
| 3,750,856 | A | 8/1973 | Kenworthy et al. |
| 3,784,228 | A | 1/1974 | Hoffmann et al. |
| 3,791,408 | A | 2/1974 | Saitou et al. |
| 3,792,644 | A | 2/1974 | Ferguson et al. |
| 3,795,291 | A | 3/1974 | Naito et al. |
| 3,830,482 | A | 8/1974 | Norris |
| 3,842,753 | A | 10/1974 | Ross et al. |
| 3,861,487 | A | 1/1975 | Gill |
| 3,903,613 | A | 9/1975 | Bisberg |
| 3,941,402 | A | 3/1976 | Yankowski et al. |
| 3,981,204 | A | 9/1976 | Starbard et al. |
| 3,981,479 | A | 9/1976 | Foster et al. |
| 3,986,118 | A | 10/1976 | Madigan |
| 3,995,883 | A * | 12/1976 | Glaze ............ B60G 17/018 280/5.507 |
| 4,022,113 | A | 5/1977 | Blatt et al. |
| 4,032,829 | A | 6/1977 | Schenavar et al. |
| 4,036,335 | A | 7/1977 | Thompson et al. |
| 4,045,008 | A | 8/1977 | Bauer |
| 4,072,087 | A | 2/1978 | Mueller et al. |
| 4,103,881 | A | 8/1978 | Simich |
| 4,106,522 | A | 8/1978 | Manesse |
| 4,114,735 | A | 9/1978 | Kato |
| 4,121,610 | A | 10/1978 | Harms et al. |
| 4,131,657 | A | 12/1978 | Ball et al. |
| 4,139,186 | A | 2/1979 | Postema et al. |
| 4,153,237 | A | 5/1979 | Supalla |
| 4,159,106 | A | 6/1979 | Nyman et al. |
| 4,166,612 | A | 9/1979 | Freitag et al. |
| 4,174,098 | A | 11/1979 | Baker et al. |
| 4,183,509 | A | 1/1980 | Nishikawa et al. |
| 4,236,613 | A | 12/1980 | Van Der Lely |
| 4,287,812 | A | 9/1981 | Iizumi |
| 4,291,850 | A | 9/1981 | Sharples |
| 4,305,566 | A | 12/1981 | Grawunde |
| 4,311,302 | A | 1/1982 | Heyer et al. |
| 4,333,668 | A | 6/1982 | Hendrickson et al. |
| 4,334,711 | A | 6/1982 | Mazur et al. |
| 4,337,850 | A | 7/1982 | Shimokura et al. |

(56) References Cited

U.S. PATENT DOCUMENTS

| | | | |
|---|---|---|---|
| 4,348,016 A | 9/1982 | Milly | |
| 4,351,515 A | 9/1982 | Yoshida | |
| 4,366,969 A | 1/1983 | Benya et al. | |
| 4,387,781 A | 6/1983 | Ezell et al. | |
| 4,437,548 A | 3/1984 | Ashiba et al. | |
| 4,465,299 A | 8/1984 | Stone et al. | |
| 4,474,363 A | 10/1984 | Numazawa et al. | |
| 4,491,207 A | 1/1985 | Boonchanta et al. | |
| 4,500,827 A | 2/1985 | Merritt et al. | |
| 4,502,673 A | 3/1985 | Clark et al. | |
| 4,529,180 A | 7/1985 | Hill | |
| 4,546,959 A | 10/1985 | Tanno | |
| 4,548,233 A | 10/1985 | Wolfges | |
| 4,550,899 A | 11/1985 | Holley | |
| 4,570,851 A | 2/1986 | Cirillo et al. | |
| 4,572,317 A | 2/1986 | Isono et al. | |
| 4,616,810 A | 10/1986 | Richardson et al. | |
| 4,620,619 A | 11/1986 | Emura et al. | |
| 4,624,346 A | 11/1986 | Katz et al. | |
| 4,630,818 A | 12/1986 | Saarinen | |
| 4,634,142 A | 1/1987 | Woods et al. | |
| 4,647,068 A | 3/1987 | Asami et al. | |
| 4,655,440 A | 4/1987 | Eckert | |
| 4,657,280 A | 4/1987 | Ohmori et al. | |
| 4,659,104 A | 4/1987 | Tanaka et al. | |
| 4,660,689 A | 4/1987 | Hayashi et al. | |
| 4,662,616 A | 5/1987 | Hennells | |
| 4,673,194 A | 6/1987 | Sugasawa | |
| 4,696,489 A * | 9/1987 | Fujishiro | B60G 17/018 280/5.507 |
| 4,709,779 A | 12/1987 | Takehara | |
| 4,723,753 A | 2/1988 | Torimoto et al. | |
| 4,729,459 A | 3/1988 | Inagaki et al. | |
| 4,732,244 A | 3/1988 | Verkuylen | |
| 4,743,000 A | 5/1988 | Karnopp | |
| 4,744,444 A | 5/1988 | Gillingham | |
| 4,750,735 A | 6/1988 | Furgerson et al. | |
| 4,765,648 A | 8/1988 | Mander et al. | |
| 4,773,671 A | 9/1988 | Inagaki | |
| 4,786,034 A | 11/1988 | Heess et al. | |
| 4,802,561 A | 2/1989 | Knecht et al. | |
| 4,806,082 A | 2/1989 | Schenk | |
| 4,815,575 A | 3/1989 | Murty et al. | |
| 4,821,852 A | 4/1989 | Yokoya | |
| 4,826,207 A | 5/1989 | Yoshioka et al. | |
| 4,830,395 A | 5/1989 | Foley | |
| 4,836,578 A | 6/1989 | Soltis | |
| 4,838,306 A | 6/1989 | Horn et al. | |
| 4,838,394 A | 6/1989 | Lemme et al. | |
| 4,838,527 A | 6/1989 | Holley | |
| 4,846,317 A | 7/1989 | Hudgens | |
| 4,858,733 A | 8/1989 | Noguchi et al. | |
| 4,919,166 A | 4/1990 | Sims et al. | |
| 4,936,423 A | 6/1990 | Karnopp | |
| 4,936,424 A | 6/1990 | Costa | |
| 4,938,228 A | 7/1990 | Righter | |
| 4,949,262 A | 8/1990 | Buma et al. | |
| 4,949,989 A | 8/1990 | Kakizaki et al. | |
| 4,958,706 A | 9/1990 | Richardson et al. | |
| 4,972,928 A | 11/1990 | Sirven | |
| 4,975,849 A * | 12/1990 | Ema | B60G 17/016 280/5.506 |
| 4,984,819 A | 1/1991 | Kakizaki et al. | |
| 4,986,393 A | 1/1991 | Preukschat et al. | |
| 5,027,303 A | 6/1991 | Witte | |
| 5,031,455 A | 7/1991 | Cline | |
| 5,036,934 A | 8/1991 | Nishina et al. | |
| 5,040,381 A | 8/1991 | Hazen | |
| 5,044,614 A | 9/1991 | Rau | |
| 5,060,910 A | 10/1991 | Iwata et al. | |
| 5,060,959 A | 10/1991 | Davis et al. | |
| 5,072,812 A | 12/1991 | Imaizumi | |
| 5,074,624 A | 12/1991 | Stauble et al. | |
| 5,076,404 A | 12/1991 | Gustafsson | |
| 5,080,392 A | 1/1992 | Bazergui | |
| 5,094,325 A | 3/1992 | Smith | |
| 5,105,918 A | 4/1992 | Hagiwara et al. | |
| 5,113,980 A | 5/1992 | Furrer et al. | |
| 5,127,634 A | 7/1992 | Le Gourvellec | |
| 5,152,547 A | 10/1992 | Davis | |
| 5,161,653 A | 11/1992 | Hare | |
| 5,161,817 A | 11/1992 | Daum et al. | |
| 5,163,742 A | 11/1992 | Topfer et al. | |
| 5,178,242 A | 1/1993 | Nakamura et al. | |
| 5,186,481 A | 2/1993 | Turner | |
| 5,203,584 A | 4/1993 | Butsuen et al. | |
| 5,207,774 A | 5/1993 | Wolfe et al. | |
| 5,230,364 A | 7/1993 | Leng et al. | |
| 5,231,583 A * | 7/1993 | Lizell | B60G 17/015 280/5.506 |
| 5,236,169 A | 8/1993 | Johnsen et al. | |
| 5,246,247 A * | 9/1993 | Runkel | B60G 11/26 280/124.159 |
| 5,248,014 A | 9/1993 | Ashiba | |
| 5,259,487 A | 11/1993 | Petek et al. | |
| 5,263,559 A | 11/1993 | Mettner | |
| 5,265,902 A | 11/1993 | Lewis | |
| 5,275,086 A | 1/1994 | Stallings, Jr. | |
| 5,277,283 A | 1/1994 | Yamaoka et al. | |
| 5,283,733 A | 2/1994 | Colley | |
| 5,284,330 A | 2/1994 | Carlson et al. | |
| 5,293,971 A | 3/1994 | Kanari | |
| 5,295,074 A * | 3/1994 | Williams | B60G 17/015 280/5.507 |
| 5,295,563 A | 3/1994 | Bennett | |
| 5,297,045 A * | 3/1994 | Williams | B60G 17/018 280/5.507 |
| 5,301,776 A | 4/1994 | Beck | |
| 5,307,907 A | 5/1994 | Nakamura et al. | |
| 5,310,203 A | 5/1994 | Chen | |
| 5,311,709 A | 5/1994 | Kobori et al. | |
| 5,318,066 A | 6/1994 | Burgorf et al. | |
| 5,328,004 A | 7/1994 | Fannin et al. | |
| 5,346,242 A * | 9/1994 | Karnopp | B60G 17/018 280/5.514 |
| 5,347,186 A | 9/1994 | Konotchick et al. | |
| 5,348,112 A | 9/1994 | Vaillancourt | |
| 5,372,223 A | 12/1994 | DeKock et al. | |
| 5,372,224 A | 12/1994 | Samonil et al. | |
| 5,381,952 A | 1/1995 | Duprez | |
| 5,390,949 A | 2/1995 | Naganathan et al. | |
| 5,392,885 A | 2/1995 | Patzenhauer et al. | |
| 5,392,886 A | 2/1995 | Drummond | |
| 5,396,973 A | 3/1995 | Schwemmer et al. | |
| 5,398,787 A | 3/1995 | Woessner et al. | |
| 5,413,196 A | 5/1995 | Forster | |
| 5,445,366 A | 8/1995 | Shih et al. | |
| 5,467,280 A | 11/1995 | Kimura | |
| 5,480,011 A | 1/1996 | Nagai et al. | |
| 5,485,417 A | 1/1996 | Wolf et al. | |
| 5,487,006 A | 1/1996 | Kakizaki et al. | |
| 5,503,258 A | 4/1996 | Clarke et al. | |
| 5,517,898 A | 5/1996 | Kim et al. | |
| 5,542,150 A | 8/1996 | Tu | |
| 5,551,674 A | 9/1996 | Johnsen | |
| 5,553,836 A | 9/1996 | Ericson | |
| 5,558,190 A | 9/1996 | Chang | |
| 5,566,794 A | 10/1996 | Wiard | |
| 5,578,877 A | 11/1996 | Tiemann | |
| 5,586,637 A | 12/1996 | Aidlin et al. | |
| 5,588,510 A | 12/1996 | Wilke | |
| 5,592,401 A | 1/1997 | Kramer | |
| 5,597,180 A | 1/1997 | Ganzel et al. | |
| 5,598,337 A | 1/1997 | Butsuen et al. | |
| 5,601,164 A | 2/1997 | Ohsaki et al. | |
| 5,611,413 A | 3/1997 | Feigel | |
| 5,634,563 A | 6/1997 | Peng | |
| 5,651,433 A | 7/1997 | Wirth et al. | |
| 5,657,840 A | 8/1997 | Lizell | |
| 5,687,575 A | 11/1997 | Keville et al. | |
| 5,697,477 A | 12/1997 | Hiramoto et al. | |
| 5,699,885 A | 12/1997 | Forster | |
| 5,722,645 A | 3/1998 | Reitter | |
| 5,735,372 A | 4/1998 | Hamilton et al. | |

(56) References Cited

U.S. PATENT DOCUMENTS

| | | | |
|---|---|---|---|
| 5,803,443 A | 9/1998 | Chang | |
| 5,806,159 A | 9/1998 | Ohnishi et al. | |
| 5,810,128 A | 9/1998 | Eriksson et al. | |
| 5,810,384 A * | 9/1998 | Iwasaki | B60G 17/0165 280/5.515 |
| 5,813,456 A | 9/1998 | Milner et al. | |
| 5,813,731 A | 9/1998 | Newman et al. | |
| 5,816,281 A | 10/1998 | Mixon | |
| 5,818,132 A | 10/1998 | Konotchick et al. | |
| 5,826,935 A | 10/1998 | DeFreitas et al. | |
| 5,828,843 A | 10/1998 | Samuel et al. | |
| 5,829,733 A | 11/1998 | Becker | |
| 5,833,036 A | 11/1998 | Gillespie | |
| 5,850,352 A | 12/1998 | Moezzi et al. | |
| 5,850,896 A | 12/1998 | Tanaka | |
| 5,853,071 A | 12/1998 | Robinson | |
| 5,872,418 A | 2/1999 | Wischnewskiy | |
| 5,884,921 A | 3/1999 | Katsuda et al. | |
| 5,937,975 A | 8/1999 | Forster | |
| 5,947,238 A | 9/1999 | Jolly et al. | |
| 5,952,823 A | 9/1999 | Sprecher et al. | |
| 5,954,318 A | 9/1999 | Kluhsman | |
| 5,956,951 A | 9/1999 | O'Callaghan | |
| 5,957,252 A | 9/1999 | Berthold | |
| 5,971,116 A | 10/1999 | Franklin | |
| 5,987,368 A * | 11/1999 | Kamimae | B60G 17/015 280/5.515 |
| 5,988,330 A | 11/1999 | Morris | |
| 5,988,655 A | 11/1999 | Sakai et al. | |
| 5,992,450 A | 11/1999 | Parker et al. | |
| 5,996,745 A | 12/1999 | Jones et al. | |
| 5,996,746 A | 12/1999 | Turner et al. | |
| 5,999,868 A | 12/1999 | Beno et al. | |
| 6,000,702 A | 12/1999 | Streiter | |
| 6,013,007 A | 1/2000 | Root et al. | |
| 6,017,047 A | 1/2000 | Hoose | |
| 6,029,958 A | 2/2000 | Larsson et al. | |
| 6,035,979 A | 3/2000 | Forster | |
| 6,050,583 A | 4/2000 | Bohn | |
| 6,058,340 A | 5/2000 | Uchiyama et al. | |
| 6,067,490 A | 5/2000 | Ichimaru et al. | |
| 6,073,536 A | 6/2000 | Campbell | |
| 6,073,700 A | 6/2000 | Tsuji et al. | |
| 6,073,736 A | 6/2000 | Franklin | |
| 6,092,011 A * | 7/2000 | Hiramoto | F16F 9/466 701/37 |
| 6,092,816 A | 7/2000 | Sekine et al. | |
| 6,105,988 A | 8/2000 | Turner et al. | |
| 6,112,868 A | 9/2000 | Graham et al. | |
| 6,120,049 A | 9/2000 | Gonzalez et al. | |
| 6,131,709 A | 10/2000 | Jolly et al. | |
| 6,135,434 A | 10/2000 | Marking | |
| 6,141,969 A | 11/2000 | Launchbury et al. | |
| 6,151,930 A | 11/2000 | Carlson | |
| 6,152,856 A | 11/2000 | Studor et al. | |
| 6,157,103 A | 12/2000 | Ohta et al. | |
| 6,179,098 B1 | 1/2001 | Hayakawa et al. | |
| 6,196,555 B1 | 3/2001 | Gaibler | |
| 6,199,669 B1 | 3/2001 | Huang et al. | |
| 6,203,026 B1 | 3/2001 | Jones | |
| 6,213,263 B1 | 4/2001 | De Frenne | |
| 6,215,217 B1 | 4/2001 | Kurosawa et al. | |
| 6,217,049 B1 | 4/2001 | Becker | |
| 6,219,045 B1 | 4/2001 | Leahy et al. | |
| 6,244,398 B1 | 6/2001 | Girvin et al. | |
| 6,254,067 B1 | 7/2001 | Yih | |
| 6,279,702 B1 | 8/2001 | Koh | |
| 6,290,034 B1 * | 9/2001 | Ichimaru | B60G 17/015 188/299.1 |
| 6,293,530 B1 | 9/2001 | Delorenzis et al. | |
| 6,296,092 B1 | 10/2001 | Marking et al. | |
| 6,311,962 B1 | 11/2001 | Marking | |
| 6,318,525 B1 | 11/2001 | Vignocchi et al. | |
| 6,321,888 B1 | 11/2001 | Reybrouck et al. | |
| 6,322,468 B1 | 11/2001 | Wing et al. | |
| 6,336,648 B1 | 1/2002 | Bohn | |
| 6,343,807 B1 | 2/2002 | Rathbun | |
| 6,359,837 B1 | 3/2002 | Tsukamoto et al. | |
| 6,360,857 B1 | 3/2002 | Fox et al. | |
| 6,371,262 B1 | 4/2002 | Katou et al. | |
| 6,371,267 B1 | 4/2002 | Kao et al. | |
| 6,378,816 B1 | 4/2002 | Pfister | |
| 6,378,885 B1 | 4/2002 | Ellsworth et al. | |
| 6,382,370 B1 | 5/2002 | Girvin | |
| 6,389,341 B1 | 5/2002 | Davis | |
| 6,390,747 B1 | 5/2002 | Commins | |
| 6,394,238 B1 | 5/2002 | Rogala | |
| 6,401,883 B1 | 6/2002 | Nyce et al. | |
| 6,412,788 B1 | 7/2002 | Ichimaru | |
| 6,415,895 B2 | 7/2002 | Marking et al. | |
| 6,418,360 B1 | 7/2002 | Spivey et al. | |
| 6,427,812 B2 | 8/2002 | Crawley et al. | |
| 6,434,460 B1 | 8/2002 | Uchino et al. | |
| 6,446,771 B1 | 9/2002 | Sintorn et al. | |
| 6,458,060 B1 | 10/2002 | Watterson et al. | |
| 6,460,567 B1 | 10/2002 | Hansen et al. | |
| 6,467,593 B1 | 10/2002 | Corradini et al. | |
| 6,474,454 B2 | 11/2002 | Matsumoto et al. | |
| 6,474,753 B1 | 11/2002 | Rieth et al. | |
| 6,501,554 B1 | 12/2002 | Hackney et al. | |
| 6,502,837 B1 | 1/2003 | Hamilton et al. | |
| 6,510,929 B1 | 1/2003 | Gordan et al. | |
| 6,520,297 B1 | 2/2003 | Lumpkin et al. | |
| 6,527,093 B2 | 3/2003 | Oliver et al. | |
| 6,592,136 B2 | 7/2003 | Becker et al. | |
| 6,604,751 B2 | 8/2003 | Fox | |
| 6,609,686 B2 | 8/2003 | Malizia | |
| 6,619,615 B1 | 9/2003 | Mayr et al. | |
| 6,623,389 B1 | 9/2003 | Campagnolo | |
| 6,648,109 B2 | 11/2003 | Farr et al. | |
| 6,651,788 B1 | 11/2003 | Wohlfarth | |
| 6,659,240 B2 | 12/2003 | Dernebo | |
| 6,659,241 B2 | 12/2003 | Sendrea | |
| 6,672,687 B2 | 1/2004 | Nishio | |
| 6,701,234 B1 | 3/2004 | Vogelsang et al. | |
| 6,722,678 B2 | 4/2004 | McAndrews | |
| 6,732,033 B2 | 5/2004 | Laplante et al. | |
| 6,755,113 B2 | 6/2004 | Shih | |
| 6,782,980 B2 | 8/2004 | Nakadate | |
| 6,817,454 B2 | 11/2004 | Nezu et al. | |
| 6,837,827 B1 | 1/2005 | Lee et al. | |
| 6,840,257 B2 | 1/2005 | Dario et al. | |
| 6,853,955 B1 | 2/2005 | Burrell et al. | |
| 6,857,625 B2 | 2/2005 | Löser et al. | |
| 6,863,291 B2 * | 3/2005 | Miyoshi | B62K 25/04 280/275 |
| 6,883,650 B2 | 4/2005 | Van Wonderen et al. | |
| 6,902,513 B1 | 6/2005 | McClure et al. | |
| 6,905,203 B2 | 6/2005 | Kremers et al. | |
| 6,920,951 B2 | 7/2005 | Song et al. | |
| 6,921,351 B1 | 7/2005 | Hickman et al. | |
| 6,923,853 B2 | 8/2005 | Kremers et al. | |
| 6,935,157 B2 | 8/2005 | Miller | |
| 6,952,060 B2 | 10/2005 | Goldner et al. | |
| 6,959,906 B2 | 11/2005 | Hoenig et al. | |
| 6,959,921 B2 | 11/2005 | Rose | |
| 6,966,412 B2 | 11/2005 | Braswell et al. | |
| 6,978,871 B2 | 12/2005 | Holiviers | |
| 6,978,872 B2 | 12/2005 | Turner | |
| 6,991,076 B2 | 1/2006 | McAndrews | |
| 7,025,367 B2 | 4/2006 | McKinnon et al. | |
| 7,076,351 B2 | 7/2006 | Hamilton et al. | |
| 7,128,192 B2 | 10/2006 | Fox | |
| 7,128,693 B2 | 10/2006 | Brown et al. | |
| 7,135,794 B2 | 11/2006 | Kühnel | |
| 7,147,207 B2 | 12/2006 | Jordan et al. | |
| 7,163,222 B2 | 1/2007 | Becker et al. | |
| 7,166,062 B1 | 1/2007 | Watterson et al. | |
| 7,166,064 B2 | 1/2007 | Ashby et al. | |
| 7,204,466 B2 | 4/2007 | Hsieh | |
| 7,208,845 B2 | 4/2007 | Schaefer et al. | |
| 7,217,224 B2 | 5/2007 | Thomas | |
| 7,234,574 B2 | 6/2007 | Matsunaga et al. | |
| 7,234,575 B2 | 6/2007 | Anderfaas et al. | |

(56) References Cited

U.S. PATENT DOCUMENTS

| | | | |
|---|---|---|---|
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,270,222 B1 | 9/2007 | Aymar et al. |
| 7,287,760 B1 | 10/2007 | Quick et al. |
| 7,289,138 B2 | 10/2007 | Foote et al. |
| 7,292,867 B2 | 11/2007 | Werner et al. |
| 7,293,764 B2 | 11/2007 | Fang |
| 7,299,112 B2 | 11/2007 | LaPlante et al. |
| 7,302,961 B2 | 12/2007 | Martin et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,374,028 B2 | 5/2008 | Fox |
| 7,397,355 B2 | 7/2008 | Tracy |
| 7,413,062 B2 | 8/2008 | Vandewal |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Münster et al. |
| 7,484,603 B2 | 2/2009 | Fox |
| 7,490,705 B2 | 2/2009 | Fox |
| 7,513,490 B2 | 4/2009 | Robertson |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,628,414 B2 * | 12/2009 | Dobson | B60G 17/0162 280/124.152 |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,828,125 B2 * | 11/2010 | Sekiya | B60G 17/08 188/267 |
| 7,828,126 B2 * | 11/2010 | Lun | F16F 9/537 188/267.2 |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |
| 8,141,438 B2 | 3/2012 | Roessingh et al. |
| 8,151,952 B2 | 4/2012 | Lenz et al. |
| 8,191,964 B2 | 6/2012 | Hsu et al. |
| 8,201,476 B2 | 6/2012 | Tsumiyama |
| 8,210,106 B2 | 7/2012 | Tai et al. |
| 8,210,330 B2 | 7/2012 | Vandewal |
| 8,246,065 B1 | 8/2012 | Kodama et al. |
| 8,256,587 B2 | 9/2012 | Bakke et al. |
| 8,256,732 B1 | 9/2012 | Young et al. |
| 8,262,058 B2 | 9/2012 | Kot |
| 8,262,062 B2 | 9/2012 | Kamo et al. |
| 8,262,100 B2 | 9/2012 | Thomas |
| 8,265,825 B2 * | 9/2012 | Kajino | B60G 17/025 701/37 |
| 8,285,447 B2 | 10/2012 | Bennett et al. |
| 8,286,982 B2 | 10/2012 | Plantet et al. |
| 8,291,889 B2 | 10/2012 | Shafer et al. |
| 8,292,274 B2 | 10/2012 | Adoline et al. |
| 8,307,965 B2 | 11/2012 | Föster et al. |
| 8,308,124 B2 | 11/2012 | Hsu |
| 8,317,261 B2 | 11/2012 | Walsh et al. |
| 8,328,454 B2 | 12/2012 | McAndrews et al. |
| 8,336,683 B2 | 12/2012 | McAndrews et al. |
| 8,364,389 B2 | 1/2013 | Dorogusker et al. |
| 8,393,446 B2 | 3/2013 | Haugen |
| 8,413,773 B2 | 4/2013 | Anderfaas et al. |
| 8,423,244 B2 | 4/2013 | Proemm et al. |
| 8,430,770 B2 | 4/2013 | Dugan et al. |
| 8,458,080 B2 | 6/2013 | Shirai |
| 8,480,064 B2 | 7/2013 | Talavasek |
| 8,495,947 B2 | 7/2013 | Hata |
| 8,550,223 B2 | 10/2013 | Cox et al. |
| 8,550,551 B2 | 10/2013 | Shirai |
| 8,556,048 B2 | 10/2013 | Maeda et al. |
| 8,556,049 B2 | 10/2013 | Jee |
| 8,596,663 B2 | 12/2013 | Shirai et al. |
| 8,616,351 B2 | 12/2013 | Roessle et al. |
| 8,622,180 B2 | 1/2014 | Wootten et al. |
| 8,627,932 B2 | 1/2014 | Marking |
| 8,641,073 B2 | 2/2014 | Lee et al. |
| 8,651,251 B2 | 2/2014 | Preukschat et al. |
| 8,655,548 B2 | 2/2014 | Ichida et al. |
| 8,684,367 B2 | 4/2014 | Haugen |
| 8,727,947 B2 | 5/2014 | Tagliabue |
| 8,744,699 B2 | 6/2014 | Yamaguchi et al. |
| 8,752,682 B2 | 6/2014 | Park et al. |
| 8,763,770 B2 | 7/2014 | Marking |
| 8,770,357 B2 | 7/2014 | Sims et al. |
| 8,781,680 B2 | 7/2014 | Ichida et al. |
| 8,781,690 B2 | 7/2014 | Hara et al. |
| 8,814,109 B2 | 8/2014 | Calendrille et al. |
| 8,833,786 B2 | 9/2014 | Camp et al. |
| 8,838,335 B2 | 9/2014 | Bass et al. |
| 8,845,496 B2 | 9/2014 | Arrasvuori et al. |
| 8,857,580 B2 | 10/2014 | Marking |
| 8,868,253 B2 | 10/2014 | Hashimoto et al. |
| 8,888,115 B2 | 11/2014 | Chubbuck et al. |
| 8,935,036 B1 | 1/2015 | Christensen et al. |
| 8,936,139 B2 | 1/2015 | Galasso et al. |
| 8,950,771 B2 | 2/2015 | Felsl et al. |
| 8,955,653 B2 | 2/2015 | Marking |
| 8,967,343 B2 | 3/2015 | Battlogg et al. |
| 8,985,594 B2 * | 3/2015 | Yabumoto | B60G 17/015 280/5.515 |
| 8,991,571 B2 | 3/2015 | Murakami |
| 9,033,122 B2 | 5/2015 | Ericksen et al. |
| 9,038,791 B2 | 5/2015 | Marking |
| 9,047,778 B1 | 6/2015 | Cazanas et al. |

(56) References Cited

U.S. PATENT DOCUMENTS

| | | |
|---|---|---|
| 9,057,416 B2 | 6/2015 | Talavasek |
| 9,073,592 B2 | 7/2015 | Hsu |
| 9,103,400 B2 | 8/2015 | Becker |
| 9,108,098 B2 | 8/2015 | Galasso et al. |
| 9,120,362 B2 | 9/2015 | Marking |
| 9,126,647 B2 | 9/2015 | Kuo |
| 9,140,325 B2 | 9/2015 | Cox et al. |
| 9,157,523 B2 | 10/2015 | Miki et al. |
| 9,186,949 B2 | 11/2015 | Galasso et al. |
| 9,194,456 B2 | 11/2015 | Laird et al. |
| 9,199,690 B2 | 12/2015 | Watarai |
| 9,229,712 B2 | 1/2016 | Takamoto et al. |
| 9,239,090 B2 | 1/2016 | Marking et al. |
| 9,278,598 B2 | 3/2016 | Galasso et al. |
| 9,303,712 B2 | 4/2016 | Cox |
| 9,353,818 B2 | 5/2016 | Marking |
| 9,366,307 B2 | 6/2016 | Marking |
| 9,415,659 B2 * | 8/2016 | Kikuchi .............. B60G 17/018 |
| 9,422,018 B2 | 8/2016 | Pelot et al. |
| 9,422,025 B2 | 8/2016 | Pezzi et al. |
| 9,452,654 B2 | 9/2016 | Ericksen et al. |
| 9,523,406 B2 | 12/2016 | Galasso et al. |
| 9,528,565 B2 | 12/2016 | Marking |
| 9,550,405 B2 | 1/2017 | Marking et al. |
| 9,556,925 B2 | 1/2017 | Marking |
| 9,616,728 B2 | 4/2017 | Marking |
| 9,650,094 B2 | 5/2017 | Laird et al. |
| 9,663,181 B2 | 5/2017 | Ericksen et al. |
| 9,682,604 B2 | 6/2017 | Cox et al. |
| 9,784,333 B2 | 10/2017 | Marking |
| 9,810,282 B2 | 11/2017 | Roessle et al. |
| 9,975,598 B2 | 5/2018 | Bender et al. |
| 10,029,172 B2 | 7/2018 | Galasso et al. |
| 10,036,443 B2 | 7/2018 | Galasso et al. |
| 10,040,328 B2 | 8/2018 | Marking |
| 10,040,329 B2 | 8/2018 | Ericksen et al. |
| 10,054,185 B2 | 8/2018 | Cox |
| 10,072,724 B2 | 9/2018 | Haugen et al. |
| 10,086,670 B2 | 10/2018 | Galasso et al. |
| 10,089,868 B1 | 10/2018 | Hayward |
| 10,094,443 B2 | 10/2018 | Marking |
| 10,145,435 B2 | 12/2018 | Galasso et al. |
| 10,180,171 B2 | 1/2019 | Laird et al. |
| 10,330,171 B2 | 6/2019 | Cox et al. |
| 10,336,148 B2 | 7/2019 | Ericksen et al. |
| 10,336,149 B2 | 7/2019 | Ericksen et al. |
| 10,400,847 B2 | 9/2019 | Marking |
| 10,406,883 B2 | 9/2019 | Marking |
| 10,415,662 B2 | 9/2019 | Marking |
| 10,443,671 B2 | 10/2019 | Marking |
| 10,473,179 B2 | 11/2019 | Ripa |
| 10,550,909 B2 | 2/2020 | Haugen |
| 10,677,309 B2 | 6/2020 | Ericksen et al. |
| 10,697,514 B2 | 6/2020 | Marking |
| 10,718,397 B2 | 7/2020 | Marking |
| 11,162,555 B2 | 11/2021 | Haugen |
| 2001/0017334 A1 | 8/2001 | Vincent |
| 2001/0022621 A1 | 9/2001 | Squibbs |
| 2001/0030408 A1 | 10/2001 | Miyoshi et al. |
| 2001/0042663 A1 | 11/2001 | Marking et al. |
| 2001/0055373 A1 | 12/2001 | Yamashita |
| 2002/0000352 A1 | 1/2002 | Matsumoto et al. |
| 2002/0032508 A1 | 3/2002 | Uchino et al. |
| 2002/0045987 A1 | 4/2002 | Ohata et al. |
| 2002/0050112 A1 | 5/2002 | Koch et al. |
| 2002/0050518 A1 | 5/2002 | Roustaei |
| 2002/0053493 A1 | 5/2002 | Sintorn et al. |
| 2002/0055422 A1 | 5/2002 | Airmet et al. |
| 2002/0063469 A1 | 5/2002 | Nishio |
| 2002/0089107 A1 | 7/2002 | Koh |
| 2002/0095979 A1 * | 7/2002 | Shirato ............. B60G 17/0195 73/117.02 |
| 2002/0113347 A1 | 8/2002 | Robbins et al. |
| 2002/0121416 A1 | 9/2002 | Katayama et al. |
| 2002/0130000 A1 | 9/2002 | Lisenker et al. |
| 2002/0130003 A1 | 9/2002 | Lisenker et al. |
| 2002/0185581 A1 | 12/2002 | Trask et al. |
| 2002/0187867 A1 | 12/2002 | Ichida et al. |
| 2003/0001346 A1 * | 1/2003 | Hamilton ................ F16F 9/466 280/5.515 |
| 2003/0001358 A1 | 1/2003 | Becker et al. |
| 2003/0034697 A1 | 2/2003 | Goldner et al. |
| 2003/0040348 A1 | 2/2003 | Martens et al. |
| 2003/0051954 A1 | 3/2003 | Sendrea |
| 2003/0054327 A1 | 3/2003 | Evensen et al. |
| 2003/0065430 A1 | 4/2003 | Lu et al. |
| 2003/0075403 A1 | 4/2003 | Dernebo |
| 2003/0103651 A1 | 6/2003 | Novak |
| 2003/0128275 A1 | 7/2003 | Maguire |
| 2003/0160369 A1 | 8/2003 | LaPlante et al. |
| 2003/0191567 A1 | 10/2003 | Gentilcore |
| 2003/0216845 A1 | 11/2003 | Williston |
| 2004/0004659 A1 | 1/2004 | Foote et al. |
| 2004/0017455 A1 | 1/2004 | Kremers et al. |
| 2004/0021754 A1 | 2/2004 | Kremers et al. |
| 2004/0075350 A1 | 4/2004 | Kuhnel |
| 2004/0091111 A1 | 5/2004 | Levy et al. |
| 2004/0099312 A1 | 5/2004 | Boyer et al. |
| 2004/0103146 A1 | 5/2004 | Park |
| 2004/0172178 A1 | 9/2004 | Fakeda et al. |
| 2004/0208687 A1 | 10/2004 | Sicz et al. |
| 2004/0220708 A1 | 11/2004 | Owen et al. |
| 2004/0220712 A1 | 11/2004 | Takeda et al. |
| 2004/0222056 A1 * | 11/2004 | Fox ..................... B62K 25/286 188/267 |
| 2004/0256778 A1 | 12/2004 | Verriet |
| 2005/0055156 A1 | 3/2005 | Maltagliati et al. |
| 2005/0056507 A1 | 3/2005 | De Molina et al. |
| 2005/0077131 A1 | 4/2005 | Russell |
| 2005/0098401 A1 | 5/2005 | Hamilton et al. |
| 2005/0104320 A1 | 5/2005 | Wesling et al. |
| 2005/0107216 A1 | 5/2005 | Lee et al. |
| 2005/0110229 A1 | 5/2005 | Kimura et al. |
| 2005/0121269 A1 | 6/2005 | Namuduri |
| 2005/0173849 A1 | 8/2005 | Vandewal |
| 2005/0195094 A1 | 9/2005 | White |
| 2005/0199455 A1 | 9/2005 | Browne et al. |
| 2005/0216186 A1 | 9/2005 | Dorfman et al. |
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 * | 3/2006 | Fox ..................... B62K 25/286 188/275 |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0231359 A1 | 10/2006 | Matsunaga et al. |
| 2006/0237272 A1 | 10/2006 | Huang |
| 2006/0253210 A1 | 11/2006 | Rosenberg |
| 2006/0254365 A1 | 11/2006 | Hamel |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |

(56) References Cited

U.S. PATENT DOCUMENTS

| | | |
|---|---|---|
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0239479 A1 | 10/2007 | Arrasvuori et al. |
| 2007/0272458 A1 | 11/2007 | Taniguchi et al. |
| 2008/0006494 A1* | 1/2008 | Vandewal .......... B60G 17/0152 188/313 |
| 2008/0009992 A1 | 1/2008 | Izawa et al. |
| 2008/0015089 A1 | 1/2008 | Hurwitz et al. |
| 2008/0018065 A1 | 1/2008 | Hirao et al. |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0000885 A1 | 1/2009 | McAndrews |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071772 A1* | 3/2009 | Cho .......... B60G 17/06 188/266.4 |
| 2009/0071773 A1 | 3/2009 | Lun |
| 2009/0098981 A1 | 4/2009 | Del et al. |
| 2009/0118100 A1 | 5/2009 | Oliver et al. |
| 2009/0121398 A1 | 5/2009 | Inoue |
| 2009/0131224 A1 | 5/2009 | Yuen |
| 2009/0138157 A1 | 5/2009 | Hagglund et al. |
| 2009/0140501 A1 | 6/2009 | Taylor et al. |
| 2009/0171532 A1 | 7/2009 | Ryan et al. |
| 2009/0192673 A1 | 7/2009 | Song et al. |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1 | 10/2009 | McIntyre |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0314592 A1 | 12/2009 | Nygren |
| 2009/0324327 A1 | 12/2009 | McAndrews et al. |
| 2010/0004097 A1 | 1/2010 | D'Eredita |
| 2010/0010709 A1 | 1/2010 | Song |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0276238 A1 | 11/2010 | Crasset |
| 2010/0276906 A1 | 11/2010 | Galasso et al. |
| 2010/0308628 A1 | 12/2010 | Hsu et al. |
| 2010/0314917 A1 | 12/2010 | Hsieh et al. |
| 2010/0324781 A1 | 12/2010 | Gagliano |
| 2010/0326780 A1 | 12/2010 | Murakami |
| 2010/0327542 A1 | 12/2010 | Hara et al. |
| 2011/0022266 A1 | 1/2011 | Ippolito et al. |
| 2011/0067965 A1 | 3/2011 | McAndrews |
| 2011/0086686 A1 | 4/2011 | Avent et al. |
| 2011/0095507 A1 | 4/2011 | Plantet et al. |
| 2011/0097139 A1 | 4/2011 | Hsu et al. |
| 2011/0109060 A1 | 5/2011 | Earle et al. |
| 2011/0127706 A1* | 6/2011 | Sims .......... B62K 25/04 267/221 |
| 2011/0174582 A1 | 7/2011 | Wootten et al. |
| 2011/0202236 A1 | 8/2011 | Galasso et al. |
| 2011/0204201 A1 | 8/2011 | Kodama et al. |
| 2011/0214956 A1 | 9/2011 | Marking |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0074660 A1* | 3/2012 | Thomas .......... F16F 9/063 280/5.514 |
| 2012/0080279 A1 | 4/2012 | Galasso et al. |
| 2012/0136537 A1 | 5/2012 | Galasso et al. |
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1 | 6/2013 | Galasso et al. |
| 2013/0168195 A1 | 7/2013 | Park et al. |
| 2013/0220110 A1* | 8/2013 | Zhan .......... B60G 17/0165 91/459 |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0090547 A1 | 4/2015 | Haugen |
| 2015/0141056 A1 | 5/2015 | Fefilatyev et al. |
| 2015/0175236 A1 | 6/2015 | Walthert et al. |
| 2015/0179062 A1 | 6/2015 | Ralston et al. |
| 2015/0191069 A1 | 7/2015 | Zuleger et al. |
| 2015/0197308 A1* | 7/2015 | Butora .......... B62K 25/20 280/283 |
| 2015/0233442 A1 | 8/2015 | Noguchi |
| 2015/0291248 A1 | 10/2015 | Fukao et al. |
| 2016/0025178 A1 | 1/2016 | Kamakura et al. |
| 2016/0031506 A1 | 2/2016 | Lloyd et al. |
| 2016/0076617 A1 | 3/2016 | Marking |
| 2016/0153515 A1 | 6/2016 | Ebersbach et al. |
| 2016/0153516 A1 | 6/2016 | Marking |
| 2016/0185178 A1 | 6/2016 | Galasso et al. |
| 2016/0200164 A1 | 7/2016 | Tabata et al. |
| 2016/0265615 A1 | 9/2016 | Marking |
| 2016/0290431 A1 | 10/2016 | Marking |
| 2016/0319899 A1 | 11/2016 | Franklin et al. |

(56) References Cited

U.S. PATENT DOCUMENTS

| | | | |
|---|---|---|---|
| 2016/0355226 A1 | 12/2016 | Pelot et al. |
| 2016/0364989 A1 | 12/2016 | Speasl et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0118302 A1 | 5/2018 | Fukao et al. |
| 2018/0150764 A1 | 5/2018 | Stenneth |
| 2018/0174446 A1 | 6/2018 | Wang |
| 2018/0222541 A1 | 8/2018 | Madau et al. |
| 2018/0304149 A1 | 10/2018 | Galasso et al. |
| 2018/0326805 A1 | 11/2018 | Marking |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355943 A1 | 12/2018 | Cox |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0154100 A1 | 5/2019 | Coaplen et al. |
| 2019/0176557 A1 | 6/2019 | Marking et al. |
| 2019/0184782 A1 | 6/2019 | Shaw et al. |
| 2019/0203798 A1 | 7/2019 | Cox et al. |
| 2019/0247744 A1 | 8/2019 | Galasso et al. |
| 2022/0252129 A1 | 8/2022 | Haugen |

FOREIGN PATENT DOCUMENTS

| | | | |
|---|---|---|---|
| DE | 3613386 A1 | 10/1986 |
| DE | 3532292 A1 | 3/1987 |
| DE | 3536655 A1 | 4/1987 |
| DE | 3709447 A1 | 10/1988 |
| DE | 3711442 A1 | 10/1988 |
| DE | 3738048 A1 | 5/1989 |
| DE | 3924166 C1 | 2/1991 |
| DE | 4022099 C1 | 12/1991 |
| DE | 4029090 A1 | 3/1992 |
| DE | 406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 0403803 A1 | 12/1990 |
| EP | 552568 A1 | 7/1993 |
| EP | 0735280 A2 | 10/1996 |
| EP | 1050696 A2 | 11/2000 |
| EP | 1138530 A2 | 10/2001 |
| EP | 1188661 A2 | 3/2002 |
| EP | 1241087 A2 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2116739 A2 | 11/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| EP | 3786049 A1 | 3/2021 |
| FR | 1343760 A | 11/1963 |
| FR | 2432424 A1 | 2/1980 |
| FR | 2449236 A1 | 9/1980 |
| FR | 2529002 A2 | 12/1983 |
| FR | 2617928 A1 | 1/1989 |
| FR | 2952031 A1 | 5/2011 |
| GB | 806307 A | 12/1958 |
| GB | 1185074 A | 3/1970 |
| GB | 2104183 A | 3/1983 |
| GB | 2159234 A | 11/1985 |
| GB | 2159604 A | 12/1985 |
| GB | 2180320 A | 3/1987 |
| GB | 2190461 A | 11/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H0193637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | 084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 19980043226 U | 9/1998 |
| KR | 20070076226 A | 7/2007 |
| KR | 20100041679 A | 4/2010 |
| RU | 2469224 C1 | 12/2012 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |
| WO | 2013066159 A1 | 5/2013 |

OTHER PUBLICATIONS

European Search Report for European Application No. 19155995, 11 pages, dated Aug. 28, 2019.
European Search Report for European Application No. 19206334.5, 6 pages, dated May 12, 2020 (dated May 12, 2020).
European Search Report for European Application No. 19212356.0, 8 pages, dated May 7, 2020 (dated May 7, 2020).
Machine translation DE3613386; Oct. 1986.
Machine translation EP 0403803; Dec. 1990.
Machine translation KR20100041679; Apr. 2010.
European Search Report for European Application No. 19157767, dated Oct. 16, 2019, 9 Pages.
European Search Report for European Application No. 20187747, dated Nov. 18, 2020, 11 Pages.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
Grounds of Appeal, EP App. No. 11153607.4, Jun. 1, 2018, 28 Pages.
"17 Years of Innovation and Still Evolving", https://www.powertap.com/post/blog-15-17-years-of-innovation-and-still-evolving, Nov. 28, 2018, 8 Pages.
"ANT Message Protocol and Usage", Dynastream Innovations, Inc., Jul. 2, 2007, 68 Pages.

(56) References Cited

OTHER PUBLICATIONS

"Basis for Claims Filed Jan. 23, 2015", European Patent Application No. 14189773.6, 2 Pages.
"Communication Re Oral Proceedings for European Application No. 10161906, dated Feb. 15, 2013 (dated Feb. 15, 2013)".
"European Search Report for European Application No. 09159949, 2 pages, dated Sep. 11, 2017 (dated Sep. 11, 2017)".
"European Search Report for European Application No. 09177128, 4 pages, dated Aug. 25, 2010 (dated Aug. 25, 2010)".
"European Search Report for European Application No. 10161906, 3 pages, dated Sep. 15, 2010 (dated Sep. 15, 2010)".
"European Search Report for European Application No. 11153607, 3 pages, dated Aug. 10, 2012 (dated Aug. 10, 2012))".
"European Search Report for European Application No. 11172553, 2 pages, dated Sep. 25, 2017 (dated Sep. 25, 2017)".
"European Search Report for European Application No. 11172612, 2 pages, dated Oct. 6, 2011 (dated Oct. 6, 2011))".
"European Search Report for European Application No. 11175126, 2 pages, dated Sep. 25, 2017 (dated Sep. 25, 2017)".
"European Search Report for European Application No. 11275170, 2 pages, dated Jan. 10, 2018 (dated Jan. 10, 2018)".
"European Search Report for European Application No. 12170370, 2 pages, dated Nov. 15, 2017 (dated Nov. 15, 2017)".
"European Search Report for European Application No. 12184150, 10 pages, dated Dec. 12, 2017 (dated Dec. 12, 2017)".
"European Search Report for European Application No. 13158034, 4 pages, dated Jun. 28, 2013 (dated Jun. 28, 2013))".
"European Search Report for European Application No. 13174817.0, 13 pages, dated Jan. 8, 2018 (dated Jan. 8, 2018))".
"European Search Report for European Application No. 13189574, 2 pages, dated Feb. 19, 2014 (dated Feb. 19, 2014)".
"European Search Report for European Application No. 15167426, 4 pages, dated Sep. 18, 2015 (dated Sep. 18, 2015))".
"European Search Report for European Application No. 16167306, 2 pages, dated Mar. 23, 2017 (dated Mar. 23, 2017)".
"European Search Report for European Application No. 17154191, 2 pages, dated Jun. 28, 2017 (dated Jun. 28, 2017)".
"European Search Report for European Application No. 17188022, 9 pages, dated Feb. 1, 2018 (dated Feb. 1, 2018))".
"European Search Report for EP Application No. 18154672, 3 pages, dated Aug. 28, 2018 (dated Aug. 28, 2018))".
"Notice of Intent to Grant EP Application 09159949.8 dated Nov. 14, 2019, pp. 48".
"Office Action for European Application No. 13158034.2, 5 pages, dated May 22, 2014".
"The Lee Company Technical Hydraulic Handbook", 1996, 1-696.
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Puhn, "How to Make Your Car Handle", HPBooks, 1981, 7 Pages.
Thum, Notice of Opposition to a European Patent, EP App. No. 14189773.6, Dec. 13, 2018, 49 Pages.
Thum, "Oppostion Letter Against EP2357098", Oct. 16, 2018, 39.
Thum, "Opposition Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
Electronic Translation of DE3709447A1.
English language abstract for EP 0207409 (no date).
European Search Report, European Patent Application No. 14189773.6, dated May 4, 2015, 4 Pages.
EP Search Report for European Application No. 15163428.4, dated Jul. 3, 2017, 7 Pages.
"European Patent Office Final Decision dated Mar. 21, 2013", European Patent Application No. 10161906.2.
"European Search Report for European Application No. 10187320, 12 pages, dated Sep. 25, 2017 (dated Sep. 25, 2017)".
"European Search Report and Written Opinion, European Patent Application No. 13165362.8", dated Sep. 24, 2014, 6 Pages.
Nilsson, "Opposition Letter Against EP-2357098", Oct. 13, 2017, 7.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USA XP055430818, ISBN: 978-0-87938-186-8, Dec. 31, 1984, 207.
EP Search Report for European Application No. 21173940.4, dated Nov. 12, 2021, 9 Pages.

* cited by examiner

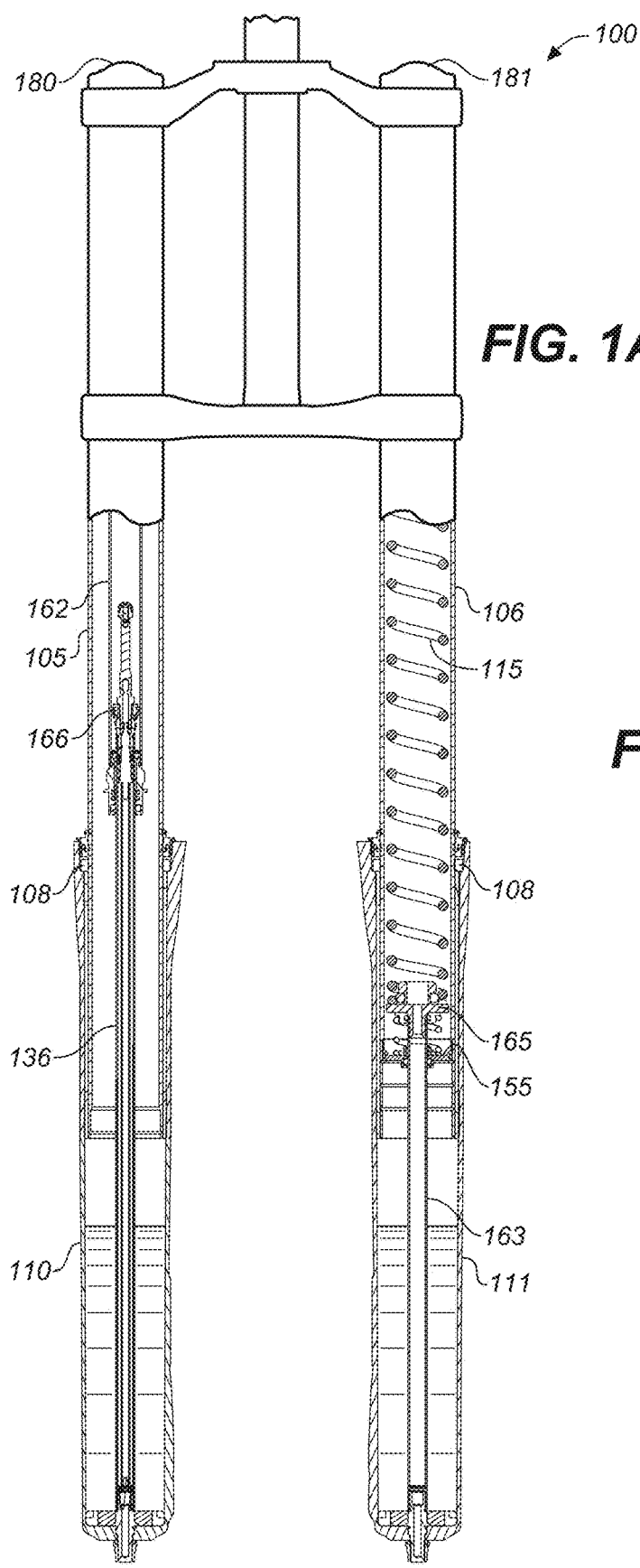
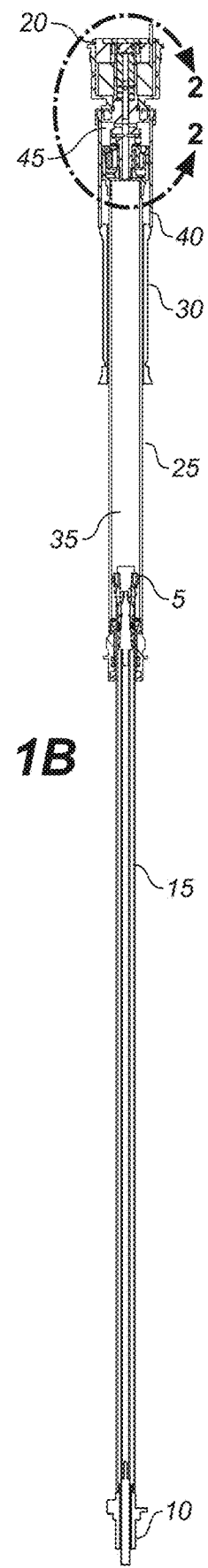
FIG. 1A
FIG. 1B

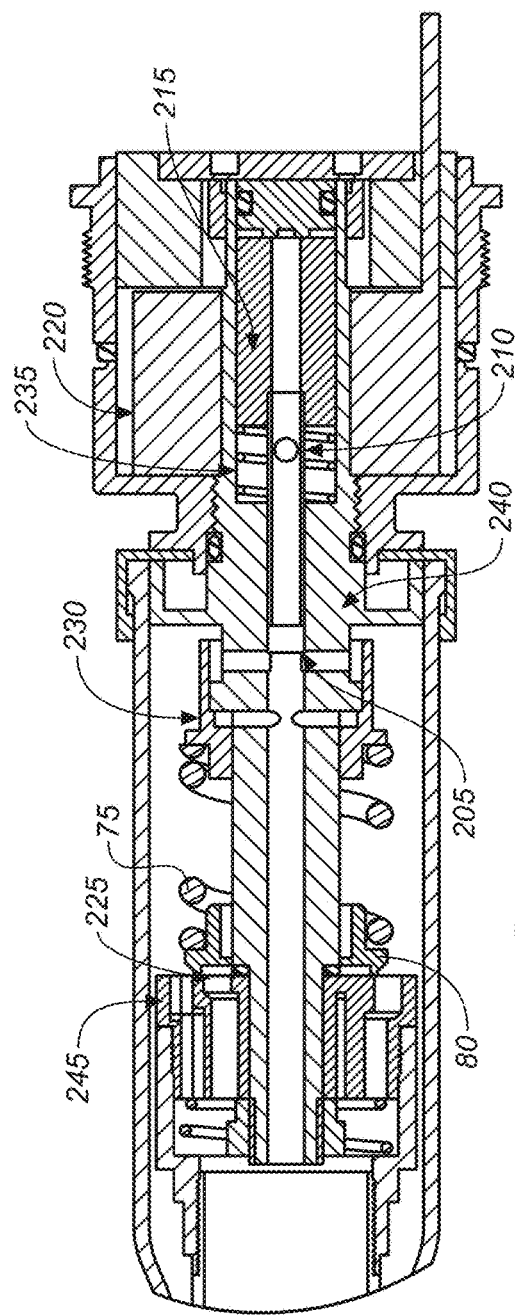
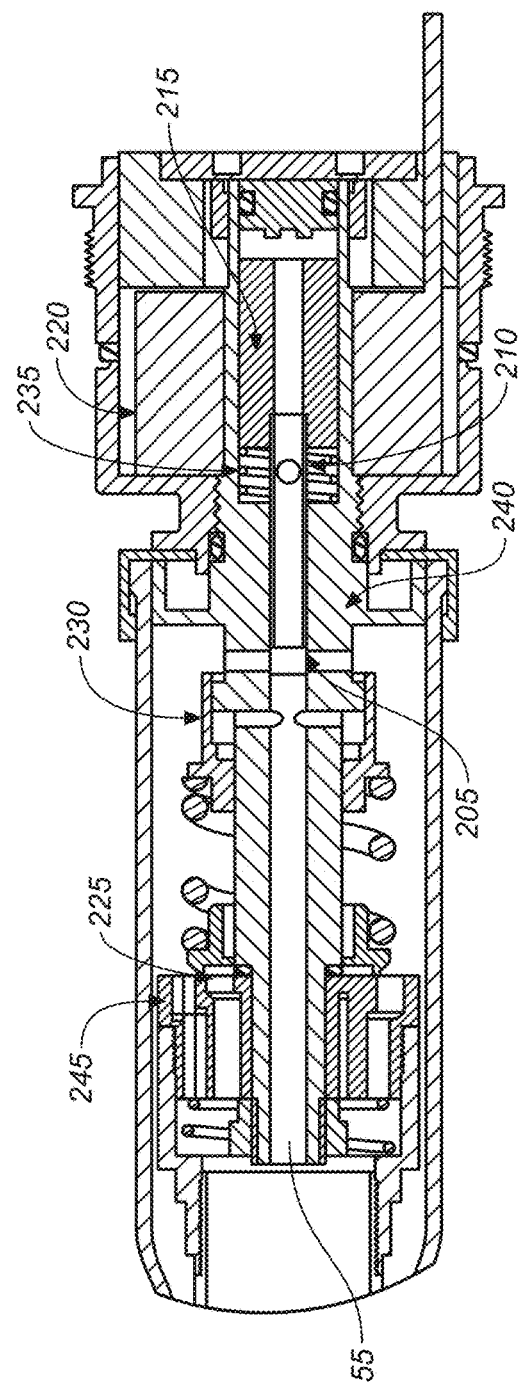
FIG. 5A
FIG. 5B

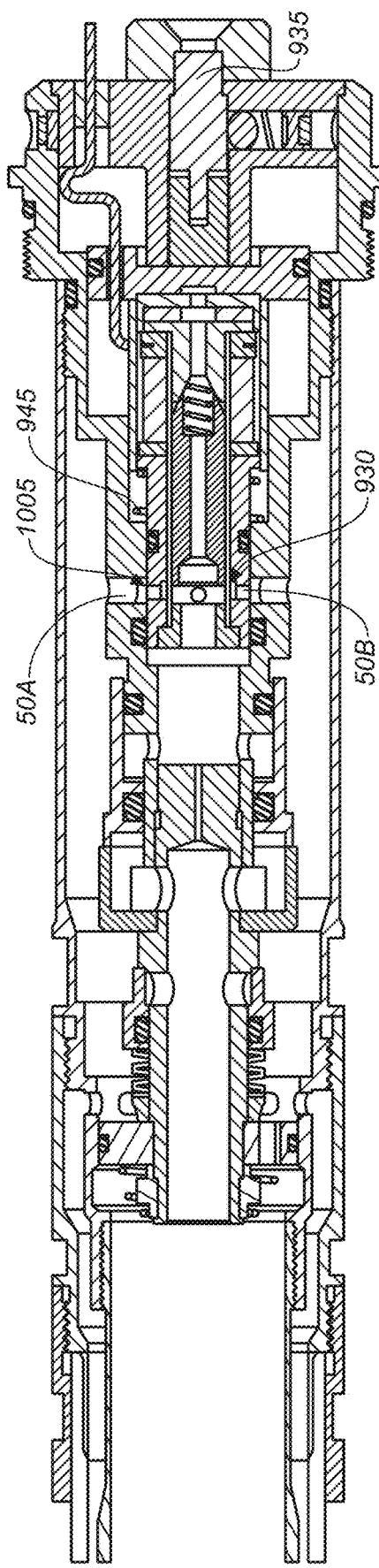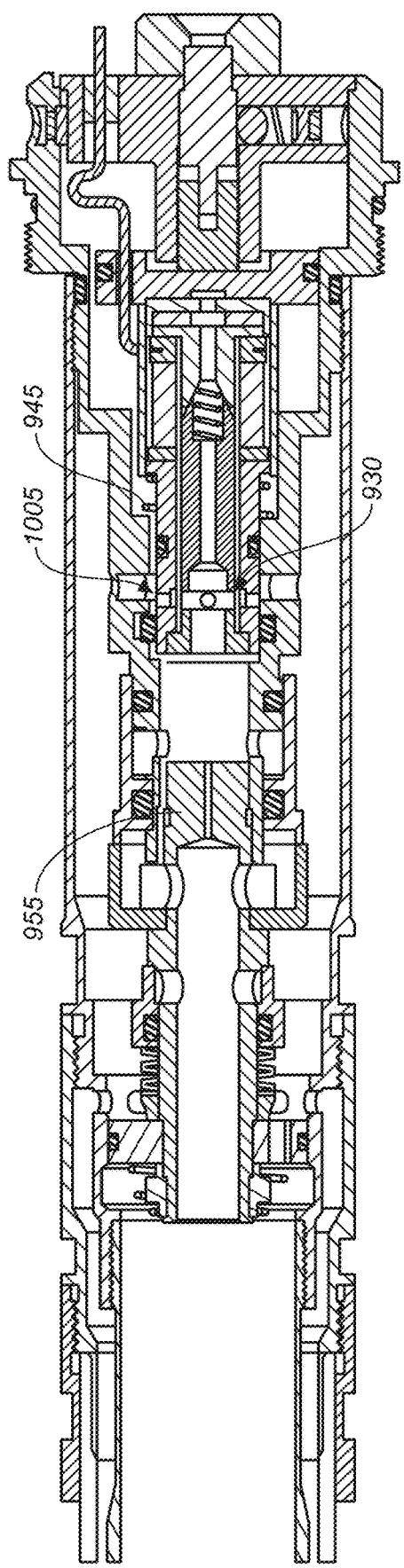
FIG. 12
FIG. 13

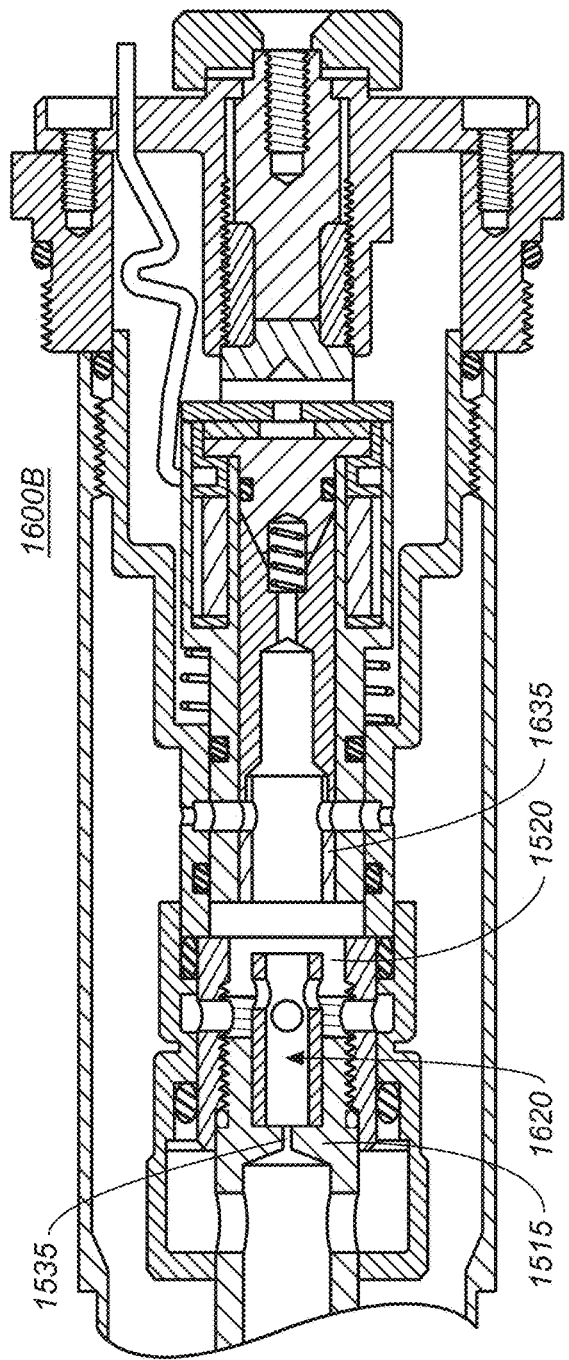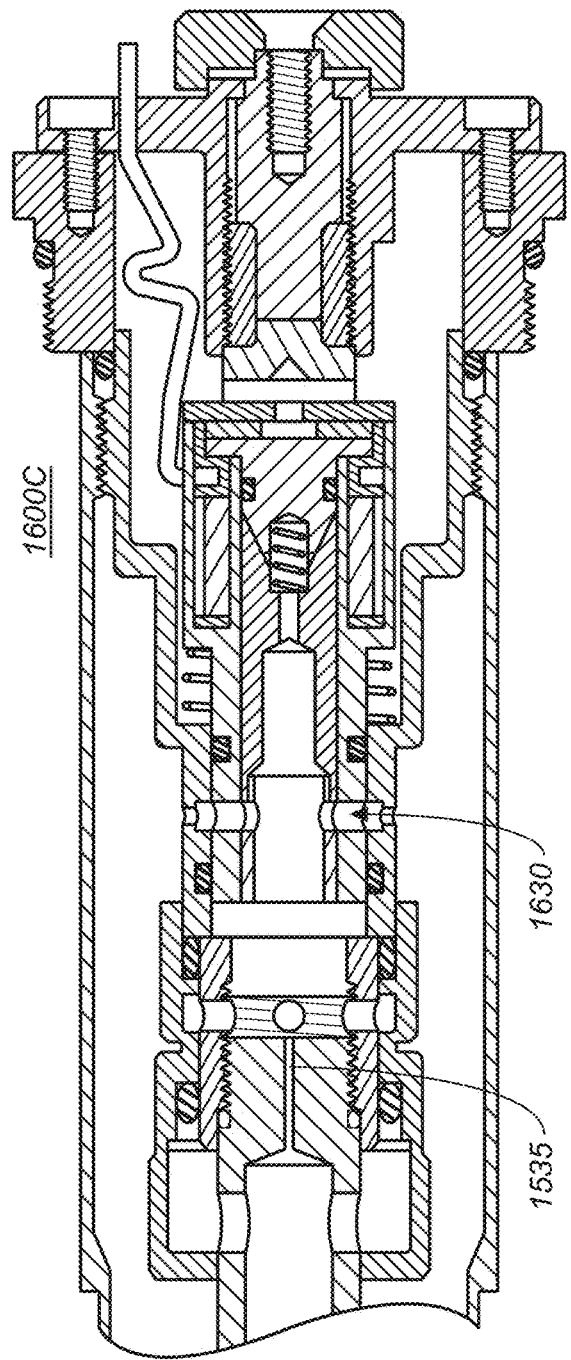

METHOD AND APPARATUS FOR AN ADJUSTABLE DAMPER

CROSS-REFERENCE TO RELATED APPLICATIONS

This application is a continuation application of and claims the benefit of U.S. patent application Ser. No. 16/046,497, filed on Jul. 26, 2018, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 16/046,497 is a continuation application of and claims the benefit of U.S. patent application Ser. No. 14/251,446, filed on Apr. 11, 2014, now U.S. Pat. No. 10,047,817, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/251,446 is a continuation-in-part application of and claims the benefit of U.S. patent application Ser. No. 13/934,067, filed on Jul. 2, 2013, now U.S. Pat. No. 10,060,499, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/934,067 is a continuation-in-part application of and claims the benefit of U.S. patent application Ser. No. 13/843,704, filed on Mar. 15, 2013, now U.S. Pat. No. 9,033,122, entitled "METHOD AND APPARATUS FOR ADJUSTABLE DAMPER" by Ericksen et al., assigned to the assignee of the present application, and is hereby incorporated by reference in its entirety herein.

The application with Ser. No. 13/843,704, claims the benefit of and claims priority of U.S. provisional patent application Ser. No. 61/709,041, filed on Oct. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 13/843,704 claims the benefit of and claims priority of U.S. provisional patent application Ser. No. 61/667,327, filed on Jul. 2, 2012, entitled "METHOD AND APPARATUS FOR AN ADJUSTABLE DAMPER" by Ericksen et al., assigned to the assignee of the present application, and is hereby incorporated by reference in its entirety herein.

The application with Ser. No. 14/251,446 is a continuation-in-part application of and claims the benefit of U.S. patent application Ser. No. 13/485,401, filed on May 31, 2012, now abandoned, entitled "METHODS AND APPARATUS FOR POSITION SENSITIVE SUSPENSION DAMPING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/491,858, filed on May 31, 2011, entitled "METHODS AND APPARATUS FOR POSITION SENSITVE SUSPENSION DAMPENING" by Ericksen et al., assigned to the assignee of the present application, and is hereby incorporated by reference in its entirety herein.

The application with Ser. No. 13/485,401 claims the benefit of and claims priority of U.S. provisional patent application Ser. No. 61/645,465, filed on May 10, 2012, entitled "METHOD AND APPARATUS FOR AN ADJUSTABLE DAMPER" by Cox et al., assigned to the assignee of the present application, and is hereby incorporated by reference in its entirety herein.

The application with Ser. No. 14/251,446 is a continuation-in-part application of and claims the benefit of U.S. patent application Ser. No. 12/684,072, filed on Jan. 7, 2010, now abandoned, entitled "REMOTELY OPERATED BYPASS FOR A SUSPENSION DAMPER" by John Marking, assigned to the assignee of the present application, and is hereby incorporated by reference in its entirety herein.

The application with Ser. No. 12/684,072 claims the benefit of and claims priority of U.S. provisional patent application Ser. No. 61/143,152, filed on Jan. 7, 2009, entitled "REMOTE BYPASS LOCK-OUT" by John Marking, assigned to the assignee of the present application, and is hereby incorporated by reference in its entirety herein.

The application with Ser. No. 14/251,446 is a continuation-in-part application of and claims the benefit of U.S. patent application Ser. No. 13/189,216, filed on Jul. 22, 2011, now U.S. Pat. No. 9,239,090, entitled "SUSPENSION DAMPER WITH REMOTELY-OPERABLE VALVE" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/010,697, now U.S. Pat. No. 8,857,580, filed on Jan. 20, 2011, entitled "REMOTELY OPERATED BYPASS FOR A SUSPENSION DAMPER" by John Marking, assigned to the assignee of the present application, and is hereby incorporated by reference in its entirety herein.

The application with Ser. No. 13/010,697 claims the benefit of and claims priority of U.S. provisional patent application Ser. No. 61/296,826, filed on Jan. 20, 2010, entitled "BYPASS LOCK-OUT VALVE FOR A SUSPENSION DAMPER" by John Marking, assigned to the assignee of the present application, and is hereby incorporated by reference in its entirety herein.

The application with Ser. No. 13/189,216 is a continuation-in-part application of and claims the benefit of U.S. patent application Ser. No. 13/175,244, filed on Jul. 1, 2011, now U.S. Pat. No. 8,627,932, entitled "BYPASS FOR A SUSPENSION DAMPER" by John Marking, assigned to the assignee of the present application, and is hereby incorporated by reference in its entirety herein.

The application with Ser. No. 13/175,244 claims the benefit of and claims priority of U.S. provisional patent application Ser. No. 61/361,127, filed on Jul. 2, 2010, entitled "BYPASS LOCK-OUT VALVE FOR A SUSPENSION DAMPER" by John Marking, assigned to the assignee of the present application, and is hereby incorporated by reference in its entirety herein.

BACKGROUND

Field of the Invention

Embodiments generally relate to a damper assembly for a vehicle. More specifically, the invention relates to an adjustable damper for use with a vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there through which may be covered by shim stacks to provide for different operational characteristics in compression or extension.

Conventional damping components provide a constant damping rate during compression or extension through the entire length of the stroke. Other conventional damping components provide mechanisms for varying the damping rate. Further, in the world of bicycles, damping components are most prevalently mechanical. As various types of recreational and sporting vehicles continue to become more technologically advanced, what is needed in the art are improved techniques for varying the damping rate.

BRIEF DESCRIPTION OF THE DRAWINGS

Aspects of the present invention are illustrated by way of example, and not by way of limitation, in the accompanying drawings, wherein:

FIG. 1A depicts an asymmetric bicycle fork having a damping leg and a spring leg.

FIG. 1B depicts a cross-sectional side elevation view of a shock absorber of a bicycle fork cartridge, in accordance with an embodiment.

FIG. 5A and FIG. 5B depict a cross-sectional side elevation view of a valve assembly of detail 2 of the shock absorber of FIG. 1B, in accordance with an embodiment.

FIGS. 9-13 depict a cross-sectional side elevation view of the base valve assembly of detail 2 of FIG. 1B, including a "latching solenoid", in accordance with an embodiment.

FIGS. 16A-16C depict an electronic valve, in accordance with an embodiment.

Figure 2:
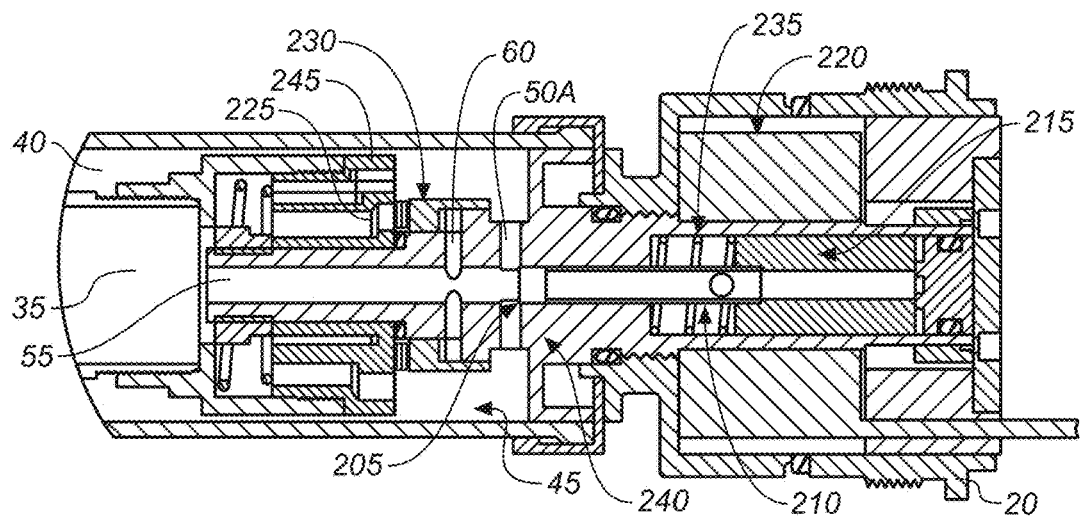
FIG. 2, FIG. 3, and FIG. 4 depict a cross-sectional side elevation view of various operational positions of an embodiment of the base valve assembly of detail 2 of FIG. 1B.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Notation and Nomenclature

Unless specifically stated otherwise as apparent from the following discussions, it is appreciated that throughout the present Description of Embodiments, discussions utilizing terms such as "comparing", "monitoring", "regulating", "accessing", determining", "sending", "setting", "actuating", "establishing", "tracking", or the like, often refer to the actions and processes of a computer system or similar electronic computing device (or portion thereof) such as, but not limited to, a control system. (See FIGS. 17-23.) The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, and/or display components of the electronic computing device or other electronic computing device(s). Under the direction of computer-readable instructions, the electronic computing device may carry out operations of one or more of the methods described herein.

Overview of Discussion

Example techniques, systems, and methods for controlling vehicle motion are described herein. Discussion begins with a high level description of conventional (i.e., that technology which exists, other than the present technology described herein) damping components and of embodiments of the novel present technology. The discussion continues with a description of a vehicle suspension damper and an electronic valve within the vehicle suspension damper, in accordance with embodiments. (See FIGS. 1-16.) Following, the discussion turns to a description of a systems and methods for controlling vehicle motion, as it relates to multi-wheeled vehicles (e.g., bicycles, cars, side-by-sides, military vehicles), using novel control systems, in accordance with embodiments. (See FIGS. 17-22.) Next, an example computer system is described, with which or upon which various systems, components, and/or methods (or portions thereof) may be implemented (See FIG. 23).

As previously described in the background, some conventional damping components provide a constant passive damping rate during compression or extension through the entire length of the stroke. Other conventional damping components provide mechanisms for varying the damping rate. Additionally, in the world of bicycles, damping components are most prevalently mechanical. Further, conventional inertia valves of conventional vehicle suspension dampers are also mechanical. The conventional mechanical inertia valve operates to respond to a terrain change by applying damping forces when a vehicle's motion is sensed. However, by the time that the mechanical inertia valve senses the vehicle motion and then actually applies the damping force, the vehicle rider has already experienced some type of response to the varied terrain. For example, the vehicle rider might feel the vehicle's initial response to running over a large rock. Mechanical inertia valves have a response time that is measured at the speed of sound or less. Thus, a shock wave from a vehicle hitting a bump will be received and felt by the vehicle rider before the mechanical inertia valve can open and provide a "soft" ride. (A "soft" vs. "hard" setting of an inertia valve is explained below.)

Since the response time for a conventional valve to respond to a terrain change (e.g., bump) is relatively slow, conventionally, a sensor is placed on the front fork while a vehicle suspension damper is placed on the rear shock. The sensor senses the vehicle motion at the front of the vehicle and sends a signal regarding this vehicle motion to the vehicle suspension damper at the rear of the vehicle. Having received the signal at the rear of the vehicle, by the time the back wheel runs over the rock, the vehicle suspension damper on the rear shock had just enough time to adjust a valve therein to open, thus providing damping at the vehicle's rear.

Herein, in accordance with an embodiment, various systems, methods and techniques for controlling vehicle motion in multi-wheeled vehicles (e.g., two-wheeled vehicles [e.g., bicycle, dirt bike, road motorcycle]) are described, utilizing a novel control system. The vehicle suspension damper, in various embodiments, includes a novel control system and an electronic valve, as will be described herein. The vehicle suspension damper is positioned between the vehicle's wheel base and the vehicle's frame. In one example and in general, an electronic valve of a vehicle suspension damper attached to the front fork responds quickly to received signals that indicate that the vehicle's front wheel base is moving (i.e., accelerating) over an obstacle (e.g., rock). In one embodiment, the control system responds to the receipt of the signals by quickly causing the electronic valve to open into a "soft" mode. In one embodiment, the response occurs before the vehicle's back wheel runs over the same obstacle. The soft mode provides damping within the vehicle suspension damper. Due to the damping provided, the vehicle's frame is enabled to experience less acceleration than that experienced by the vehicle's front wheel while traversing the obstacle. Thus, the vehicle rider experiences a smoother ride through the frame of the vehicle, even while the vehicle is moving over various obstacles.

In brief and as will be described herein in detail, the control system receives a set of control signals from a set of sensors attached to a vehicle component (e.g., wheel, frame, etc.) of a vehicle. At least one control signal of the set of control signals includes an acceleration value corresponding to a movement of the vehicle component. The control system compares the acceleration value to a predetermined acceleration threshold value corresponding to the vehicle component. The control system also monitors a state of at least one pilot valve assembly within at least one vehicle suspension damper that is attached to the vehicle. The state of the pilot valve assembly controls a damping force within the at least one vehicle suspension damper. Based on the comparison performed between the measured acceleration value and the predetermined acceleration threshold value as well as the determination of a state of the pilot valve assembly, the control system sends an activation signal to a power source of the at least one vehicle suspension damper. The activation signal activates the power source to deliver a current to the at least one pilot valve assembly. Once delivered, the at least one valve assembly adjusts to a desired state. The desired state is configured to adjust the damping force, thereby reducing an acceleration of the vehicle frame.

As will be described herein, embodiments relating to two-wheeled vehicles also provide varying user selectable modes of operation, wherein each selected mode of operation triggers varying methods of detection and response to terrain changes relating to detecting bumps, sensing power input by the rider, and adjusting rebound damping.

In addition to the features of embodiments discussed with regard to two-wheeled vehicles, the systems and methods for controlling vehicle motion in multi-wheeled vehicles other than two-wheeled vehicles (e.g., side-by-side vehicles [e.g., ATV, pick-up truck, military truck]) include many of the features of the novel control system discussed with regard to two-wheeled vehicles. For example, embodiments may not only deduce the vertical acceleration values, but also deduce from the received set of control signals, that include acceleration values associated with various vehicle components, the multi-wheeled vehicle's roll and pitch. These measured acceleration values relate to the tilt (e.g., roll, pitch) of the vehicle and are compared to a database having thereon preprogrammed acceleration threshold values associated with vehicle components as it relates to tilt. Further, in embodiments, the control system receives measured velocity values associated with user-induced events (e.g., turning a steering wheel, pressing/releasing a brake pedal, pressing/releasing the gas pedal, thereby causing a throttle to open/close). The control system compares these measured velocity values relating to user-induced events to a database having preprogrammed thereon velocity threshold values associated with vehicle components. Based on the comparison performed with regard to the measured acceleration values with the predetermined acceleration threshold values and the measured velocity values with the predetermined velocity threshold values, as well as the determined state of valves within various vehicle suspension dampers attached to vehicle components, the control system sends an activation signal to power sources of the vehicle suspension dampers. The activation signal activates the power source to deliver a current to valve assemblies within the vehicle suspension dampers. Once delivered, the valve assemblies adjust to a desired state. The desired state is configured to adjust the damping force to reduce or eliminate the tilt of the vehicle's frame. In other words, the orientation of the vehicle frame is placed as close to level as possible.

As will be described herein, embodiments relating to multi-wheeled vehicles also provide various system modes within which the vehicle suspension dampers may operate, along with control modes for affecting roll and pitch dynamics of the vehicle. Further, embodiments provide methods and systems for implementing delays and rebound settle time, for de-conflicting multiple control modes and for cycling between different system modes.

Embodiments thus provide systems and methods for controlling a vehicle's motion by increasing and/or decreasing damping forces within a vehicle suspension damper in quick response to sensed movement of vehicle components (e.g., vehicle wheel base). Again, embodiments may be used in various types of multi-wheeled vehicles, such as, but not limited to, bicycles, side-by-sides (four-wheel drive off-road vehicle), snow mobiles, etc. These embodiments may be positioned in both the front fork and the rear shock. Conventional vehicle suspension dampers (including conventional electronic dampers) cannot respond quickly enough to a sensed movement of a vehicle's front wheel traversing an obstacle such that the rider avoids feeling the effect via the vehicle's frame. However, embodiments of the present technology quickly and selectively apply damping forces through the vehicle suspension dampers (that are coupled with both the vehicle's forks and the vehicle's frame). Such damping enables the vehicle's frame, and thus the vehicle's rider, to experience less acceleration than that being experienced by the wheel base(s).

Thus, and as will be discussed herein, embodiments provide for a control system that enables the use of sensors and an electronic valve to read the terrain and make changes to the vehicle suspension damper(s) in real time. The novel control system enables at least the following novel functions: the execution of novel algorithms that enable a quicker response and adjustment to the vehicle suspension damper(s) than conventional vehicle suspension dampers; a quiet operation since there are no audible electronic valve actuation sounds; a power efficient model that is designed for low power consumption; an easily tunable model that may use conventional means in combination with the novel control system, such as, but not limited to, valve shims; a fail-safe shock absorber, as the electronic valve also functions as a conventional shock if power is lost; a small model that can be packaged in bicycle forks and shocks; and a versatile model that may function in conventional shocks, twin tube shocks and bypass shocks.

Example Vehicle Suspension Dampers and Electronic Valves Therein

Integrated damper/spring vehicle shock absorbers often include a damper body surrounded by or used in conjunction with a mechanical spring or constructed in conjunction with an air spring or both. The damper often consists of a piston and shaft telescopically mounted in a fluid filled cylinder. The damping fluid (i.e., damping liquid) or damping liquid may be, for example, hydraulic oil. A mechanical spring may be a helically wound spring that surrounds or is mounted in parallel with the damper body. Vehicle suspension systems typically include one or more dampers as well as one or more springs mounted to one or more vehicle axles. As used herein, the terms "down", "up", "downward", "upward", "lower", "upper", and other directional references are relative and are used for reference only.

FIG. 1A shows an asymmetric bicycle fork 100 having a damping leg and a spring leg. The damping leg includes an upper tube 105 mounted in telescopic engagement with a lower tube 110 and having fluid damping components therein. The spring leg includes an upper tube 106 mounted in telescopic engagement with a lower tube 111 and having spring components therein. The upper legs 105, 106 may be held centralized within the lower legs 110, 111 by an annular bushing 108. The fork 100 may be included as a component of a bicycle such as a mountain bicycle or an off-road vehicle such as an off-road motorcycle. In some embodiments, the fork 100 may be an "upside down" or Motocross-style motorcycle fork.

In one embodiment, the damping components inside the damping leg include an internal piston 166 disposed at an upper end of a damper shaft 136 and fixed relative thereto. The internal piston 166 is mounted in telescopic engagement with a cartridge tube 162 connected to a top cap 180 fixed at one end of the upper tube 105. The interior volume of the damping leg may be filled with a damping liquid such as hydraulic oil. The piston 166 may include shim stacks (i.e., valve members) that allow a damping liquid to flow through vented paths in the piston 166 when the upper tube 105 is moved relative to the lower tube 110. A compression chamber is formed on one side of the piston 166 and a rebound chamber is formed on the other side of the piston 166. The pressure built up in either the compression chamber or the rebound chamber during a compression stroke or a rebound stroke provides a damping force that opposes the motion of the fork 100.

The spring components inside the spring leg include a helically wound spring 115 contained within the upper tube 106 and axially restrained between top cap 181 and a flange 165. The flange 165 is disposed at an upper end of the riser tube 163 and fixed thereto. The lower end of the riser tube 163 is connected to the lower tube 111 in the spring leg and fixed relative thereto. A valve plate 155 is positioned within the upper leg tube 106 and axially fixed thereto such that the plate 155 moves with the upper tube 106. The valve plate 155 is annular in configuration, surrounds an exterior surface of the riser tube 163, and is axially moveable in relation thereto. The valve plate 155 is sealed against an interior surface of the upper tube 106 and an exterior surface of the riser tube 163. A substantially incompressible lubricant (e.g., oil) may be contained within a portion of the lower tube 111 filling a portion of the volume within the lower tube 111 below the valve plate 155. The remainder of the volume in the lower tube 111 may be filled with gas at atmospheric pressure.

During compression of fork 100, the gas in the interior volume of the lower tube 111 is compressed between the valve plate 155 and the upper surface of the lubricant as the upper tube 106 telescopically extends into the lower tube 111. The helically wound spring 115 is compressed between the top cap 181 and the flange 165, fixed relative to the lower tube 111. The volume of the gas in the lower tube 111 decreases in a nonlinear fashion as the valve plate 155, fixed relative to the upper tube 106, moves into the lower tube 111. As the volume of the gas gets small, a rapid build-up in pressure occurs that opposes further travel of the fork 100. The high pressure gas greatly augments the spring force of spring 115 proximate to the "bottom-out" position where the fork 100 is fully compressed. The level of the incompressible lubricant may be set to a point in the lower tube 111 such that the distance between the valve plate 155 and the level of the oil is substantially equal to a maximum desired travel of the fork 100.

Referring now to FIG. 1B, a cross-sectional side elevation view of a shock absorber of a bicycle fork cartridge is depicted, in accordance with an embodiment. More particularly, FIG. 1B shows the inner portions of the bicycle fork leg assembly, comprising a damper piston 5. In practice, the top cap 20 is affixed to an upper tube (not shown) and the lower connector 10 is fixed to a lower leg tube (not shown) where the upper tube is typically telescopically mounted within the lower tube (although the reverse may also be the case). As the upper tube and the lower tube telescope in contraction or expansion in response to disparities in the terrain being traversed by a vehicle, including such for shock absorption, so also the damper piston 5 and piston rod 15 move telescopically into and out of damper cylinder 25. During compression, the volume of the piston rod 15 displaces, from the cylinder 25, a volume of damping liquid contained within the cylinder 25 corresponding to the volume of the piston rod 15 incurring into the damper cylinder 25. During extension or "rebound", the volume of liquid must be replaced as the piston rod 15 leaves the interior of the damper cylinder 25.

Damping liquid displaced as described above moves from the damper cylinder 25, through a base valve assembly of detail 2 and ultimately into an elastic bladder 30 during compression, and from the elastic bladder 30, back through the base valve assembly of detail 2 and into the damper cylinder 25 during rebound. In one embodiment, the base valve assembly of detail 2 allows for the compression damping to be adjusted by the user.

Figure 3:
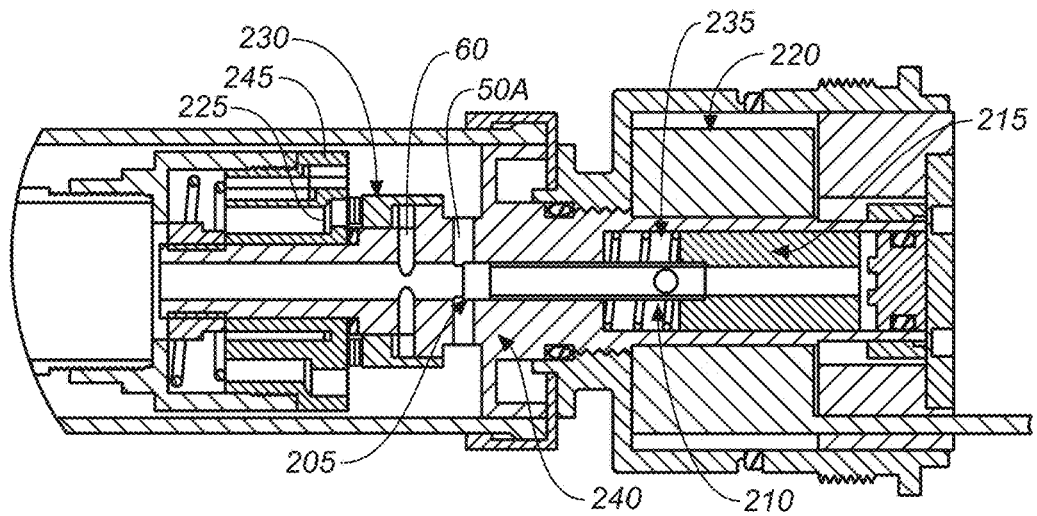
Figure 4:
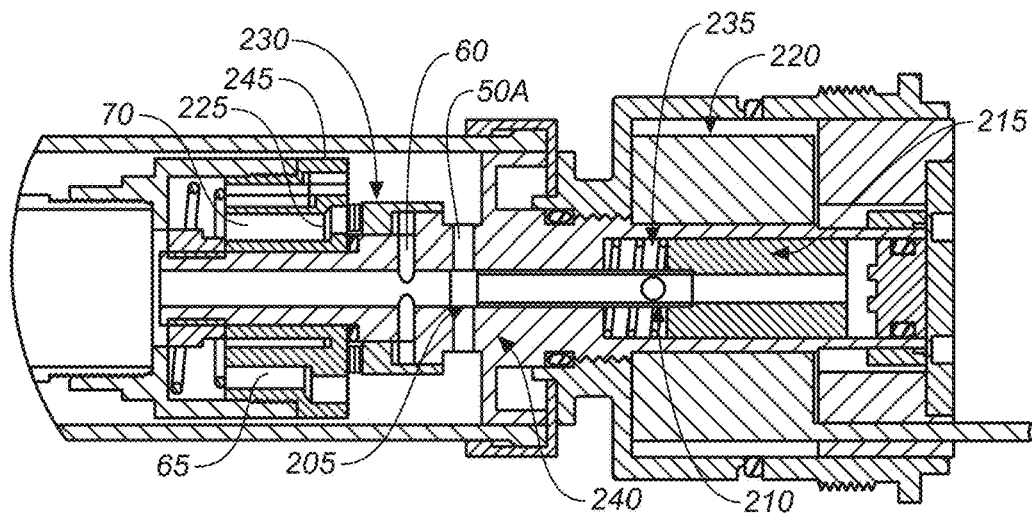

FIG. 2, FIG. 3, and FIG. 4 show cross-sectional side elevation views of various operational positions of an embodiment of the base valve assembly of detail 2 of FIG. 1B. FIGS. 2-4 show a continuously variable semi active arrangement, in accordance with embodiments, and as will be described in more detail below. In brief, a solenoid balanced by an armature biasing spring 235 axially locates a pressure-balanced pilot spool 210. The pressure-balanced pilot spool 210 controls the pressure inside the valve body 230. As this pressure is increased inside the valve body 230, the axial force of the valve body 230 on the conventional valve shim increases. Due to the pilot spool assembly arrangement, a relatively small solenoid (using relatively low amounts of power) can generate relatively large damping forces. Furthermore, due to incompressible fluid inside the valve body 230, damping occurs as the valve opens and the valve body 230 collapses. The result is not only a controllable preload on the valve stack, but also a controllable damping rate. Embodiments discussed herein may optionally be packaged in a base valve, the compression adjuster of a shock absorber, and/or on the main piston of a shock absorber.

FIG. 2 is a detailed view of the base valve assembly of detail 2 of FIG. 1B, with the valve shown in a retracted soft position. This retracted position corresponds to minimum or no current in the solenoid. In FIG. 2, a first damping fluid flow path between damping cylinder interior 35 and annular reservoir 40 (including bladder 30 interior; see FIG. 1B) is substantially unobstructed via bleed passage 55, ports 50A and upper annulus 45. (Also shown in FIG. 2 is the main piston 245.)

FIG. 3 is a detailed view of the base valve assembly of detail 2 of FIG. 1B, with the valve shown in the mid-damping position. This corresponds to medium current supplied to the solenoid. FIG. 3 shows a partial obstruction of ports 50A by metering edge 205 of the pilot spool 210.

FIG. 4 is a detailed view of the base valve assembly of detail 2 of FIG. 1B, with the valve shown in the firm-damping position. FIG. 4 shows substantial blockage of ports 50A by the metering edge 205 of the pilot spool 210, which is axially displaced relative to its position in FIG. 2.

Of note, the pilot spool 210 shown in FIG. 2 is in a retracted soft position, in which the metering edge 205 of the pilot spool 210 is not obstructing the ports 50A. However, the pilot spool 210 shown in FIG. 3 is in a middle position, in which the metering edge 205 of the pilot spool 210 is partially obstructing the ports 50A. The pilot spool 210 shown in FIG. 4 is in a firm position, in which the metering edge 205 of the pilot spool 210 is fully obstructing ports 50A.

In one embodiment, the axial displacement of the pilot spool 210 is facilitated by an electromagnetic interaction between the armature 215 and the coil 220. Adjustment of the current in the coil 220 (via modulation of the current from a power source [not shown]) to predetermined values causes the armature 215, and hence the pilot spool 210, to move in corresponding predetermined axial positions relative to the coil 220. As such, the pilot spool 210 can be adjusted as shown in the FIGS. 2-4.

When the pilot spool 210 is closing ports 50A, as shown in FIG. 4, substantially all damping fluid compression flow must flow through port 70 and valve shims 225. In addition, the damping fluid pressure acting through and in annulus 60 on an interior of the valve body 230 is increased and therefore the valve body 230 exerts more closing force of the valve shims 225. The net result is an increased compression damping due to closure of ports 50A and a further compression damping increase due to a corresponding pressure increase in the compression damping within annulus 60. When the pilot spool 210 is located in a middle position as is shown in FIG. 3, the foregoing results apply in a diminished way because some of the compression flow (albeit less than full compression flow) may flow through partially open ports 50A. The embodiment of FIG. 2 also exhibits some effect of pressure boosting via annulus 60 on the valve body 230, but the phenomenon occurs at higher compression rates.

FIG. 5A and FIG. 5B depict a cross-sectional side elevation view of a valve assembly of detail 2 of the shock absorber of FIG. 1B, in accordance with an embodiment. FIG. 5A and FIG. 5B show an embodiment in which the valve body 230 acts on the valve shims 225 through a spring 75. In use, the valve body 230 increases or decreases the preload on the spring 75. FIG. 5A shows the pilot spool 210 in the retracted soft position, thereby causing the preload on the spring 75 to decrease. FIG. 5B shows the pilot spool 210 in the firm position, thereby causing the preload on the spring 75 to increase.

Figure 6:
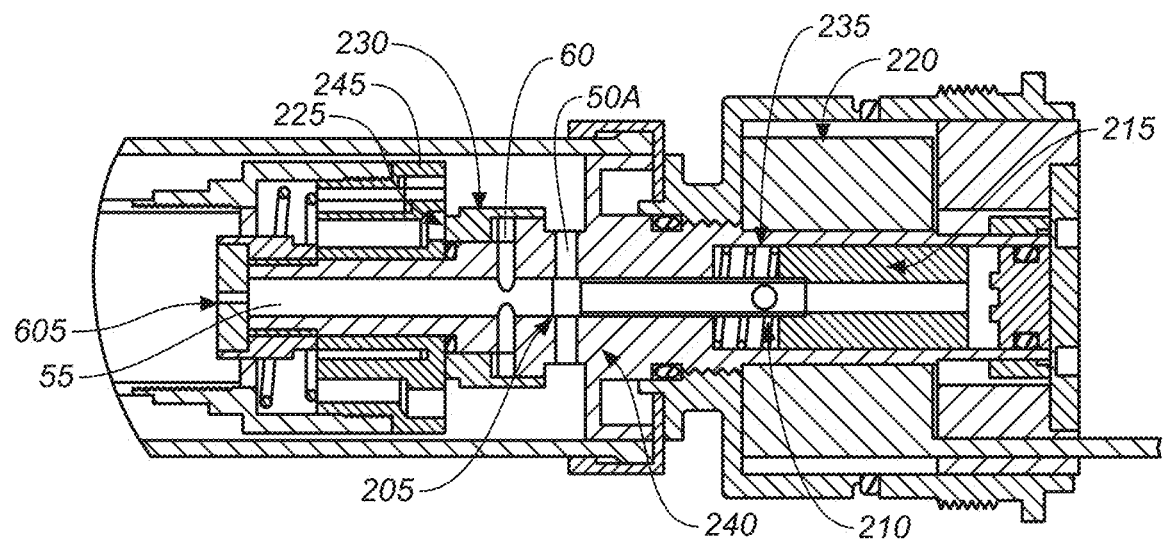
FIG. 6 and FIG. 7 each depicts a cross-sectional side elevation view of the valve assembly of detail 2 of the shock absorber of FIG. 1B, in accordance with an embodiment.
Figure 7:
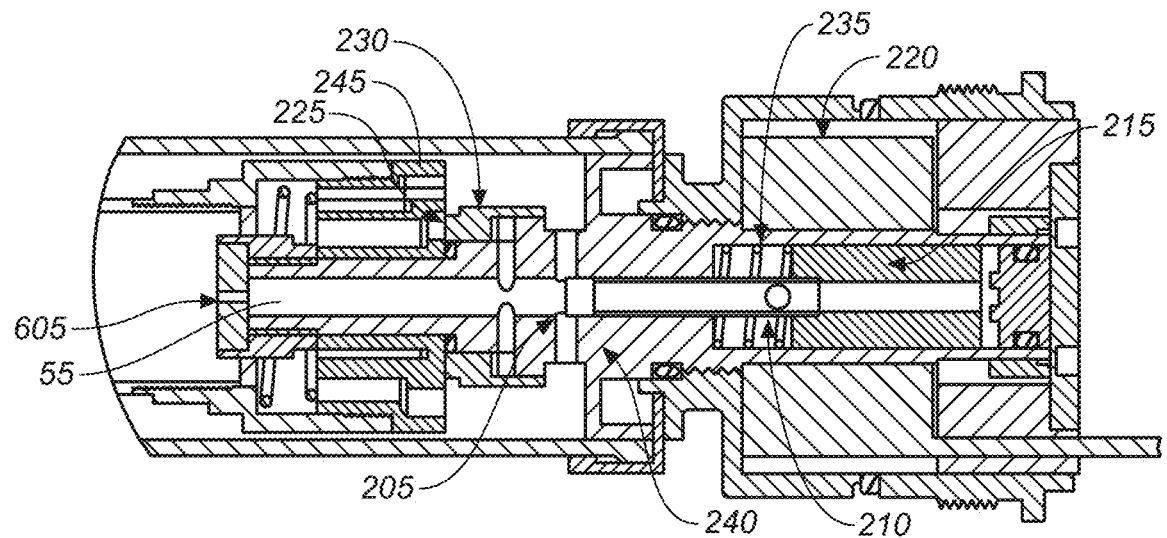

FIG. 6 and FIG. 7 depict a cross-sectional side elevation view of the valve assembly of detail 2 of the shock absorber of FIG. 1B, in accordance with an embodiment. FIG. 6 and FIG. 7 show an embodiment including a flow control orifice 605 for limiting flow through into the bleed passage 55 during compression. In limiting fluid flow, the flow control orifice 605 (by creating a pressure drop) places an upper limit on the amount of pressure in the annulus 60, and hence the amount of "boost" or closure force that the valve body 230 can exert on the valve shims 225. FIG. 6 shows the metering edge 205 of the pilot spool 210 obstructing ports 50A. FIG. 7 shows the metering edge 205 of the pilot spool 210 partially obstructing ports 50A.

Figure 8A:
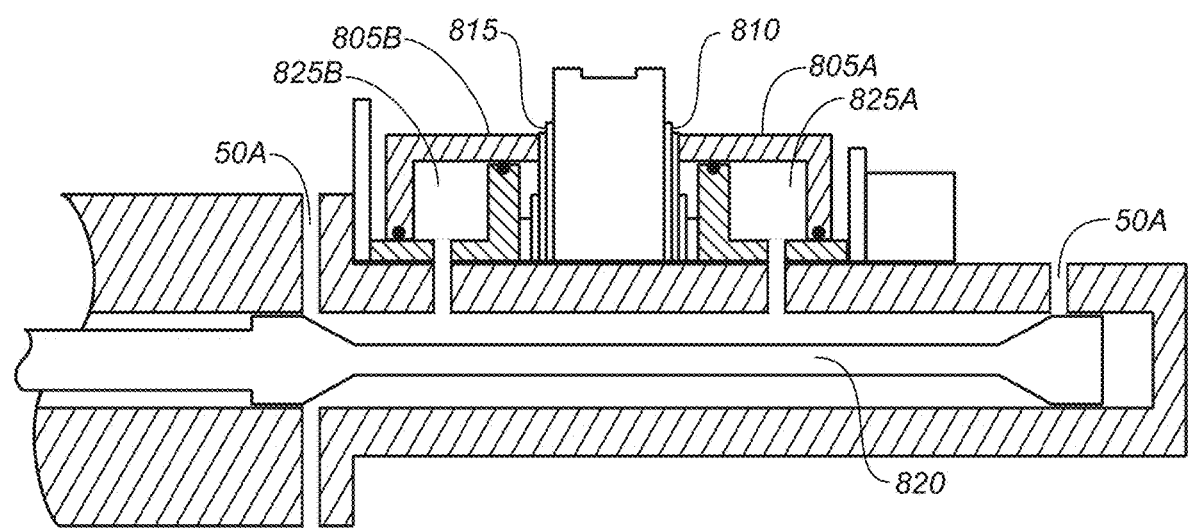
FIG. 8A and FIG. 8B depict a cross-sectional side elevation view of a shock absorber, in accordance with an embodiment.
Figure 8B:
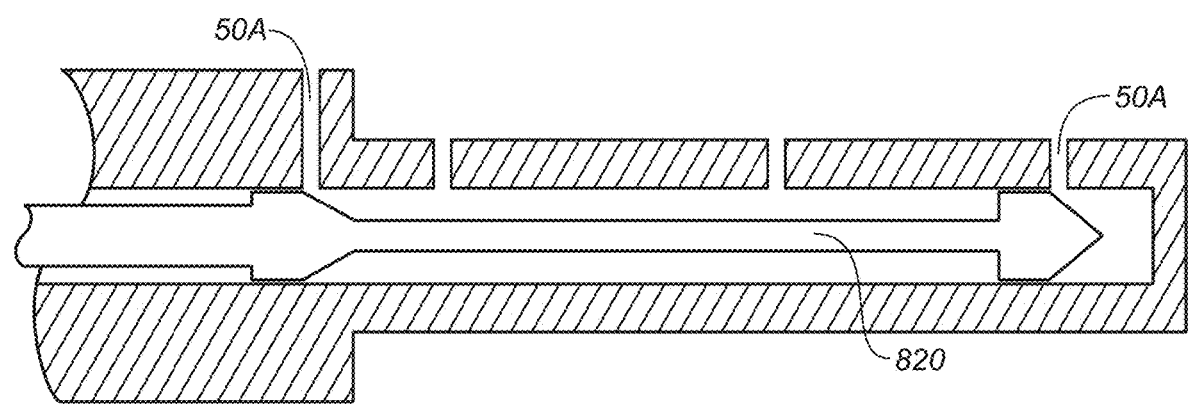

FIG. 8A and FIG. 8B depict a cross-sectional side elevation view of one end of a piston and piston rod assembly of a shock absorber, in accordance with an embodiment. More particularly, FIG. 8A shows an embodiment having a separate valve body 805A and 805B corresponding to each of a rebound shim set 810 and a compression shim set 815, respectively, where a pilot spool 820 (performing, in one embodiment, similarly to the pilot spool 210 of FIGS. 1-7 described herein) alternately opens one area (e.g., 825A [similar to function to annulus 60]) while closing the other area (e.g., 825B [similar in function to annulus 60]). Of note, FIG. 8A shows a "hard/soft configuration". For example, during compression, the area 825A and area 825B experience obstruction by a portion of the pilot spool 820, thereby creating a soft compression. During the rebound, the area 825A and area 825B are open to fluid flow, thereby creating a firm rebound. Thus, there would be a high amount of pressure experienced during rebound. However, for compression, the pressure is low, but there is no bleed. FIG. 8B shows a "hard/hard configuration" (a firm compression and a firm rebound), in accordance with an embodiment.

FIGS. 9-13 depicts a cross-sectional side elevation view of the base valve assembly of detail 2 of FIG. 1B, including a "latching solenoid", in accordance with an embodiment. Embodiments further provide, in brief and as will be described below, a low-power bi-state electronic damper. The low-power bi-state electronic damper uses a latching solenoid to open and close a pressure-balanced pilot spool. Given the latching configuration of the solenoid, power is required only to open or close but not to hold in it in either setting, in accordance with an embodiment. The result is low power consumption.

Additionally, a further embodiment provides an externally-adjustable means of tuning the open state of the damper. There is an adjuster that can be turned in or out to vary the effective orifice size of the pilot spool when in the open position. This will allow the rider to adjust the soft setting of the damper to his/her preference.

Figure 9:
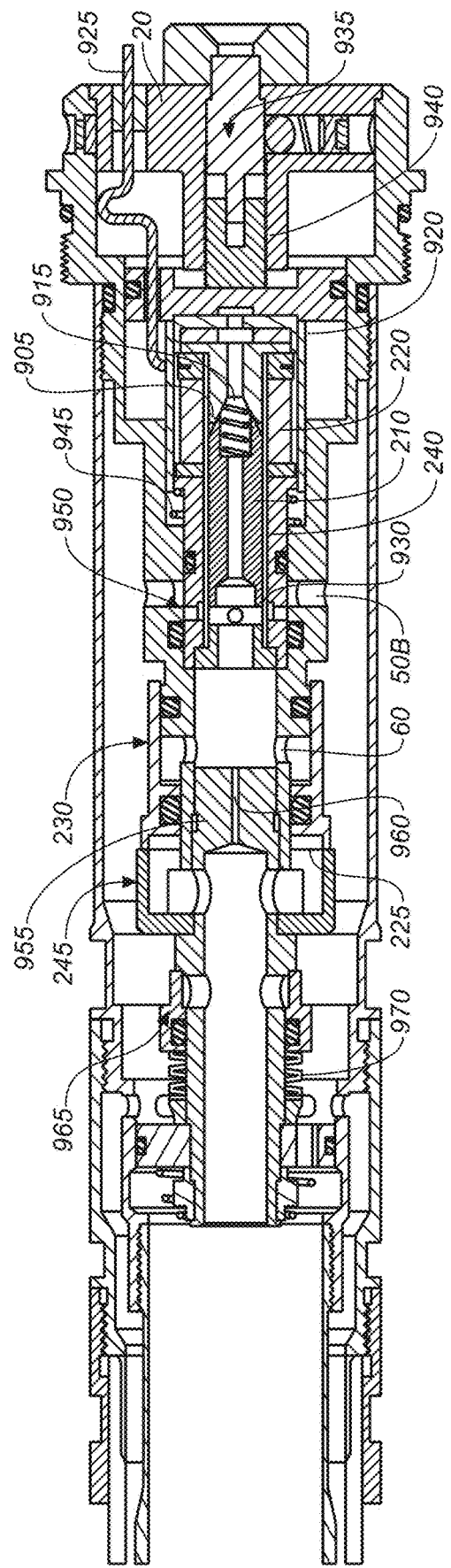

With reference now to FIG. 9, the latching solenoid 905 primarily uses power to facilitate a change in position of the pilot spool 210 relative to the coil 220 but requires little or no power to maintain the pilot spool 210 in the desired position once that is achieved. In one embodiment, the latching solenoid assembly 905 (or latching spool valve assembly) includes: a pilot spool 210 which includes a magnetically active material; a spring 915 which is normally in compression and biases the pilot spool 210 toward a position obstructing port 60; a permanent magnet 920; and a coil 220 where power is supplied to the coil 220 by (in one embodiment) wires 925. The aforementioned components may be contained within a housing 240 or "cartridge" as shown.

The pilot spool valve assembly (including at least the pilot spool 210 and the metering edge 930 of the pilot spool 210) regulates damping fluid flow through a portion of the damper and adjusts the force applied to the valve shims 225 by the valve body 230 through ports 60. In one embodiment, the position of the spool valve assembly may be adjusted axially by means of the low speed adjuster 935. The low speed adjuster 935 (comprising multiple pieces), being for example, threaded at its lower end to the top cap 20 via the low speed adjuster threads 940, may be rotated to facilitate axial movement. In one embodiment, the low speed adjuster 935 includes a non-round shape (e.g., hexagonal) that facilitates the rotation with relative axial movement (see 1105 of FIG. 11).

With reference now to FIGS. 9-13, when the lower portion of the low speed adjuster 935 moves downward axially, the cartridge of the pilot spool 210 is correspondingly moved and thereby further compresses the spring 915. As the cartridge is moved downward, the low speed adjuster metering edge 950 is moved into further obstruction of ports 50B, thereby restricting flow of damping fluid through the damper from an interior of the pilot spool valve assembly to an exterior of the damping assembly (note the open ports 50B shown in FIG. 12, in which the pilot spool valve 210 is shown in the open pilot position with the low speed adjuster 935 in the soft position).

In one embodiment, the pilot spool 210 is biased by spring 915 toward a position wherein the metering edge 930 of the pilot spool 210 further obstructs ports 50A (see FIG. 13, wherein the pilot spool 210 is shown in the open pilot position with the low speed adjuster 935 in the middle position). A force opposing the bias of the spring 915 is exerted on the magnetic component of the pilot spool 210 by the permanent magnet 920. When the pilot spool 210 is in its uppermost (corresponding to open ports 50A) position, it is retained by the magnetic force between the permanent magnet 920 and the pilot spool valve 210 where that force is sufficient to overcome the bias of the spring 915 (thereby holding the spring 915 in a compressed state). As such, when the pilot spool valve 210 and ports 50A are in the open position (see FIG. 12), no power input is required to maintain that state.

In one embodiment, when it is desired to close or partially close ports 50A by means of the metering edge 930 of the pilot spool 210, a current is applied to the coil 220 via the wires 925. The current causes a magnetic flux around the coil 220, which acts on the magnetic component of the pilot spool 210 causing the pilot spool 210 to move axially within the cartridge. When the pilot spool 210 has moved a relatively small distance axially away from the permanent magnet 920, the spring 915 bias moves the pilot spool 210 toward closure of ports 50A with little or no additional power input to the coil 220.

Figure 10:
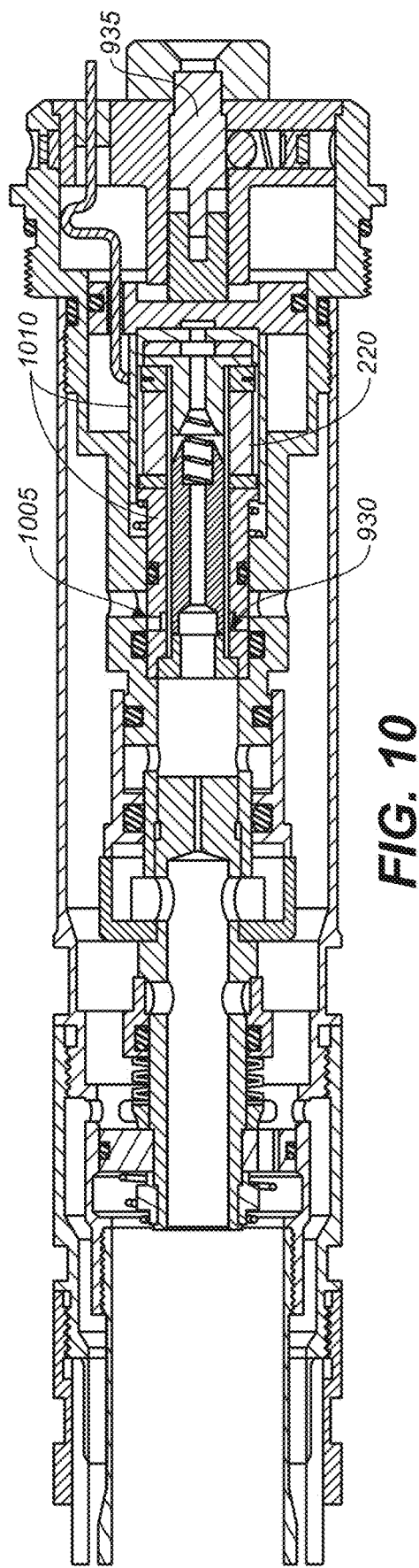
Figure 11:
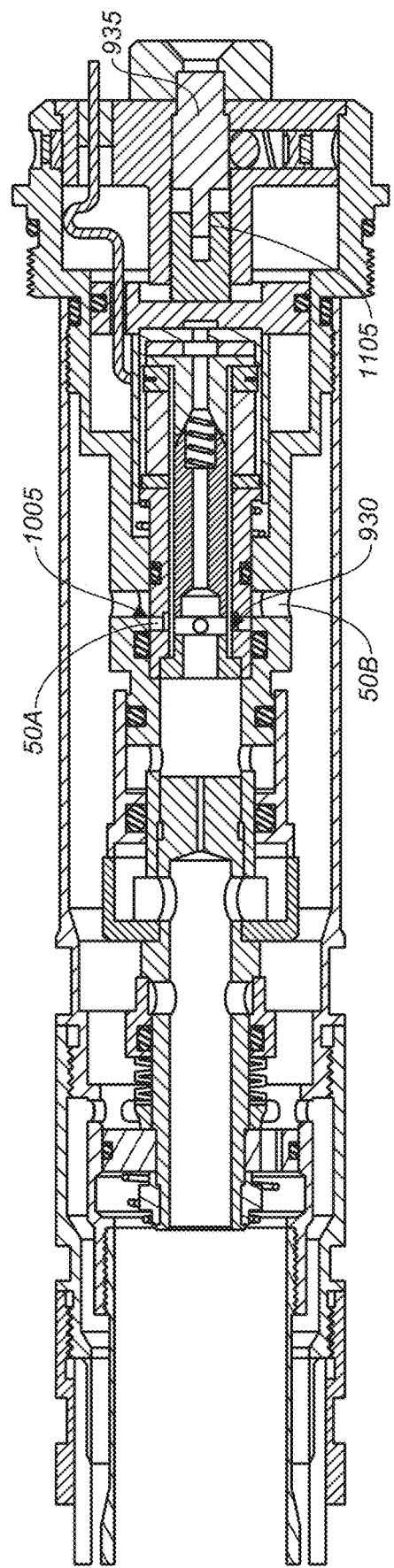

Of note, FIG. 10 shows the pilot spool 210 in the closed pilot position with the low speed adjuster 935 in the firm position. FIG. 11 shows the pilot spool 210 in the open pilot position with the low speed adjuster 935 in the firm position. FIG. 10 additionally shows the low speed adjuster metering edge 1005 and the spool valve assembly housing 1010, in accordance with an embodiment.

FIGS. 9-13 show an orifice block 955 having a tailored orifice 960 there through. The orifice 960 meters low speed damping fluid for low speed bump response of the suspension (when magnitude and rate is insufficient to open the shims). The size of the orifice 960 may be chosen to allow a desired amount or range of pressure to be applied to the valve body 230 through annulus 60 (ports). The use of the pilot spool 210 then further specifies that the pressure acts on the valve body 230 by modulating the flow restriction "downstream" (during a compression stroke of the suspension) of the orifice 960.

FIGS. 9-13 also show a pressure relief valve 965 or "blow off" valve, which is biased toward a closed position by Bellville spring(s) 970. The pressure relief valve 965 opens in response to an interior damper pressure above a predetermined threshold and thereby prevents damage to the damper and vehicle in the event of rapid pressure build up (usually associated with extreme suspension compression rate). The pressure relief valve 965 may have an adjustable threshold value (in one embodiment, by modification of the compression in the Bellville spring 970).

Figure 14:
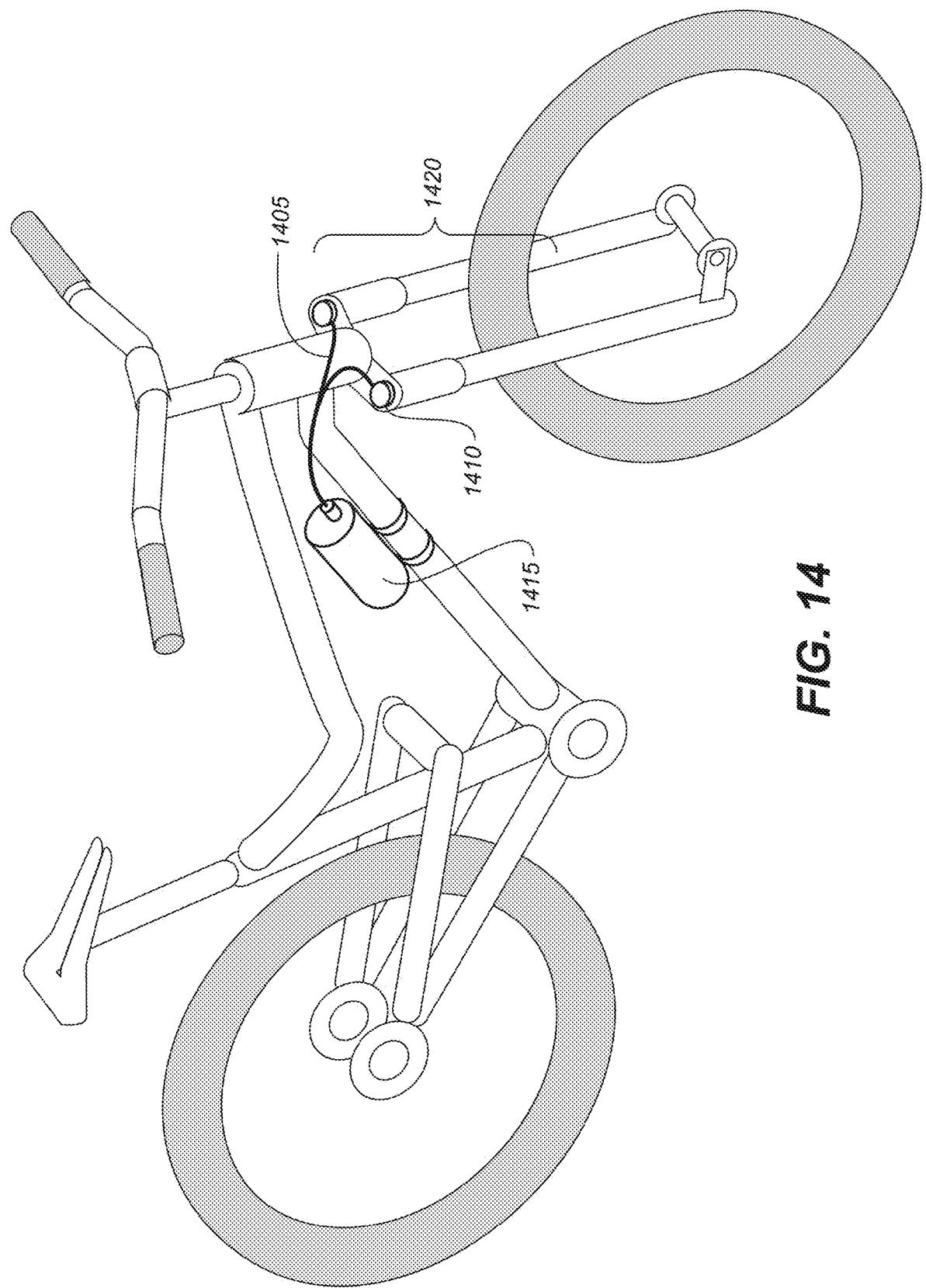
FIG. 14 depicts an arrangement of an embodiment on an example vehicle, in accordance with an embodiment.

FIG. 14 shows a bicycle 1405, in accordance with an embodiment, having attached thereto a vehicle suspension damper 1410 and a set of sensors 1415. The vehicle suspension damper 1410, in this particular embodiment, is located within the front fork 1420 and the rear shock of the bicycle 1405. The set of sensors 1415 is configured for sensing a type of vehicle motion, such as tilt (e.g., roll and pitch), acceleration, velocity, position, etc. Further, the set of sensors 1415 may be positioned anywhere on the vehicle that enables the receipt of accurate sensed information and which enables communication of a control signal (regarding the sensed information) to the vehicle suspension damper 1410.

For example, in one embodiment, if the set of sensors 1415 senses that the vehicle is experiencing acceleration, the set of sensors 1415 sends a control signal to the vehicle suspension damper 1410.

Figure 15:
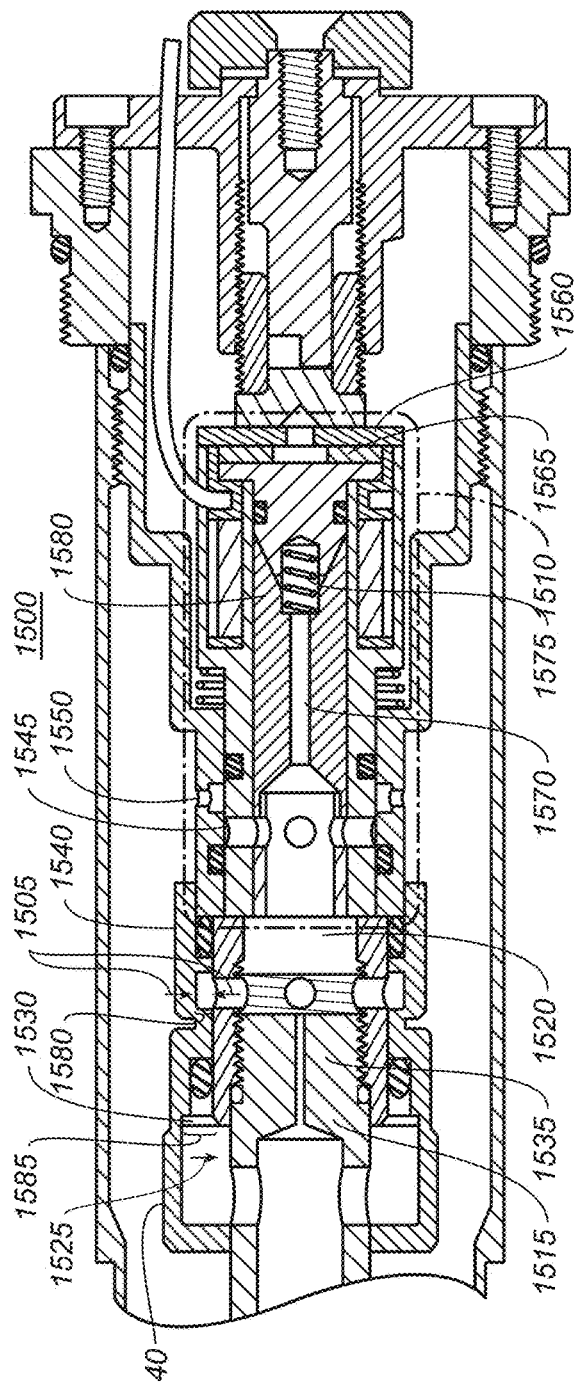
FIG. 15 depicts an example electronic valve of a vehicle suspension damper, in accordance with an embodiment.

FIG. 15 shows the electronic valve 1500 of vehicle suspension damper 1410, in accordance with an embodiment. The electronic valve 1500 includes at least a primary valve 1505, a first pressure reducing means which in this embodiment is an orifice block 1515, and a second pressure reducing means which in this embodiment is a pilot valve assembly 1510, all of which components cooperatively control the flow of fluid throughout the inertia valve and manipulate the fluid pressure within the pilot pressure chamber 1520.

In basic operation, the permanent magnet 1560 of the solenoid assembly 1580 conducts through the component 1565 to attract the pilot spool 1570. This is the latched position as shown. The spool spring 1575 resists this condition. When the coil is turned on with positive polarity, it cancels the effect of the permanent magnet 1560 and the spool spring 1575 moves the pilot spool 1570 to the left or closed position. With negative polarity applied to the coil, the electromagnet is added to the permanent magnet 1560 and the pilot spool 1570 is drawn to the right or open position.

The main oil flow path, or first fluid flow path, is through the center of the base valve and radially outwardly into piston port area 1525. Assuming there is enough pressure in the piston ports, it then blows off the valve shims 1530 and oil flows into the reservoir 40. A small amount of oil also flows in parallel through a second fluid flow path in the electronic valve 1500 (also called an inertia valve), and in particular through the control orifice 1535 and through the solenoid assembly 1580. This generates a pilot pressure inside the area of the primary valve 1505.

The valve member 1540 acts to resist the valve shims 1530 from opening. This resistive force is dependent on pressure inside the area of the primary valve 1505 which is controlled by the pressure drop across the solenoid. Basically, when the solenoid is closed, there is high pressure inside the area of the primary valve 1505 (resulting in locked-out fork or firm damping, depending on the damping characteristics determined for the electronic valve 1500, as described in greater detail below). When the solenoid is in an open position, there is low pressure inside the area of the primary valve 1505 and the valve member 1540 pushes against valve shims 1530 with less force, allowing the valve shims 1530 to open under lower fluid pressure. This open position of the solenoid provides a normally-operating fork, by which is meant the damping characteristic of the inertia valve is determined predominantly by the tuning of the valve shims 1530 (although there is some damping effect provided by the control orifice 1535).

A more particular description follows. A control signal (a.k.a., activation signal 1720 of FIG. 17) instructs the vehicle suspension damper 1410 to increase or decrease its damping force therein. The vehicle suspension damper 1410 is configured to respond to the control signal instruction. More particularly, the inertia valve 1500 of the vehicle suspension damper 1410, in response to the control signal instruction, quickly manipulates the pressure in the pilot pressure chamber 1520 of the inertia valve 1500 by moving/adjusting the pilot valve assembly 1510 to at least partially close or open the flow ports 1550. The pressure in the pilot pressure chamber 1520 increases or decreases in proportion to the amount of closure or opening that the flow ports 1550 experience, respectively.

In general, in embodiments, fluid in the inertia valve 1500 flows along a first fluid flow path from the damping cylinder interior 35 and through the shims 1530 (unless the shims 1530 are held closed under pressure from the valve member 1540, as will be described herein) via the piston port area 1525. Additionally, fluid also flows along a second fluid flow path from the damping cylinder interior 35 and through the control orifice 1535 of the orifice block 1515. After having flowed through the control orifice 1535, the fluid moves into the pilot pressure chamber 1520. From the pilot pressure chamber 1520, the fluid moves out of the pilot spool valve 1545 (wherein the pilot spool valve 1545 is in at least a partially open position) through a set of flow ports 1550 and into the reservoir 40. Additionally, from the pilot pressure chamber 1520, the fluid also moves into the area of the primary valve 1505. When the fluid presents a predetermined pressure against surface 1580 of the valve member 1540, a force proportional to the pressure is exerted on the valve member 1540 which urges it against the shims 1530. The valve member 1540 pushes against the shims 1530, thereby biasing the shims 1530 toward a closed position, even though fluid is moving through the shims 1530 from the piston port area 1525 and into the reservoir 40. If the force of the valve member 1540 against the shims 1530 is greater than the force of the fluid moving from the piston port area 1525 against the shims 1530, then the shims 1530 will become biased toward closing. Likewise, if the force of the fluid moving from the piston port area 1525 against the shims 1530 is greater than the force of the valve member 1540 against the shims 1530, then the shims 1530 will be biased toward an open position, in which the fluid may remain flowing through the shims 1530.

During compression of the shock absorber, in order to change the fluid pressure within the pilot pressure chamber 1520 in quick response to changes in the vehicle's position and speed (and components thereof), for example, embodiments use a control system to receive control signals from the set of sensors 1415. In accordance with the control signals received from the set of sensors 1415, the control system activates a power source that is attached to the electronic valve. The power source delivers a current to the electronic valve. The electronic valve responds to the delivered current by causing the pilot valve assembly 1510 to move and block or open at least a portion of the flow ports 1550 through which fluid may flow there through from the pilot pressure chamber 1520 and into the reservoir 40, thereby at least partially closing or opening the flow parts 1550.

In general, upon compression of the shock absorber, the damper piston 5 moves into the damper cylinder interior 35. More particularly, when the flow ports 1550 are at least partially closed, the fluid pressure within the pilot pressure chamber 1520 increases such that the fluid pressure in the area of the primary valve 1505 also increases. This increase in the fluid pressure in the area of the primary valve 1505 causes the valve member 1540 to move toward the shims 1530 that are open and to push against the shims 1530, thereby causing the shims 1530 to at least partially or fully close. When these shims 1530 are at least partially or fully closed, the amount of fluid flowing there through decreases or stops. The movement of the damper piston 5 into the damper cylinder interior 35 causes fluid to flow through the piston port area 1525 and hence out through open shims 1530 and into the reservoir 40. The fluid also flows through the control orifice 1535 into the pilot pressure chamber 1520. If the shims 1530 are closed due to movement of the pilot valve assembly 1510 to block the flow ports 1550, then fluid may not flow out through the shims 1530 or out through the flow ports 1550 into the reservoir 40. Consequently, the ability of the damper piston 5 to move within the damper cylinder interior 35 to cause fluid to flow through the piston port area 1525 as well as through the flow ports 1550 is reduced or eliminated. The effect of the at least partial closure of the shims 1530 is to cause a damping function to occur. Thus, the movement of the pilot valve assembly 1510 to at least partially block the flow ports 1550 causes the damping (or slowing of movement) of the damper piston 5 into the damper cylinder interior 35.

In various embodiments, the control orifice 1535 operates cooperatively with the pilot valve assembly 1510 to meter the flow of fluid to the primary valve 1505. The control orifice 1535 is a pathway within the orifice block 1515 and is positioned between the damper cylinder interior 35 and the pilot pressure chamber 1520. The size of the control orifice 1535 is tunable according to the application; the size may be variously changed. The control orifice 1535 is a key component in enabling the quick and accurate response to sensed changes in a vehicle's motion. As will be explained herein, without the presence of the control orifice 1535, the vehicle would not experience damping during periods of low compression speed, or experienced too much damping during periods of high compression speeds. The pilot valve assembly 1510 would act like a bypass. In other words, without the control orifice, at low compression speed there would almost be no damping and the control orifice 1535 and pilot valve assembly 1510 would act like a bypass; but at higher compression speeds, pressure drop across the pilot valve assembly 1510 would cause a high pressure in the pilot pressure chamber 1520 and therefore too much clamping force on the shims 1530. The control orifice 1535, thus, allows damping to occur even during periods of low compression speed, and slows the damping rate during periods of high compression speed.

In this particular embodiment, it was discovered that (without the control orifice 1535) if the area of the primary valve is approximately 60% or more of the piston port area 1525, the valve member 1540 is hydraulically locked (at all speeds) onto the shims 1530. This led to undesirable high damping force at high compression speeds. Although in this particular embodiment the hydraulic lock occurred at about 60% area ratio and higher, this may not be true in all cases: there may be arrangements where a lock occurs at a higher or lower ratio than 60%, or where no lock occurs at all at any ratio. It is expected that that the particular ratio will be dependent on design parameters such as the valve shim arrangement and main piston design.

The solution is to cause a pressure drop of damping fluid before it enters the pilot pressure chamber 1520. This is achieved with the control orifice 1535. The control orifice 1535 provides some damping effect at low compression speeds (by enabling damping fluid to 'bleed' through the control orifice), but at high compression speeds provides a significant pressure drop to ensure that the pressure inside the pilot pressure chamber does not get too high, thereby preventing the valve member 1540 from locking onto the shims 1530.

In its present form, the control orifice 1535 is between 0.5 mm and 2 mm in diameter, but these sizes are dependent on the specific application and the desired damping curve. Pressure drop is directly proportional to the length of the control orifice 1535, but inversely proportional to its diameter. Either one or both of these parameters can be changed at the design stage to affect the performance of the control orifice 1535.

The essential function, in embodiments, of the control orifice 1535 is to create a pressure drop. Therefore, anything that will do this could be used in place of the specific arrangement shown. Some possible examples include, but are not limited to: a diffuser; a labyrinth between parallel plates; and leakage past a screw thread.

A further key feature of embodiments is the combination of the area of the surface 1580 inside the valve member 1540, the control orifice 1535, the pilot valve assembly 1510, and the way this combination enables a variable force to be applied to the shims 1530 to control the damping force at any point in time.

In particular, the ratio of the surface area 1585 of the shims 1530 (The surface area 1585 is next to the piston port area 1525; the pressure is acting on the surface area 1585 of the shims 1530 as well as the surface area 1580 of the inside of the valve member 1540, within the primary valve area 1505) to the surface area 1580 inside the valve member 1540 controls the overall damping characteristic of the electronic valve 1500, i.e., what overall range of force can be applied to the shims 1530. By selecting this ratio appropriately, the valve member 1540 can be set up to move between full lockout and a completely soft state, or between a firm damping state and a soft state, for example.

Within that overall range of force, a particular force at any point in time is set by the position of the pilot valve assembly 1510, which, as explained above, controls the pressure drop across the flow ports 1550. By adjusting the pressure drop across flow ports 1550, the pressure of fluid in the pilot pressure chamber 1520 is also adjusted. Since the pressure inside the pilot pressure chamber 1520 acts against surface 1580 of the valve member 1540, the force applied by the valve member 1540 to the shims is controllable by adjustment of the position of the pilot valve assembly 1510.

It should be noted that the overall resistance to fluid flow along the first fluid flow path (i.e. through piston port area 1525 and past shims 1530) is given by the sum of the force provided by the shims 1530, and the force applied to the shims 1530 by the valve member 1540.

A significant feature is that force is generated on the valve member 1540 by control of pressure inside the area of the primary valve 1505 (in contrast to other valve bodies where force comes from pressure acting on the outside of the valve member 1540, usually from the damper reservoir). The ultimate source of pressure in the pilot pressure chamber 1520 is the pressure of the damping fluid in the main damping cylinder 35 during compression (but regulated by the control orifice 1535 and the pilot valve assembly 1510 to give a lower pressure in the pilot pressure chamber 1520).

There are significant advantages to the combination of the ratio of the area of the surface 1580 to the area of the piston port 1525, control orifice 1535, and the pilot valve assembly 1510. Some of them are as follows: 1) the damping force generated by electronic valve 1500 is not temperature sensitive; 2) the damping force generated by electronic valve 1500 is not position sensitive; 3) when using an electromechanical inertia device to control the pilot valve assembly 1510, the damping force can be turned on and off very quickly (recent experiments achieved 4 ms between full firm and full soft—to the best of the applicant's knowledge and belief the fastest time for turning on and off of damping force in other devices is 20 ms. The reason such fast speeds are achieved is because, when the pressure in the pilot pressure chamber 1520 is released, it is the pressure in the main damper (which is the same as the fluid pressure in the piston port area 1525) that pushes on the shims 1530 and moves the primary valve 1505 back (which can happen very quickly). This is in contrast to other arrangements that rely on an electric motor to move a valve body, for example, which takes more time; 4) using a latching solenoid pilot valve enables full firm state to be maintained with no power; 5) the pilot valve assembly 1510 enables very large damping forces to be controlled using the same pilot valve assembly 1510—this is because: (a) the pilot pressure is 'magnified' according to the ratio of the area of the primary valve 1505 to the area of the piston port 1525; and (b) because the pilot valve assembly 1510 is not required to move any element against the high pressure damping fluid; and 5) the primary valve assembly 1510 allows the damper to utilize conventional shims, but with some level of controllability over the damping force applied by the shims. This allows the shims to be tuned in a conventional manner. Furthermore, if power to the pilot valve assembly 1510 fails, the shock absorber will continue to operate (in contrast to other electronically controlled shocks where power loss causes the shock to stop working completely).

Thus, the electronic valve 1500, including the primary valve 1505, the pilot valve assembly 1510, and the orifice block 1515, not only enables a variable force to be applied to shims 1530, but also enables the control of the damping force within the vehicle at any point in time. The pilot valve assembly 1510 meters a flow of fluid to the primary valve 1505 and enables the generation of relatively large damping forces by a relatively small solenoid (or other motive source), while using relatively low amounts of power.

Furthermore, since the incompressible fluid inside of the primary valve 1505 of the shock absorber assembly causes damping to occur as the primary valve 1505 opens and the valve member 1540 collapses, embodiments enable both a controllable preload on the shims 1530 and a controllable damping rate. In one embodiment, and particularly in four-wheeled vehicles, the solenoid continuously powers the inertia valve and does not have a latching mechanism. In one embodiment, a monitor will continuously monitor a power source and its operation in order to make sure that the wires leading to the power source do not get cut, thereby providing a dangerous situation for the rider and other vehicles.

In regards to the area of the primary valve 1505, although it is shown as an internal base valve, it is not limited to this position or application. For example, it can be mounted externally of the vehicle suspension damper (for example in a 'piggy-back' reservoir). Further, it could be made part of the main damper piston (either in compression or rebound directions).

In considering the design of the control orifice 1535, it must have at least the following two functions: provision of low speed bleed; and provision of sufficient pressure drop at high speed to prevent hydraulic lock of the valve member 1540 onto the shims 1530. The general methodology for determining the diameter and/or length of the control orifice 1535 during design is as follows: (1) identify the desired damping curve that the damper should have; (2) determine from step (1) the target low speed damping force; (3) determine from step (1) the target high speed damping force; (4) make informed guess at control orifice diameter and/or length to achieve steps (2) and (3); (5) test the output damping forces produced by shock at different speeds within low to high speed range; (6) compare the measured damping curve against the desired damping curve; (7) if there is too much high speed damping force, then reduce the diameter of the control orifice (to lower the pressure inside the pilot pressure chamber 1520); (8) if there is too much low speed damping force, then decrease the area ratio (between the area of the primary valve 1505 and the piston port area 1525), and increase the diameter of the control orifice 1535; and (9) repeat steps (5)-(8) until a good approximate to a desired damping curve is obtained. It is to be noted that in steps (7) and (8) the length of the control orifice can also be adjusted, either separately or in addition to the diameter, to achieve a similar effect.

Figure 16A:
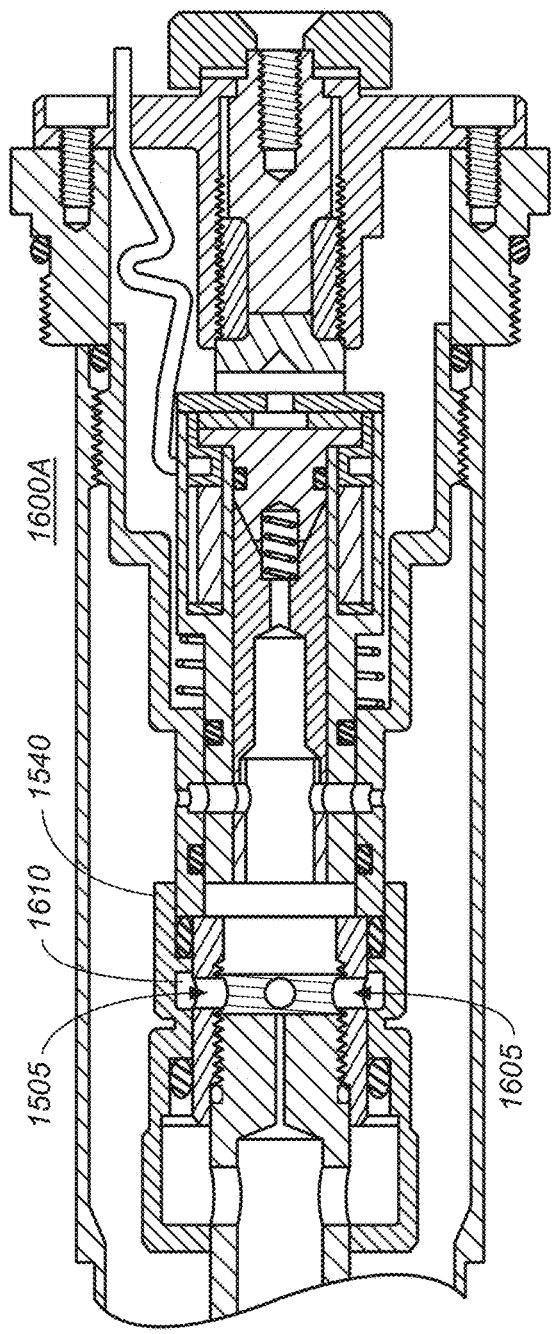

In various embodiments, it was found that the pilot valve assembly 1510 would "auto-close" at a certain oil high flow rate. In one embodiment, a diffuser pin inserted into the vehicle suspension damper downstream of the control orifice 1535 is used to eliminate this auto-closing issue. FIG. 16A shows an electronic valve 1600A with a diffuser pin 1605 positioned through one set of the cross holes 1610 going to the primary valve area 1505, in accordance with an embodiment. Another set of holes remains (normal to the page) to feed oil to the valve member 1540. The diffuser pin 1605 functions to disrupt the jet flow coming out of the control orifice 1535. FIG. 16B shows an electronic valve 1600B with a diffuser plug 1620 pressed into, at least one of and at least partially, the orifice block 1515 and the pilot pressure chamber 1520, in accordance with an embodiment. The diffuser plug 1620 also functions to disrupt the jet flow coming out of the control orifice 1535. FIG. 16C shows an electronic valve 1600C with a diffuser pin 1630, in accordance with an embodiment. In this embodiment, the spool retainer 1635 (see FIG. 16B) is replaced with the diffuser pin 1630. The diffuser pin 1630 and its position within the vehicle suspension damper 1600C functions to disrupt the jet flow coming out of the control orifice 1535 and to minimize the contact of the pilot spool assembly 1510 in the firm setting.

In another embodiment, the solenoid includes a "latching" mechanism to open and close the pressure-balanced pilot spool. Due to the latching configuration of the solenoid, power is only required to open or close the pilot valve assembly 1510. Power is not required to hold the pilot valve assembly 1510 open or closed in either setting. Consequently, embodiments enable reduced power consumption compared to the traditional shock absorber.

Further embodiments provide an externally-adjustable means of tuning the open state of the damper. An adjuster turns in or out to vary the effective orifice size of the pilot spool valve 1545 when in the open position. This allows the rider to adjust the soft setting of the damper to his preference.

In the embodiment described above in conjunction with FIGS. 14 and 15, it is to be noted that, whilst preferred, the use of a valve shims 1530 is optional. Instead, it would be possible for the valve member 1540 to act directly on the fluid flow ports 1525. In fact, valve shims are optional in any such embodiment described herein where it would be possible for the valve member 1540 (or any other similar valve member described herein) to act directly on the fluid flow ports that control the main flow through the valve assembly.

With reference again to FIGS. 14 and 15, it should be again noted that the set of sensors 1415 may be positioned in various locations on various types of vehicles. For example, in one embodiment, the set of sensors 1415 is positioned on the seat post of a bicycle. In another embodiment, a first set of sensors is positioned near the front wheel, while a second set of sensors is positioned near the rear wheel.

In various embodiments, the set of sensors includes three accelerometers. The accelerometers define a plane of the vehicle's body, such that the acceleration, and in other embodiments, the acceleration and the tilt (i.e., pitch and roll), of the vehicle body may be measured. When the set of sensors senses vehicle motion, the set of sensors sends a control signal to the control system attached to the vehicle suspension damper. The control system determines if the sensed vehicle motion meet and/or exceeds a predetermined threshold. The predetermined threshold may be a constant in one embodiment. However, in another embodiment, the predetermined threshold may be a variable based on other situations sensed at the vehicle. Once a control signal is received by the power source, the power source that is attached to the vehicle suspension damper becomes activated. Upon activation, the power source sends a current to the vehicle suspension damper, thereby causing the pilot valve assembly to move, as is described herein. Various methods of sensing via accelerometers and other forms of motion via sensors are known in the art.

As described herein, the vehicle upon which a set of sensors and a vehicle suspension damper is attached may be a multi-wheeled vehicle, such as, but not limited to, a bicycle, a side-by-side, a snowmobile, a car, a truck, etc. In one embodiment, more than one set of sensors may be used, such as the non-limiting example of a side-by-side vehicle (e.g., recreational off-highway vehicle [ROV]). For example, each wheel base (e.g., four) may include an embodiment of the system of the present technology. More specifically, each wheel base has attached thereto a different set of sensors, such as a set of accelerometers, each set being attached to a separate vehicle suspension damper. In another embodiment, one set of sensors (e.g., set of accelerometers) is attached to the ROV, as well as being attached to one or more vehicle suspension dampers.

If the ROV is traveling along a path that does not have any bumps or uneven terrain, then the vehicle suspension dampers may each be programmed to operate in a fully open mode (i.e., soft mode), in which the pilot spool valve 1545 of the pilot valve assembly 1510 is open to the flow ports 1550, thereby allowing fluid to flow from the damper cylinder interior 35 and into the reservoir 40 either through the first fluid flow path, with resistance provided by the shims 1530 (and no additional force provided by the valve member 1540), and/or through the control orifice 1535 that permits low speed bleed of damping fluid via the second fluid flow path. Thus, for example, when the right front tire of an ROV hits a large rock, the right front tire and a portion of the suspension attached to the tire (or attached wheel base) may rise upwards to move over the rock. The set of sensors attached to the ROV's right front side will sense the tire's upward movement, and will sense the tire reaching its peak upward movement (the peak of the rock), and will sense the tire beginning to move downwards. In one embodiment, the set of sensors on the ROV's right front side would send control signals to the vehicle suspension damper attached to the ROV's right front side throughout the tire's movement upward and downward. The control system attached to the vehicle suspension damper receives the control signals and causes the power source also attached to the vehicle suspension damper to deliver a current to the vehicle suspension damper in accordance with the control signals. In one embodiment, the delivered current functions to cause the pilot valve assembly 1510 to move to cause the flow ports 1550 to be at least partially blocked. As described herein, the pressure within the pilot pressure chamber 1520 increases due to the at least partially blocked flowports 1550, thereby causing the pressure within the area of the primary valve 1505 to increase. The valve member 1540, in response to increased pressure in the area of the primary valve 1505, is urged against the shims 1530, thereby changing the damping characteristics of the shims 1530. Thus, the fluid flowing along the first fluid flow path from the damper cylinder interior 35 and through the piston port area 1525 is reduced, resulting in placing the vehicle suspension damper in a firm damping setting.

Embodiments provide a significant advantage over conventional shock absorber systems. In conventional mechanical inertia valves, an inertia valve senses a pressure wave (occurring at the speed of sound) after a vehicle's tire hits a bump. The inertia valve opens in response to receiving the pressure wave. However, the vehicle rider still experiences some form of response to the terrain before the inertia valve has a chance to open into a "soft" mode. In contrast, embodiments of the present technology use an electronic valve attached to accelerometers; the electronic valve opens into a "soft" mode before a motion significant enough for a vehicle rider to experience the motion has begun. For example, when a wheel motion occurs, such as an ROV wheel base beginning to move upward while running over a large rock, the wheel base experiences an upward acceleration. This acceleration is measured by embodiments. Before the wheels' velocity and/or displacement can be or is measured, embodiments send a control signal from a set of accelerometers that communicate the acceleration values of the wheel to a control system that is connected (wire or wirelessly) to the electronic valve. The set of accelerometers are positioned to measure the acceleration experienced by the wheel base. These acceleration signals are sent at the beginning of the wheel's ascent over the rock. The electronic valve is opened into a soft mode in response to receiving the signals from the set of accelerometers. The soft mode is initiated before the wheel experiences such a large acceleration upwards that the vehicle rider feels a reaction to the wheel's motion through the vehicle's frame. Unlike conventional damping systems, embodiments enable a quick response to a sensed acceleration of a vehicle wheel such that an acceleration of a vehicle frame due to the movement of the vehicle wheel may be reduced or prevented. It should be appreciated that one or more set of sensors may be attached to each ROV wheel base, and independently control the vehicle suspension damper to account for and respond to various rolls and other types of vehicle motion.

In one embodiment, one or more motion sensors are provided on a forward or front part of a vehicle, and a signal or signals from the one or more motion sensors is used to control a vehicle suspension damper mounted on a rear part of the vehicle. In use, motion information learned from the movement of the front part of the vehicle can be used to anticipate movement of the rear part of the vehicle, and adjustments may be made to control the damper on the rear part accordingly.

Thus, one embodiment enables the control of both compression and the rebound state of the vehicle suspension damper, such that acceleration at the vehicle frame is maintained as close to zero as possible throughout off-road riding and over varied terrain, regardless of the acceleration being experienced at the vehicle's wheel.

In another embodiment and as noted herein, more than one type of sensor is used. For example and not limited to such example, an accelerometer and a gyrometer may be used. Further, the set of control signals sent to the control system may include, but are not limited to the following values: acceleration values; tilt (e.g., pitch, roll) values; and velocity values. It should also be noted that numerous methods for determining orientation in a plane in space using a sensor attached to an object are well known in the art. Thus, according to some embodiments, the adjustment of the vehicle compression dampers to a desired state, based on a comparison of the measured signal values with a database of threshold values, enables the reduction of the tilt of a vehicle's frame.

Example System for Controlling Vehicle Motion

Figure 17:
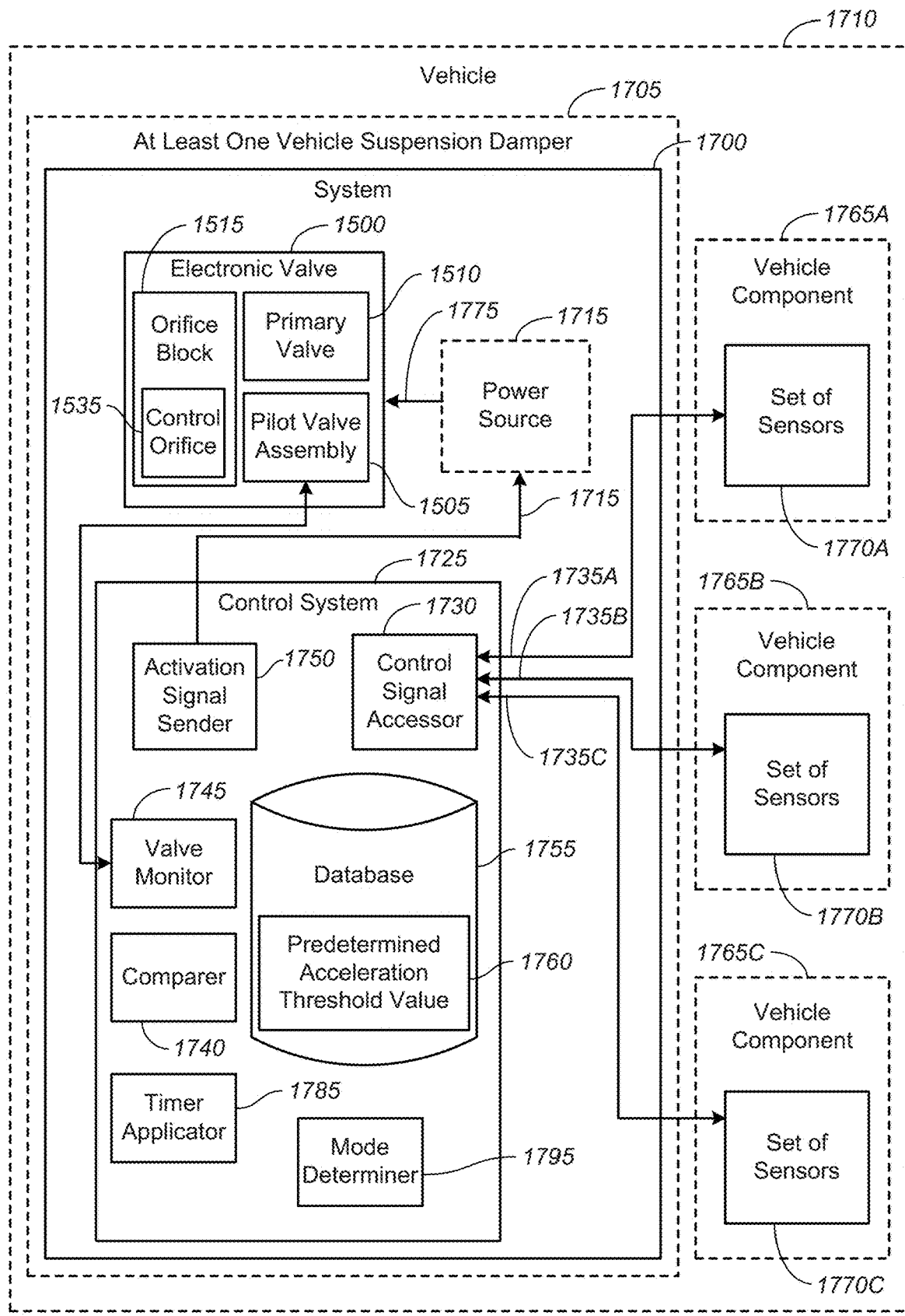
FIG. 17 is an example block diagram of a system 1700 for controlling vehicle motion, in accordance with embodiments.

FIG. 17 is an example block diagram of a system 1700 for controlling vehicle motion, in accordance with embodiments. The system 1700, in various embodiments and as will be described herein below in the section "Example Methods of Use", is used to detect and control bump events, front and rear link events, rebound stoke detection events, power detection events, and rebound damping adjustment events. In embodiments, the system includes a control system 1725 and an electronic valve 1500. As will be described herein, the control system 1725 includes: a control signal accessor 1730; a comparer 1740; a pilot valve assembly monitor 1745; and an activation signal sender 1750. The electronic valve 1500 is shown to include: a pilot valve assembly 1505; a primary valve 1510; and an orifice block 1515 comprising a control orifice 1535. In one embodiment, the control system 1725 may be located on a custom PCB with surface mount components. The control system 1725 may be miniaturized such that it is small enough to be packaged in bicycle forks and shocks. In one embodiment, the control system 1725 may be packaged in the fork steer tube. It should be appreciated that the control system 1725 may be packaged and positioned on the vehicle in any manner that leaves sufficient frame clearance for riding the vehicle.

In one embodiment, the control signal accessor 1730 accesses a set of control signals 1735 (shown herein to be control signals 1735A, 1735B and 1735C), wherein at least one control signal (for example, control signal 1735B) of the set of control signals 1735 includes an acceleration value corresponding to a movement of a vehicle component 1765B of the vehicle 1710. It should be appreciated that in one embodiment, the control signal accessor 1730 may retrieve control signals from a set of sensors, such as the set of sensors 1770B. However, in another embodiment, the control signal accessor 1730 may receive control signals from a set of sensors. It should also be appreciated that the set of sensors may include as many accelerometers that are necessary to measure the acceleration (including tilt) of the vehicle component. For example, in one embodiment, each bicycle wheel has a MEMS accelerometer oriented such that the sensing axis is aligned with the wheel path during the compression of the bicycle's vehicle suspension damper. For wheels that have a non-linear path (as in most rear suspensions), the sensing axis is aligned with the direction of wheel travel at the ride height. The term "ride height" is used to refer to a position of the vehicle frame, taking into account the rider's weight, which accommodates an approximate vehicle suspension damper position being intermediate of a fully extended position and a fully compressed position, such that the natural position of the vehicle suspension damper is in the middle of its stroke. In this beginning position, if and when the wheel experiences varied terrain, and thus experiences acceleration, the vehicle suspension damper responds by adjusting to a compressed and/or expanded position.

In one embodiment, the pilot valve assembly monitor 1745 monitors a state of at least one pilot valve assembly (such as pilot valve assembly 1505) within at least one vehicle suspension damper (such as vehicle suspension damper 1705) attached to the vehicle 1710. The "state" refers to the open, partially open, or closed position of the pilot valve assembly 1505. The state of the pilot valve assembly 1505 influences (or controls) a damping force within the vehicle suspension damper 1705. In one embodiment, the pilot valve assembly monitor 1745 monitors the state of the at least one pilot valve assembly by following the control logic of prior instructions given to the pilot valve assembly. For example, the last instruction given by the control system 1725 may have been to open the pilot valve assembly 1505. Thus, the pilot valve assembly monitor 1745 would know that the state of the pilot valve assembly 1505 is "open". In another embodiment, if the control system 1725 has yet to give state instructions to the pilot valve assembly 1505, then the control system is preprogrammed to consider the pilot valve assembly 1505 to be in a defaulted state, such as, in one example, in a "firm" mode (fully or partially closed). In yet another embodiment, if the control system 1725 has yet to give state instructions to the pilot valve assembly 1505, then the control system 1725 causes the solenoid to retract, placing the vehicle suspension damper in the soft mode. In yet another embodiment, the pilot valve assembly monitor 1745 cooperates with a one or more sensors configured to sense the state of the pilot valve assembly 1505.

In one embodiment, the comparer 1740 compares the acceleration value to a predetermined acceleration threshold value corresponding to the vehicle component 1765B. In one embodiment, the predetermined acceleration threshold value appears in the database 1755. In one embodiment, the control system 1725 includes the database 1755. However, in another embodiment the database 1755 resides external to and accessible by the control system 1725. Among other information, the database 1755 stores one or more (a set of) predetermined acceleration threshold values (including tilt threshold values [e.g., roll and pitch]) that correspond to various vehicle components of the vehicle 1710.

In one embodiment, linked to each of the predetermined acceleration threshold values and stored at a database, such as database 1755, are instructions that direct the control system 1725 to determine whether a measured acceleration value associated with a vehicle component exceeds the predetermined acceleration threshold value for the vehicle component. The following is a non-limiting example. While a bicycle's front wheel begins to run over a rock, accelerometers that are attached to a bicycle's front wheel base send a control signal to the control system, indicating an acceleration value, "A", associated with the front wheel. The comparer 1740 compares this acceleration value, "A", with the predetermined acceleration threshold value, "B", stored in the database 1755. The database 1755 indicates therein that if the acceleration value "A" exceeds the predetermined acceleration threshold value, "B", and if the pilot valve assembly 1505 is found to be closed, then the control system 1725 is to send a particular activation signal 1720 to the power source 1715 such that the power source sends a current of "C" amperes to the pilot valve assembly 1505. The pilot valve assembly 1505 opens, thereby decreasing damping forces provided in the pilot pressure chamber. In one embodiment, the vehicle suspension damper is set to a default position of "firm" (or closed).

Thus, linked to each predetermined acceleration threshold value corresponding to a particular vehicle component are instructions that direct the control system 1725 to send immediately, not send, or delay in sending an activation signal 1715 depending on various determined factors. These factors include whether the predetermined acceleration threshold value was found to be exceeded and the current state of the pilot valve assembly (e.g., open or closed).

In one embodiment, the activation signal sender 1750, based on the comparing performed by the comparer 1740 and the monitoring performed by the pilot valve assembly monitor 1745, sends an activation signal 1720 to a power source 1715 of the vehicle suspension damper 1705. The activation signal 1720 activates the power source 1715 to deliver a current 1775 to the pilot valve assembly 1505. Wherein, once the current 1775 is delivered, the pilot valve assembly 1505 adjusts to a desired state. The desired state of the pilot valve assembly 1505 is configured to adjust the damping force within the vehicle suspension damper 1705 to ultimately reduce an acceleration of the frame of the vehicle. By the term "reduce", it is meant that the acceleration of the vehicle's frame is brought closer to zero via the adjustment in the damping force within the vehicle suspension damper.

For example, the control system 1725 may determine that the measured acceleration value "A" exceeds the predetermined acceleration threshold value "B" and that the pilot valve assembly 1505 is in a closed state. The instructions of the database 1755 direct the control system 1725 to enable the pilot valve assembly 1505 to fully open to lessen the damping force in the pilot pressure chamber 1520 within the vehicle suspension damper 1705 by sending an activation signal 1715 to the power source that directs the power source 1715 to send a current of "D" amperes to the pilot valve assembly 1505, thereby causing the pilot valve assembly 1505 to fully open.

One implementation of an embodiment uses a latching solenoid to control the pilot valve assembly 1505. As described herein, the latching solenoid only requires power to change a state; no power is required to maintain a state. In order to provide the latching solenoid with the minimum amount of energy required to actuate, such that there is no wasted energy, the battery voltage (i.e., power source 1715) is periodically measured. The measured value is used to provide a Pulse Width Modulated ("PWM") signal to the latching solenoid to ensure that it gets the same resultant applied voltage while the battery drains during use.

As described herein, the control system 1725 monitors the state of the pilot valve assembly 1505, and only sends an activation signal 1715 (e.g., a pulse to actuate) if the pilot valve assembly 1505 is not in the desired state. For example, a pulse is not sent if the pilot valve assembly 1505 is already found to be open.

Optionally, the control system 1725 may also include any of the following: a timer applicator 1785; and a mode determiner 1795. Further, in various embodiments, detection events are user configurable, such that upon detection of the detection event, the control system 1725 causes the pilot valve assembly 1505 to adjust to an open, partially open, or closed position. A user may configure the triggers that ultimately cause the pilot valve assembly 1505 to open or close based on variables such as, but not limited to, power (torque, RPM), cadence, sitting on the vehicle, standing on the vehicle, speed, and a GPS reading.

The timer applicator 1785, in one embodiment, sets a timer upon the opening of a pilot valve assembly 1505. When the timer expires, the control system 1725 will cause the pilot valve assembly 1505 to close. As will be explained below, the timer applicator 1785 functions at particular preprogrammed times during various event detections. In one example of the implementation of the time applicator 1785, when a bicycle runs over a bump with sufficient magnitude (preprogrammed magnitude) that the pilot valve assembly 1505 opens, the pilot valve assembly 1505 then stays open for a certain amount of preprogrammed time. When this timer expires, the pilot valve assembly 1505 will close. However, if during the time that the pilot valve assembly 1505 is open, the bicycle hits another bump of a sufficient magnitude that the control system 1725 would normally cause the pilot valve assembly 1505 to open, then the control system 1725 resets the timer such that the time will run for a preprogrammed amount of time. Thus, if the bicycle is going downhill on a really bumpy ground, it is possibly that the timer may be continually resetting and the pilot valve assembly 1505 remains open throughout the downhill ride. However, in embodiments, the system 1700, including the control system 1725 and the electronic valve 1500, is fast enough such that if the time does expire, the control system 1725 is able to reset the vehicle suspension damper to a former mode setting. Then, if the bicycle then hits another bump, the control system 1725 will cause the pilot valve assembly 1505 to open up fast enough such that the rider is prevented from receiving a rigid shock.

It should be appreciated, and as will be described herein below, the control system is user configurable. A user may set the control system to respond to terrain changes according to a particular riding scenario, such as, but not limited to: climbing; trail riding; and descending. The control system is further configurable to respond to bumps, freefalls, and power input by the rider (e.g., torque, cadence, and speed).

As described above, in various embodiments, the control system 1725 may be configured to operate in one of at least three modes: climb mode; trail mode; and descend mode. The vehicle suspension damper 1705 enables the user to select a particular mode of operation via user input mechanisms known in the art (e.g., buttons, switches [on the vehicle handlebar], voice activation, etc.). The mode determiner 1795 determines under what system mode the control system 1725 is operating (e.g., climb, trail, and descend).

According to embodiments, when the two-wheeled vehicle is in the climb mode, the vehicle suspension damper is in a firmer setting. Typically, but not always, the vehicle suspension damper is experiencing a full lock-out and is fully closed.

When the two-wheeled vehicle is in the descend mode, the vehicle suspension damper is in a softer setting and the control system 1725 has been inactivated.

When the two-wheeled vehicle is in the trail mode, the vehicle suspension damper is nominally firm with the vehicle suspension damper automatically switching to a soft setting in response to receiving acceleration inputs at each wheel. In one embodiment, the vehicle has at least one light mechanism (e.g., LEDs) on the handlebars (for example, one light each for the front and back vehicle suspension damper), configured to indicate when the pilot valve assembly 1505 is open and thus in the soft mode by showing patterns of light (e.g., on, off, blinking, dull, bright, varying colors).

Examples of when a user may want the vehicle suspension damper in the firm setting and locked out is when the user is climbing up a fire road or maybe sprinting to a finish line. In these scenarios, the user does not want the soft suspension or the possibility of vehicle suspension damper switching to a softer mode. Examples of when a user may want the vehicle suspension damper to be in a soft setting and open are when the user is dirt jumping or going downhill.

While in the trail mode, a method of operation, according to embodiments described below, detects a bump, and automatically (without user input) switches the vehicle suspension damper 1705 to a soft (or softer) setting.

While examples discussed herein utilize a bicycle, it would be appreciated that these examples are non-limiting, and other two-wheeled vehicles may be described in place of a "bicycle".

In one embodiment, the novel control system(s) described herein are integrated into an existing vehicle's control unit or stands alongside the exiting control unit to achieve a complete system. In one embodiment, the novel control system(s) are enabled to use sensors that are already attached to a vehicle. Additionally, in one embodiment, the novel control system(s) and/or the attached electronic valve as discussed herein, is enabled to cooperatively function with existing passive position-sensitive systems (e.g., 4.4 By-Pass™, FORD SVT™).

Additionally, the novel control system(s) described herein may be packaged in several different shock absorber platforms such that multiple performance levels may be achieved at varying price points. For example, the novel control systems may be packaged in a vehicle suspension damper only capable of compression. In another example, and novel control systems may be packed in a twin tube, which is capable of compression and rebound.

In one embodiment, the control system 1725 is programmable. In one embodiment, data within the control system 1725 may be adjusted via an input/output device 2220 and display device 2218 (see FIG. 22).

Example Methods of Use—For Two-Wheeled Vehicles

With reference to FIGS. 18, 19, 20 and 21, the flow diagrams thereof illustrate example methods 1800, 1900, 2000 and 2100 used by various embodiments. The flow diagrams include methods 1800, 1900, 2000 and 2100 and operations thereof that, in various embodiments, are carried out by one or more processors (e.g., processor(s) 2206 of FIG. 22) under the control of computer-readable and computer-executable instructions. It is appreciated that in some embodiments, the one or more processors may be in physically separate locations or electronic devices/computing systems. The computer-readable and computer-executable instructions reside, for example, in tangible data storage features such as volatile memory, non-volatile memory, and/or a data storage unit (see e.g., 2208, 2210, and 2212 of FIG. 22). The computer-readable and computer-executable instructions can also reside on any tangible computer-readable media such as a hard disk drive, floppy disk, magnetic tape, Compact Disc, Digital versatile Disc, and the like. In some embodiments, the computer-readable storage media is non-transitory. The computer-readable and computer-executable instructions, which may reside on computer-readable storage media, are used to control or operate in conjunction with, for example, one or more components of a control system 1725, a user's electronic computing device or user interface thereof, and/or one or more of processors 2206. When executed by one or more computer systems or portion(s) thereof, such as a processor, the computer-readable instructions cause the computer system(s) to perform operations described by the methods of flow diagrams 1800, 1900, 2000 and 2100.

Although specific procedures are disclosed in methods 1800, 1900, 2000 and 2100 of the flow diagrams, such procedures are examples. That is, embodiments are well suited to performing various other operations or variations of the operations recited in the processes of flow diagrams.

Likewise, in some embodiments, the operations of the methods 1800, 1900, 2000 and 2100 in the flow diagrams may be performed in an order different than presented, not all of the operations described in one or more of these flow diagrams may be performed, and/or more additional operations may be added.

The following discussion sets forth in detail the operation of some example methods of operation of embodiments. With reference to FIGS. 18, 19, 20 and 21, a flow diagrams illustrate example methods 1800, 1900, 2000 and 2100 used by various embodiments. The flow diagrams include some steps that, in various embodiments, are carried out by a processor under the control of computer-readable and computer-executable instructions. In this fashion, steps described herein and in conjunction with the flow chart are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks", and optical disks, any or all of which may be employed with control system 1725. Although specific steps are disclosed in methods 1800, 1900, 2000 and 2100 on the flow diagrams (in FIGS. 18, 19, 20 and 21), such steps are examples. That is, embodiments are well suited to performing various other steps or variations of the steps recited in methods 1800, 1900, 2000 and 2100. Likewise, in some embodiments, the steps in methods 1800, 1900, 2000 and 2100 may be performed in an order different than presented and/or not all of the steps described in the methods 1800, 1900, 2000 and 2100 may be performed. It is further appreciated that steps described in the methods 1800, 1900, 2000 and 2100 may be implemented in hardware, or a combination of hardware with firmware and/or software.

Example Methods for Controlling Vehicle Motion—In Two-Wheeled Vehicle

Various embodiments enable the detection of and response to events experienced by the vehicle, such as, but not limited to, bump detection events, power detection events, rebound stroke detection event, front and rear link events, and rebound damping adjustment events. Below is a description of embodiments configured for responding to the aforementioned detected events.

Bump Detection Event

Detecting bumps on the ground requires filtering out rider input. Acceleration that is measured at a vehicle's wheels (the acceleration being the result of rider input [e.g., standing, pedaling inputs, etc.]) is in the opposite direction as accelerations resulting from ground input. Thus, since the two accelerations are so different, the rider's input may easily be filtered out, thereby enabling the detection of bumps on the ground during a bicycle ride.

Embodiments include user configurable settings (via, for example, buttons and switches on the handlebar) for establishing minimum bump magnitudes required to cause the vehicle suspension damper 1705 to change to a soft damping setting. The rider is able to adjust the magnitude of the bump detection for different scenarios. For example, if the rider wants to go very fast, or is standing on his bicycle, then the rider probably wants firmer g thresholds, which means that the rider will set the g thresholds to be high. However, if the user is sitting on the bicycle's seat, or riding downhill, then the rider probably wants softer g thresholds, which means the rider will set the g thresholds to be low.

Figure 18:
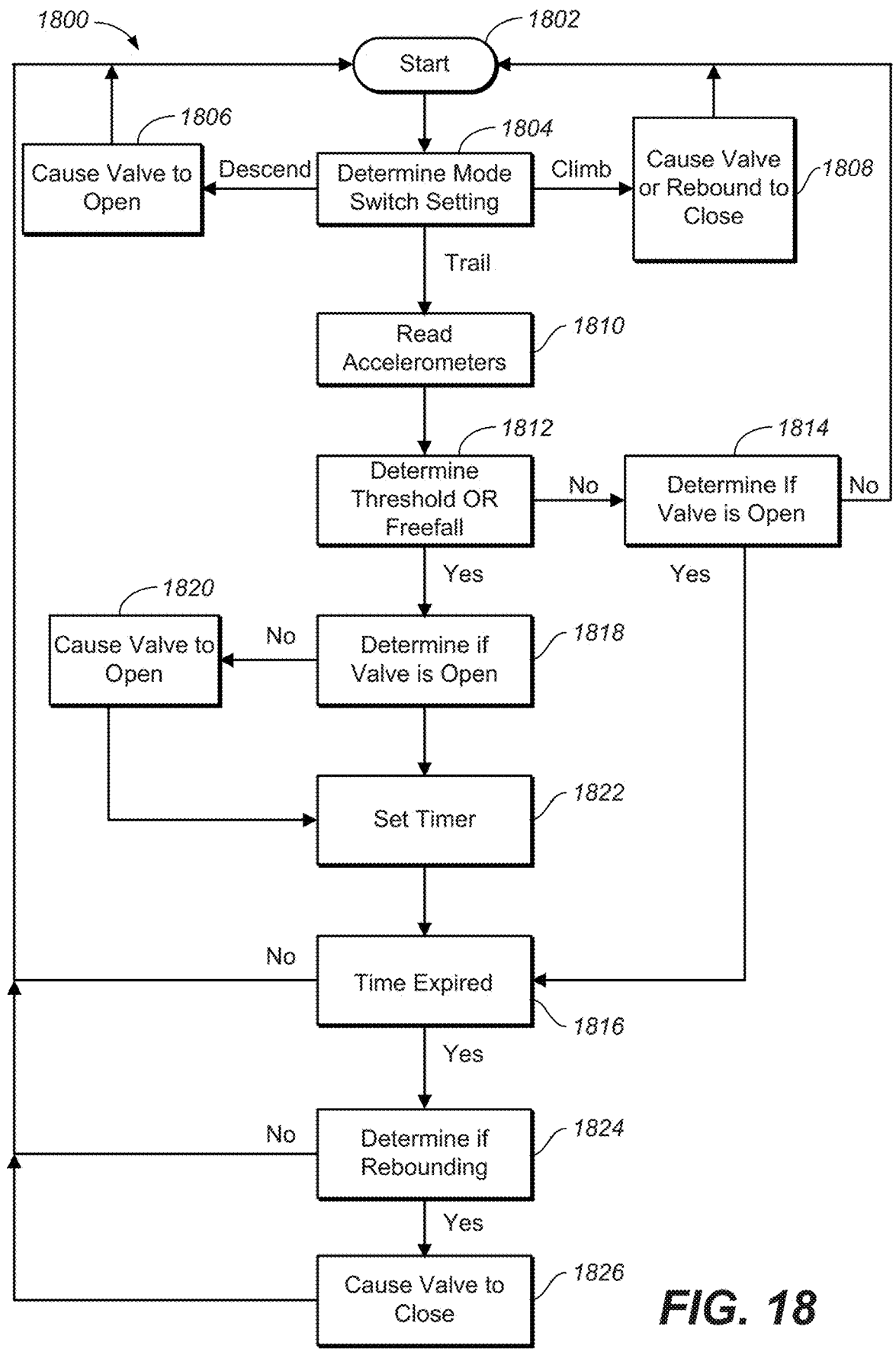
FIG. 18 is a flow diagram of a method 1800 for controlling vehicle motion, in accordance with embodiments.
Figure 19:
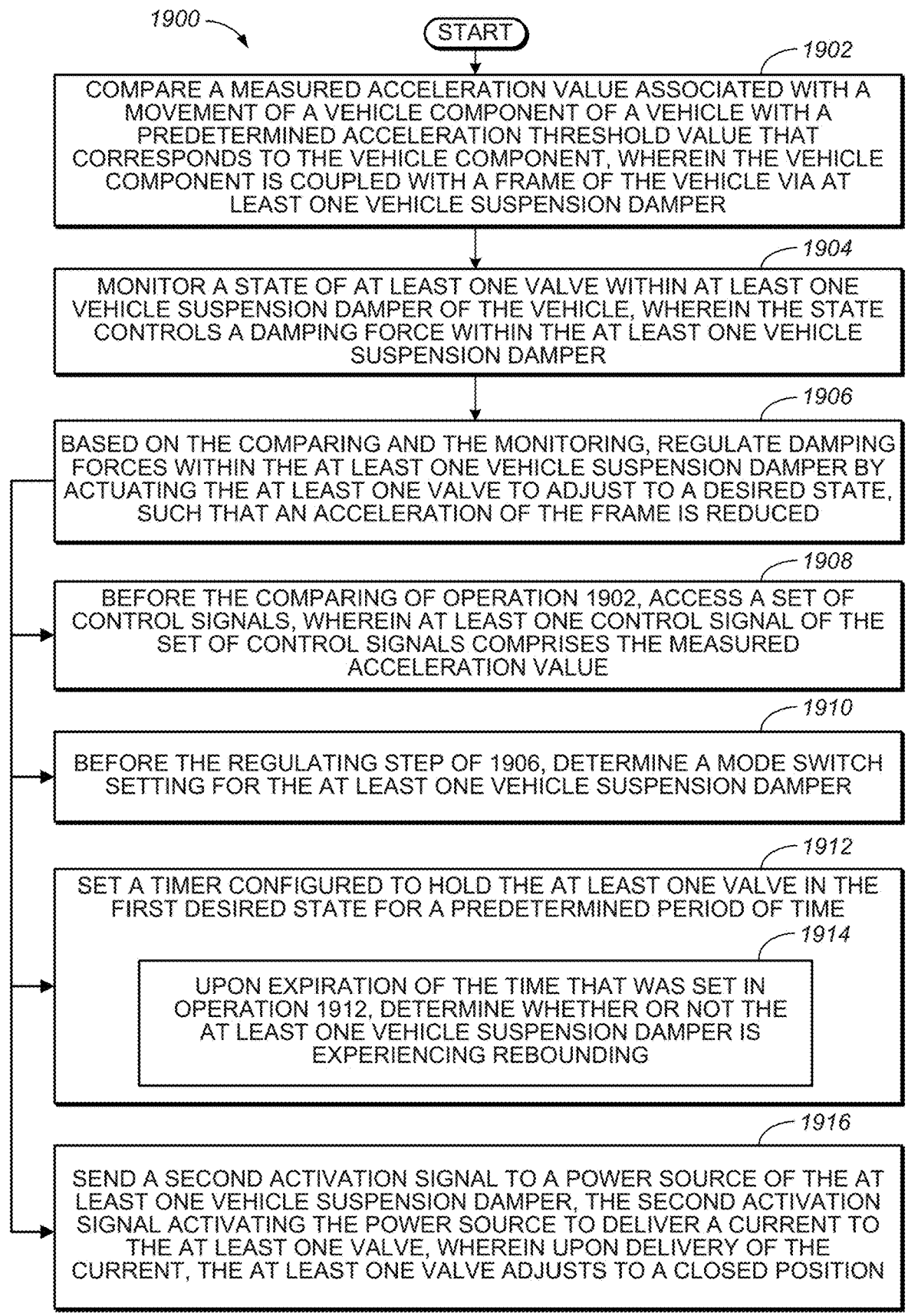
FIG. 19 is a flow diagram of a method 1900 for controlling vehicle motion, in accordance with various embodiments.

Following is a discussion of FIGS. 18 and 19, flow diagrams for methods for controlling vehicle motion, in accordance with embodiments, and relating to bump detection events. FIG. 18 describes a method 1800 of an operation of control system 1725 before, during and after a bump is or is not detected (e.g., a vehicle riding over a bump). FIG. 19 follows with a description of a method 1900 of detecting a bump and the response thereto, in accordance with embodiments. Reference will be made to elements of FIGS. 15 and 17 to facilitate the explanation of the operations of the methods of flow diagrams 1800 and 1900. In some embodiments, the method of flow diagrams 1800 and 1900 describe a use of or instructions for operation of control system 1725.

With reference now to FIG. 18, at operation 1802, the method starts.

At operation 1804, in one embodiment, a mode of a vehicle suspension damper is determined. For example, mode determiner 1795 of the control system 1725 determines that the vehicle suspension damper 1705 is in the descend mode. If the vehicle suspension damper is determined to be in the descend mode, the method 1900 then moves to operation 1806.

At operation 1806, in one embodiment, the control system 1725 opens the pilot valve assembly 1505. The operation 1800 then returns to start 1802.

At operation 1804, if the mode determiner 1795 determines that the vehicle suspension damper 1705 is in the climb mode, then the method 1800 moves to operation 1808. At operation 1808, in one embodiment, the control system 1725 causes the pilot valve assembly 1505 to close or, the rebound to close. The method 1800 then returns to start 1802.

At operation 1804, in one embodiment, the control system 1725 determines that the vehicle suspension damper 1705 is in the trail mode. The method 1800 moves to operation 1810. At operation 1810, in one embodiment, the control system 1725 reads accelerometers. In one embodiment, reading the accelerometers entails the control system 1725 accessing a set of control signals 1735, wherein the set of control signals 1735 includes at least one measured acceleration value corresponding to a movement of the vehicle component, such as vehicle component 1765B, of the vehicle 1710. It should be appreciated that in one embodiment, the term, "accessing" refers to the control system 1725 retrieving the set of control signals 1735 from the set of sensors 1770. However, in another embodiment, the term accessing refers to the control system 1725 receiving the set of control signals 1735 from the set of sensors. The method 1800 moves to operation 1812.

At operation 1812, in one embodiment, the control system 1725 determines if the measured acceleration value is greater than the predetermined acceleration threshold value OR if the vehicle component 1765 is experiencing free-fall. Of note, according to an embodiment, the set of sensors may include sensors that are configured to detect acceleration independent of the orientation of the sensor. The sensor can detect if the vehicle component is experiencing a zero g—the vehicle component is in free-fall. In one embodiment, if the control system 1725 determines that a vehicle component is experiencing a zero-g for a preprogrammed number of seconds (e.g., more than 10 ms) (using a timer that is preprogrammed to expire and run out after 10 ms has elapsed), then the control system 1725 causes the pilot valve assembly 1505 to open up into the soft mode, providing a nice cushioned landing for the bicycle. Thus, according to embodiments, it is not necessarily true that the pilot valve assembly 1505 will open up when a bicycle hits a little crest, as a set timer will prevent such opening.

At operation 1812, in one embodiment, if the control valve 1725 finds that the measured acceleration value is less than the predetermined acceleration threshold value AND the vehicle component 1765 is not experiencing free-fall, then the method 1800 moves to operation 1814. At operation 1814, in one embodiment, the control system 1725 determines if the pilot valve assembly 1505 is open. If the control system 1725 determines that the pilot valve assembly 1505 is not open, the method 1800 returns to the start 1802. However, if the control system 1725 determines that the pilot valve assembly 1505 is open, then the method 1800 moves to operation 1816.

At operation 1812, if the control system 1725 determines that EITHER the acceleration value is greater than the predetermined acceleration threshold value 1760 OR a free-fall is detected, then the method 1800 moves to operation 1918. At operation 1818, in one embodiment, the control system 1725 determines if the pilot valve assembly 1505 is open. If the control system 1725 determines that the pilot valve assembly 1505 is not open, the method 1800 moves to operation 1820.

Since a significant bump will most likely follow a free-fall event, at operation 1820, in one embodiment, the control system 1725 will cause the pilot valve assembly 1505 to open. Thus, if the pilot valve assembly 1505 is found to be closed, in one embodiment, the activation signal sender 1750 will send an activation signal 1720 to the power source 1715 to cause the power source 1715 to deliver a current 1775 to the pilot valve assembly 1505, thereby causing the pilot valve assembly 1505 to open. Of note, a free-fall event is treated like a bump event for the purposes of actuating a latching solenoid of the pilot valve assembly and resetting the timer. After the control system 1725 causes the pilot valve assembly 1505 to be opened, the method 1800 moves to operation 1822.

At operation 1818, in one embodiment, if the control system 1725 finds that the pilot valve assembly 1725 is open, then the method 1800 moves to operation 1822.

At operation 1822, in one embodiment, the control system 1725 sets a timer for the pilot valve assembly 1505 to remain open. In one embodiment, a timer applicator 1785 of the control system 1725 sets the timer according to predetermined instructions. The predetermined instructions are pre-programmed by the user and/or are factory settings. The method 1800 then moves to operation 1816.

At operation 1816, in one embodiment, the control system 1725 determines if the timer that was set at operation 1822 has expired. If the control system 1725 determines that the timer has expired, then the method 1800 moves to operation 1824. At operation 1816, in one embodiment, if the control system 1725 determines that the timer has not expired, then the method 1800 returns to the start 1802.

At operation 1824, in one embodiment, the control system 1725 determines if rebounding is occurring. If the control system 1725 determines that rebounding is occurring, then the method 1800 moves to operation 1826. At operation 1824, in one embodiment, if the control system 1725 determines that rebounding is not occurring, then the method 1800 returns to start 1802.

At operation 1826, in one embodiment, the control system 1725 causes the pilot valve assembly 1505 to close. The method 1800 then returns to start 1802.

With reference now to FIG. 19, at operation 1902, in one embodiment and as described herein, a measured acceleration value associated with a movement of a vehicle component 1765 of a vehicle 1710 is compared with a predetermined acceleration threshold value that corresponds to the vehicle component 1765, wherein the vehicle component 1765 is coupled with a frame of the vehicle 1710 via at least one vehicle suspension damper 1705.

At operation 1904, in one embodiment and as described herein, a state of at least one valve within the at least one vehicle suspension damper 1705 of the vehicle 1710 is monitored, wherein the state controls a damping force within the at least one vehicle suspension damper 1705. In various embodiments, the at least one valve includes any of the following: a pilot valve assembly 1510 (also considered to be a valve); a pilot spool valve 1545 of the pilot valve assembly 1510; a primary valve 1505; a valve member 1540; and a flapper valve 2600 (see FIG. 26). A pilot valve assembly 1510, a pilot spool valve 1545 of the pilot valve assembly 1510, a primary valve 1505, a valve member 1540, and a flapper valve, incorporated in the electronic valve 1500 of the vehicle suspension damper 1705 all are enabled to regulate damping forces within the vehicle suspension damper 1705 by opening and closing. When a current is applied to the electronic valve 1500 and components therein, ultimately, these various valves open and close.

At operation 1906, in one embodiment and as described herein, based on the comparing and the monitoring, damping forces within the at least one vehicle suspension damper are regulated by actuating the at least one valve to adjust to a desired state, such that an acceleration of the frame of the vehicle is reduced (i.e., refers to getting closer to zero g's).

At operation 1908, in one embodiment and as described herein, before the comparing of step 1902, a set of control signals are accessed, wherein at least one control signal of the set of control signals comprises the measured acceleration value.

At operation 1910, in one embodiment and as described herein, before the regulating of step 1906, a mode switch setting for the at least one vehicle suspension damper is determined.

At operation 1912, in one embodiment and as described herein, a timer configured to hold the at least one valve in the first desired state for a predetermined period of time is set.

At operation 1914, in one embodiment and as described herein, upon expiration of the timer that was set in operation 1912, it is determined whether or not the at least one vehicle suspension damper is experiencing rebounding.

At operation 1916, in one embodiment and as described herein, a second activation signal is sent to a power source of the at least one vehicle suspension damper, the second activation signal activating the power source to deliver a current to the at least one valve, wherein upon delivery of the current, the at least one valve adjusts to a closed position.

Of note, method 1900 described above enables the detection of the following events, for controlling vehicle motion: a bump detection event as described; a power detection event; a rebound event; a free-fall detection event; and a front and rear linking event.

Power Detection Event

The vehicle suspension damper, in one embodiment, has two sub-modes as it relates to a power detection event mode: high power; and low power. In the high power sub-mode, the method 1900 for detecting bump events is utilized. In the low power mode, the vehicle suspension damper is placed in a soft setting.

In general, in one embodiment, a set of sensors capable of measuring power, torque and cadence are used. When the rider's measured power, torque and cadence is determined to be below a predetermined power threshold value, then the compression damping will be placed in the soft setting (by opening the pilot valve assembly). However, when the rider's measured power, torque and cadence is determined to be above a predetermined power threshold value, then the method 2000 for detecting bumps is used to determine a pilot valve assembly setting for acquiring a desired damping state.

In one embodiment, when the rider's measured power, torque and cadence is determined to be above a predetermined power threshold value, then the compression damping is placed in a firm setting (by closing the pilot valve assembly).

Figure 20:
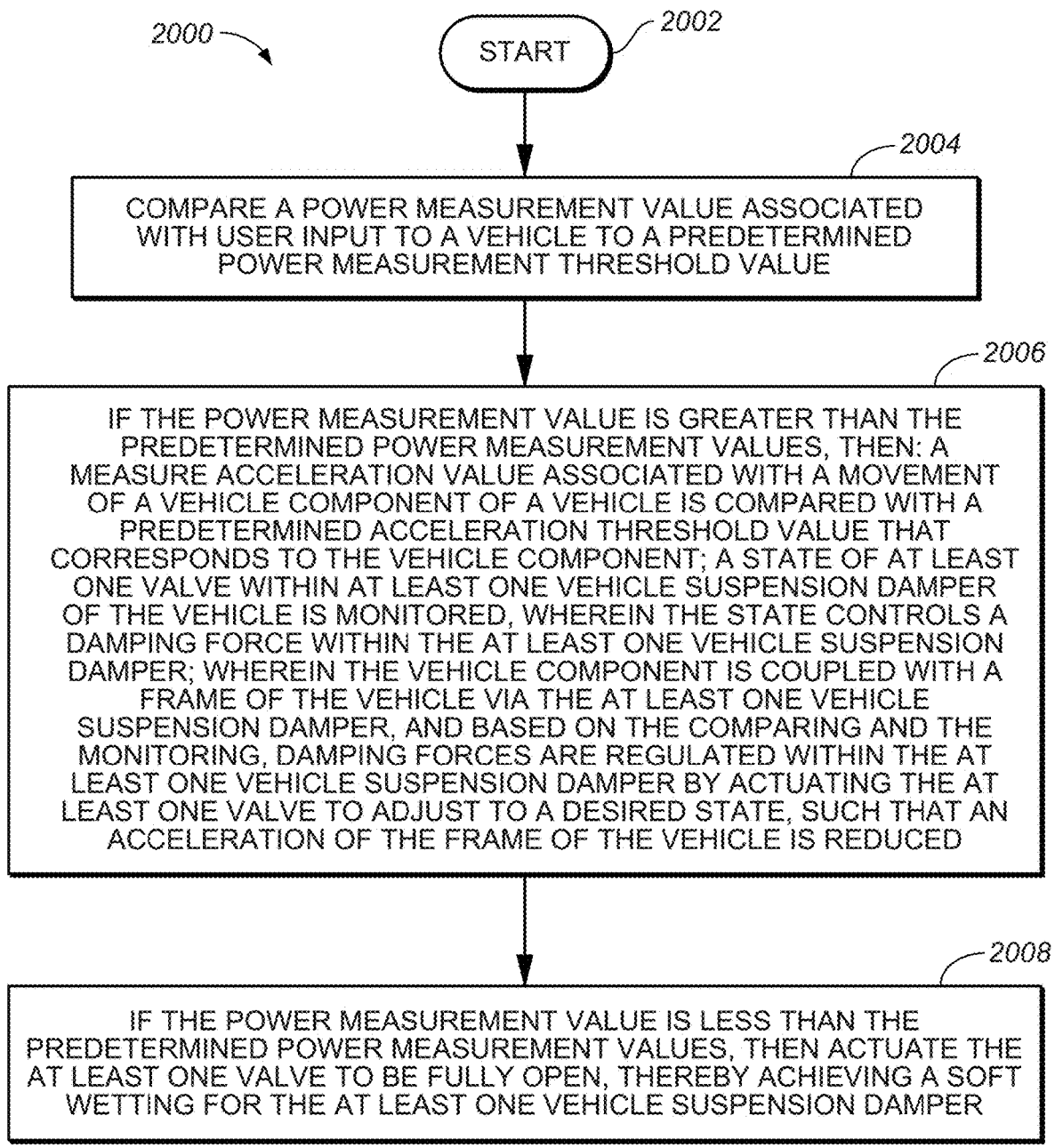
FIG. 20 is a flow diagram of a method 2000 for controlling vehicle motion, in accordance with various embodiments.

Following is a discussion of FIG. 20, a flow diagram for a method 2000 for controlling vehicle motion, in accordance with embodiments, and relating to power detection events. FIG. 20 describes a method 2000 of detecting a power output from a rider and the response thereto, in accordance with embodiments. Reference will be made to elements of FIGS. 15 and 17 to facilitate the explanation of the operations of the methods of flow diagram 2000. In some embodiments, the method of flow diagram 2000 describes a use of or instructions for operation of control system 1725.

With reference now to FIG. 20, at operation 2002, the method 2000 starts.

At operation 2004, in one embodiment, a power measurement value associated with user input to a vehicle is compared to a predetermined power measurement threshold value.

At operation 2006, in one embodiment and as described herein, if the power measurement value is greater than the predetermined power measurement value, then: a measured acceleration value associated with a movement of a vehicle component 1765 of a vehicle 1710 is compared with a predetermined acceleration threshold value that corresponds to the vehicle component 1765; a state of at least one valve within at least one vehicle suspension damper 1705 of the vehicle 1710 is monitored, wherein the state controls a damping force within the at least one vehicle suspension damper 1705; wherein the vehicle component 1765 is coupled with a frame of the vehicle 1710 via the at least one vehicle suspension damper 1705, and based on the comparing and the monitoring, damping forces are regulated within the at least one vehicle suspension damper 1705 by actuating the at least one valve to adjust to a desired state, such that an acceleration of the frame of the vehicle 1710 is reduced.

At operation 2008, in one embodiment and as described herein, if the power measurement value is less than the predetermined power measurement value, then the at least one valve (e.g., pilot valve assembly 1505) is actuated to be fully open, thereby achieving a soft setting for the at least one vehicle suspension damper.

Rebound Stroke Detection Event

In one embodiment, it may be determined if the vehicle suspension damper is in a rebound stroke, by disposing a pressure transducer onto an air spring. The pressure transducer is able to provide an indication of a rebounding stroke by sensing if the pressure is increasing or decreasing (if one is in a compression stroke or a rebound stroke, respectively). Thus, when the pressure transducer indicates a decreasing pressure measurement, it is determined that the vehicle suspension damper is in a rebound stroke. The set of sensors read the pressure transducer's measurements and send control signals to the control system 1725. The control signals indicate that pressure is decreasing in the spring and the bicycle is thus in the rebound stroke. The control system 1725 then causes the vehicle suspension damper 1705 to revert to a firm mode (with a closed pilot valve assembly 1505). Without embodiments, a vehicle suspension damper may revert to the firm mode during a compression stroke with an audible and distracting clicking sound.

Of note, in one embodiment, a set of sensors is attached to the pressure transducer, enabling a set of control signals containing acceleration values associated with a rebound event to be sent to the control system.

Rebound Damping Adjustment Detection Event

The vehicle suspension damper, in one embodiment, has two sub-modes as it relates to the rebound damping adjustment event mode: 1) normal rebound damping; and 2) high rebound damping. In the normal rebound damping sub-mode, the method 1900 of FIG. 19 for controlling vehicle motion relating to bump detection is utilized, as it refers to the trail and descend mode, discussed herein with reference to FIG. 18. In the high rebound damping mode, the method 1900 for detecting bump events is utilized, as it refers to the climb mode, discussed herein with reference to FIG. 18.

Therefore, it should be appreciated that increasing the rebound damping by placing the vehicle suspension damper in a soft mode results in the bicycle riding low in front, which may be preferable when climbing. Of note, rebound damping settings for the trail mode and the descend mode, other than those used in the methods 1800 and 1900 for detecting bump events, may be utilized.

In one embodiment, the rebound adjustment is performed using a stepper motor in the bottom of the bicycle's front fork. However, the exact type of actuator is not critical. Other actuators such as a DC brushed or brushless motor or a peizo motor can be used. The motor turns the rebound adjuster needle in the same manner that a rider would turn the adjuster on a fork with a manual adjuster. The stepper motor provides for discrete adjustments rather than for an opening and a closing of a valve.

In one embodiment, the control system automatically sets the correct amount of rebound damping according to pre-programmed instructions stored thereon, or stored external to the control system (though accessible by the control system). A pressure transducer attached to an air spring is used, in this embodiment, since the correct amount of rebound is dependent on the air spring preload (which is dependent on the rider's weight).

An example follows that shows the advantages of adjusting the vehicle suspension damper upon the determination that a rebound damping adjustment event has occurred. Suppose a bicyclist is climbing a hill and the vehicle suspension damper is in the firm mode and locked-out. In such a firm mode, the bicycle cannot rebound. The bicycle's center of gravity is high; the high center of gravity may cause the bicyclist climbing the hill on his bike to go over the bicycle backwards. So, upon detection of a rebound damping adjustment event, the rebound is softened on the front end of the bicycle, thereby causing the front end of the bicycle to lower. The bicyclist is no longer in danger of going over the bicycle backwards.

Figure 21:
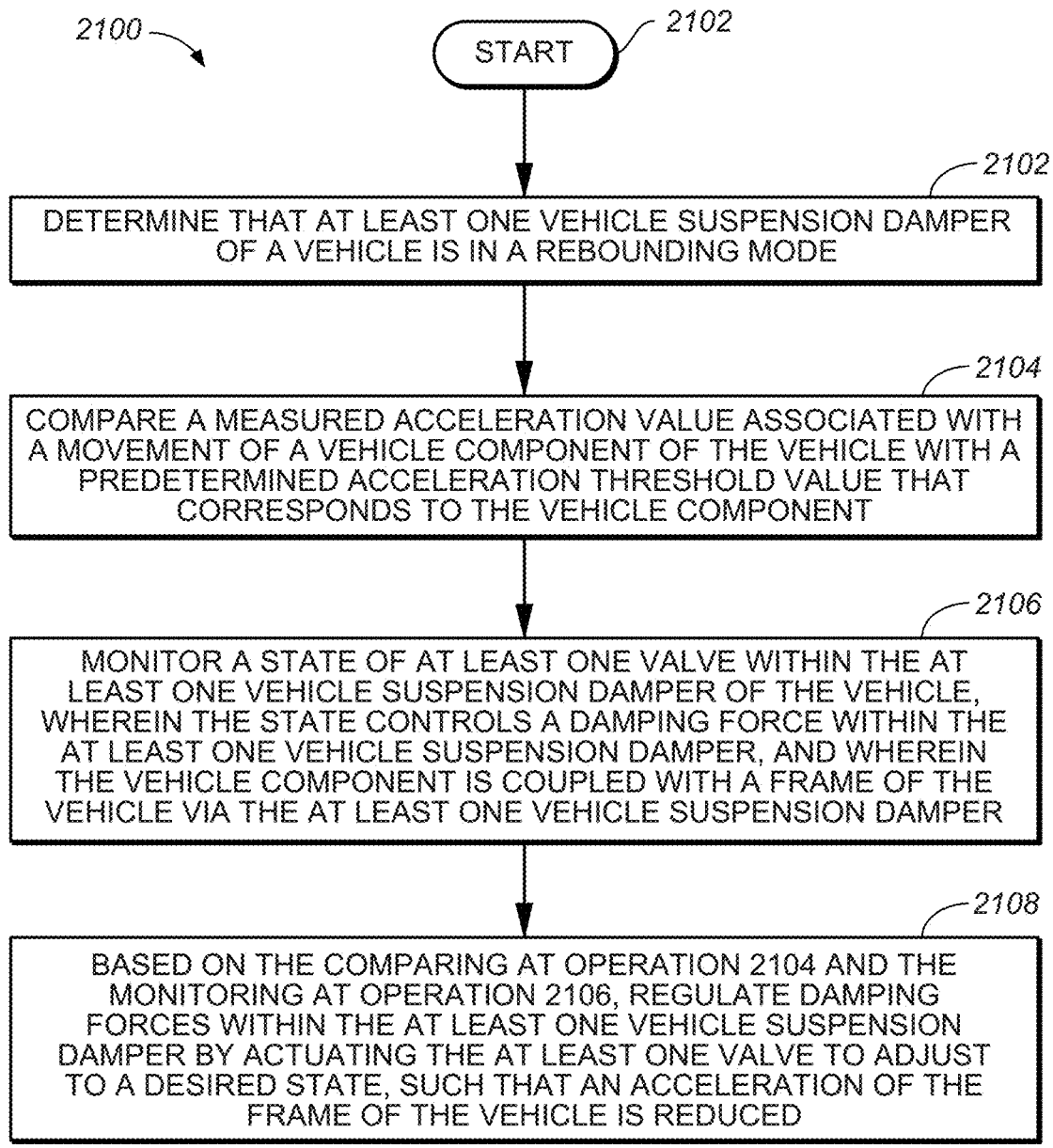
FIG. 21 is a flow diagram of a method 2100 for controlling vehicle motion, in accordance with various embodiments.

Following is a discussion of FIG. 21, a flow diagram for a method 2100 for controlling vehicle motion, in accordance with embodiments, and relating to rebound stroke detection events. FIG. 21 describes a method 2100 of detecting a rebound stroke and the response thereto, in accordance with embodiments. Reference will be made to elements of FIGS. 15 and 17 to facilitate the explanation of the operations of the method 2100 of the flow diagram. In some embodiments, the method 2100 of flow diagram describes a use of or instructions for operation of control system 1725.

With reference now to FIG. 21, at operation 2102, the method 2100 starts.

At operation 2102, in one embodiment, it is determined that at least one vehicle suspension damper of a vehicle is in a rebounding mode.

At operation 2104, in one embodiment and as described herein, a measured acceleration value associated with a movement of a vehicle component 1765 of the vehicle 1710 is compared with a predetermined acceleration threshold value that corresponds to the vehicle component 1765.

At operation 2106, in one embodiment and as described herein, a state of at least one valve within the at least one vehicle suspension damper 1705 of the vehicle 1710 is monitored, wherein the state controls a damping force within the at least one vehicle suspension damper 1705, and wherein the vehicle component is coupled with a frame of the vehicle via the at least one vehicle suspension damper 1705.

At operation 2108, in one embodiment and as described herein, based on the comparing at operation 2104 and the monitoring at operation 2106, damping forces within the at least one vehicle suspension damper 1705 are regulated by actuating the at least one valve (e.g., pilot valve assembly 1505) to adjust to a desired state, such that an acceleration of the frame of the vehicle 1710 is reduced.

Front and Rear Link Detection Event

In various embodiments, in systems that have both front and rear vehicle suspension dampers, the control system of the rear vehicle suspension damper is programmed to respond to detected terrain changes in either the front or the rear wheels, such as a bump, by causing the pilot valve assembly of the rear vehicle suspension damper to open. In contrast, the control system of the front vehicle suspension damper is programmed to only respond to terrain changes detected at the front wheel, by causing the pilot valve assembly of the front vehicle suspension damper to open.

An example follows in which a user will benefit from the front and rear link event discussed above. Suppose a bicyclist rides over a bump while riding into a corner. The bicycle front hits the bump. If, in response to hitting the bump, only the front suspension damper becomes soft as a result of the opening of the pilot valve assembly 1505, then the front end of the bicycle lowers and experiences a dive. When the rear end of the bicycle hits the bump, the rear end will be higher than the front end. Now, the bicyclist has ridden into a corner, the bicycle is leaning, and it has an awkward positioning that is uncomfortable for riding. Thus, in embodiments, the control system 1725 is preprogrammed to cause the back vehicle suspension damper to open upon the detection of a bump at the front or the rear of the vehicle. By linking the rear control system 1725 with the sensors on the front of the bicycle as well as the sensors on the rear of the bicycle, embodiments cause the rear vehicle suspension dampers to move into the soft mode upon the detection of a bump at the front and rear wheels.

Example Computer System Environment

Figure 22:
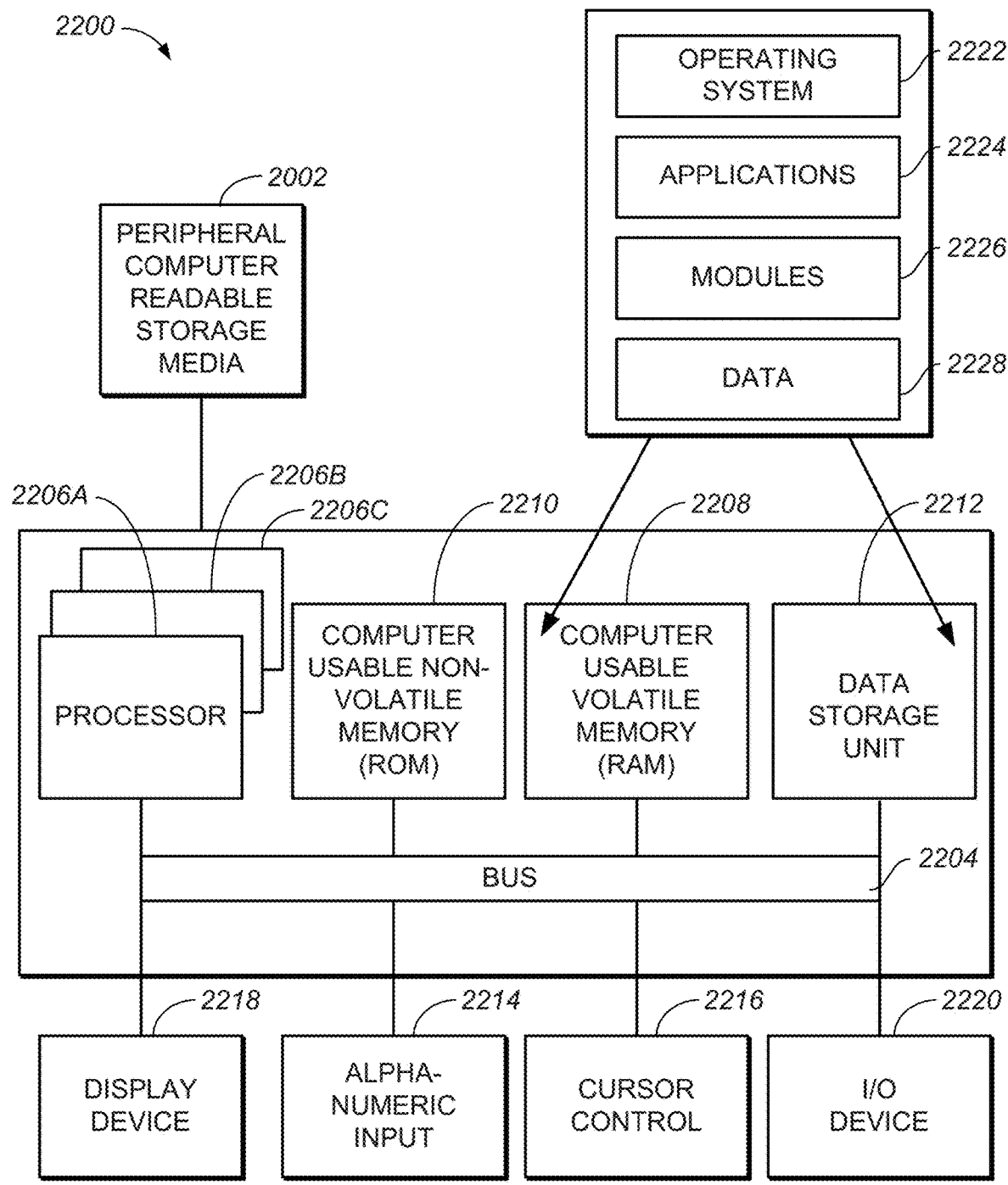
FIG. 22 is a block diagram of an example computer system with which or upon which various embodiments of the present invention may be implemented.

With reference now to FIG. 22, all or portions of some embodiments described herein are composed of computer-readable and computer-executable instructions that reside, for example, in computer-usable/computer-readable storage media of a computer system. That is, FIG. 22 illustrates one example of a type of computer (computer system 2200) that can be used in accordance with or to implement various embodiments which are discussed herein. It is appreciated that computer system 2200 of FIG. 22 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 2200 of FIG. 22 is well adapted to having peripheral non-transitory computer-readable storage media 2202 such as, for example, a floppy disk, a compact disc, digital versatile disc, other disc based storage, universal serial bus "thumb" drive, removable memory card, and the like coupled thereto.

System 2200 of FIG. 22 includes an address/data bus 2204 for communicating information, and a processor 2206A coupled with bus 2204 for processing information and instructions. As depicted in FIG. 22, system 2200 is also well suited to a multi-processor environment in which a plurality of processors 2206A, 2206B, and 2206B are present. Conversely, system 2200 is also well suited to having a single processor such as, for example, processor 2206A. Processors 2206A, 2206B, and 2206B may be any of various types of microprocessors. System 2200 also includes data storage features such as a computer usable volatile memory 2208, e.g., random access memory (RAM), coupled with bus 2204 for storing information and instructions for processors 2206A, 2206B, and 2206B.

System 2200 also includes computer usable non-volatile memory 2210, e.g., read only memory (ROM), coupled with bus 1004 for storing static information and instructions for processors 2206A, 2206B, and 2206B. Also present in system 2200 is a data storage unit 2212 (e.g., a magnetic or optical disk and disk drive) coupled with bus 2204 for storing information and instructions. System 2200 also includes an optional alphanumeric input device 2214 including alphanumeric and function keys coupled with bus 2204 for communicating information and command selections to processor 2206A or processors 2206A, 2206B, and 2206B. System 2200 also includes an optional cursor control device 2216 coupled with bus 2204 for communicating user input information and command selections to processor 2206A or processors 2206A, 2206B, and 2206B. In one embodiment, system 2200 also includes an optional display device 2218 coupled with bus 2204 for displaying information.

Referring still to FIG. 22, optional display device 2218 of FIG. 22 may be a liquid crystal device, cathode ray tube, plasma display device or other display device suitable for creating graphic images and alphanumeric characters recognizable to a user. Optional cursor control device 2216 allows the computer user to dynamically signal the movement of a visible symbol (cursor) on a display screen of display device 2218 and indicate user selections of selectable items displayed on display device 2218. Many implementations of cursor control device 2216 are known in the art including a trackball, mouse, touch pad, joystick or special keys on alphanumeric input device 2214 capable of signaling movement of a given direction or manner of displacement. Alternatively, it will be appreciated that a cursor can be directed and/or activated via input from alphanumeric input device 2214 using special keys and key sequence commands. System 2200 is also well suited to having a cursor directed by other means such as, for example, voice commands. System 2200 also includes an I/O device 2220 for coupling system 2200 with external entities. For example, in one embodiment, I/O device 2220 is a modem for enabling wired or wireless communications between system 2200 and an external network such as, but not limited to, the Internet.

Referring still to FIG. 22, various other components are depicted for system 2200. Specifically, when present, an operating system 2222, applications 2224, modules 2226, and data 2228 are shown as typically residing in one or some combination of computer usable volatile memory 2208 (e.g., RAM), computer usable non-volatile memory 2210 (e.g., ROM), and data storage unit 2212. In some embodiments, all or portions of various embodiments described herein are stored, for example, as an application 2224 and/or module 2226 in memory locations within RAM 2208, computer-readable storage media within data storage unit 2212, peripheral computer-readable storage media 2202, and/or other tangible computer-readable storage media.

Example System for Controlling Vehicle Motion of a Multi-Wheeled Vehicle (e.g., Truck, Car, Side-by-Side)

The system 2300 (of FIG. 23) for controlling vehicle motion is described in relation to controlling the motion of a multi-wheeled vehicle that has more than two wheels, such as, but not limited to, trucks, cars, and more specialized vehicles such as, but not limited to side-by-sides and snowmobiles, in accordance with embodiments. It should be appreciated that while the following discussion focuses on embodiments with four wheels, it should be appreciated that embodiments are not limited to operation upon vehicles with four wheels (e.g., three wheels, five wheels, six wheels, etc.). According to various embodiments, four-wheeled vehicles may have four vehicle suspension dampers attached therewith, one vehicle suspension damper attached to each wheel and to the vehicle's frame. Various embodiments provide a system and method for detecting rolls, pitches, and heave of four-wheeled vehicles. For example and with regard to detecting rolls, if a car turns a corner sharply left and begins to roll to the right, embodiments sense the velocity of the steering wheel as it is being turned, as well as the translational acceleration associated with the roll experienced by the vehicle. The translational acceleration (distance/time$^2$) associated with the roll measures side accelerations. In response to this sensing and in order to control the roll, a control system causes the outer right front and back vehicle suspension dampers to firm up, in some embodiments. Of note, in some embodiments, the vehicle's pitch is measured by sensing the velocity of the throttle pedal as it is being pressed and/or released. In other embodiments, the vehicle's pitch is measured by sensing the velocity and/or the position of the throttle pedal as it is being pressed and/or released. In yet other embodiments, the vehicle's pitch is measured by sensing the acceleration of the vehicle. Of further note, the control system does not utilize throttle pedal information to measure roll.

Figure 23:
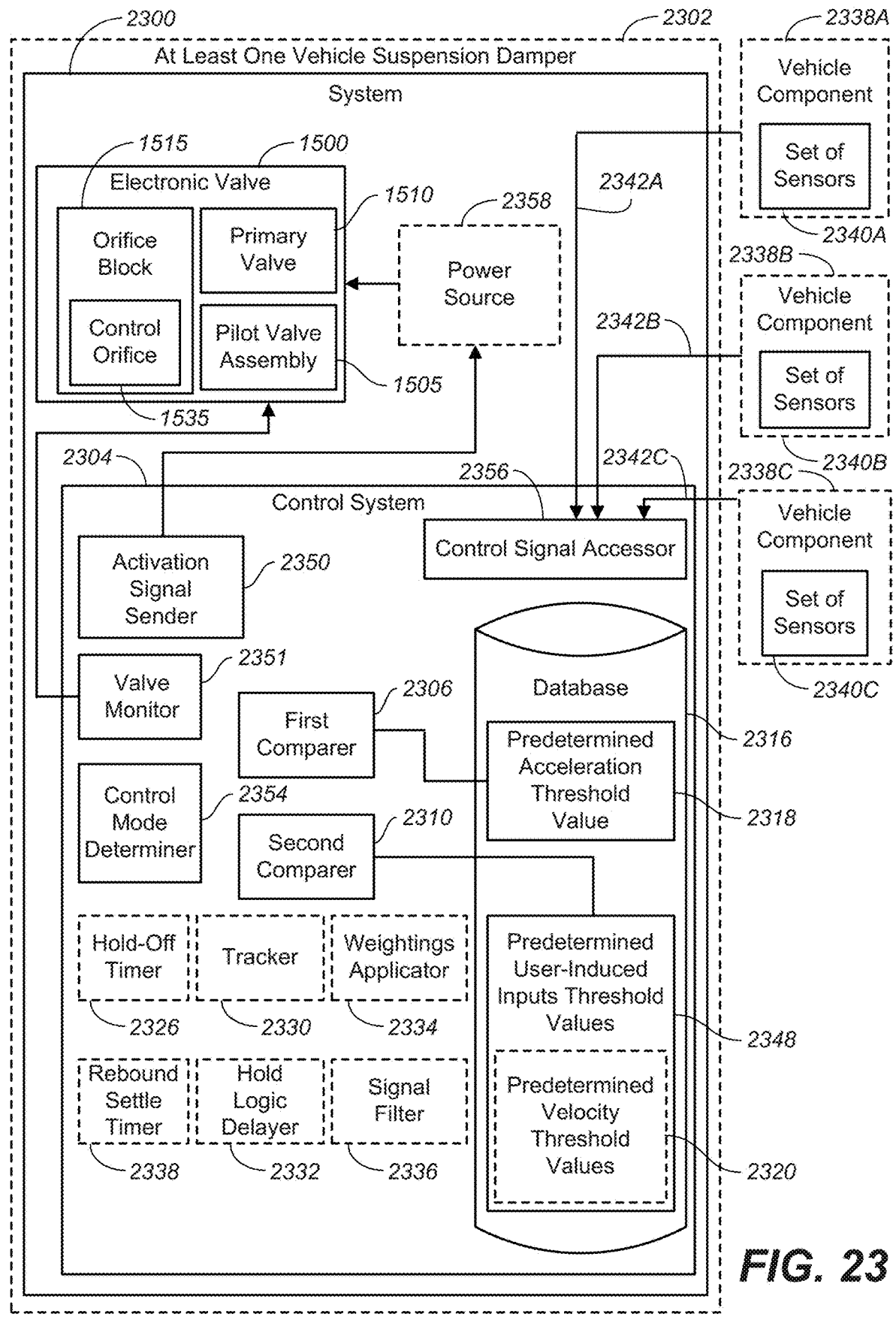
FIG. 23 block diagram of a system 2300 for controlling vehicle motion, in accordance with an embodiment.

FIG. 23 is a block diagram of a system 2300 for controlling vehicle motion, in accordance with an embodiment. The system 2300 includes the electronic valve 1500 (shown in FIG. 15) and the control system 2304. The control system 2304 includes the following components: a control signal accessor 2356; a first comparer 2306; a second comparer 2310; a valve monitor 2352; a control mode determiner 2354; and an activation signal sender 2350. Of note, the control signal accessor 2356, the first comparer 2306, and the valve monitor 2352 have similar features and functions as the control signal accessor 1730, the comparer 1740, the valve monitor 1745, and the activation signal sender 1750, respectively. Further, in various embodiments, the control system 2304 optionally includes: a database 2316, a hold-off timer 2326; a tracker 2330; a hold logic delayer 2332; a rebound settle timer 2328; a weightings applicator 2334; and a signal filter 2336. The database 2316, according to various embodiments, optionally includes predetermined acceleration threshold values 2318 and predetermined user-induced inputs threshold values 2348. In various embodiments, the predetermined user-induced inputs threshold values 2348 include predetermine velocity threshold values 2320.

In one embodiment, the control system 2304 may be part of the vehicle suspension damper 2302 (that is, for example, on a side-by-side), or it may be wire/wirelessly connected to the control system 2304. As will be discussed below, the control system 2304 of system 2300 is further configured for comparing a set of values associated with at least one user-induced input (such as a user turning a steering wheel and the velocity resulting therefrom) with at least one user-induced input threshold value.

In brief, and with reference to FIGS. 15 and 23, embodiments provide for a control system 2304 that accesses a set of control signals 2342 that includes both acceleration values and a set of values associated with user-induced inputs (such as velocity values [of a steering wheel being turned and/or a throttle pedal being pressed upon and/or released] measured by a set of gyrometers). It should be appreciated that the set of sensors 2340A, 2340B and 2340C (hereinafter, set of sensors 2340, unless specifically noted otherwise) attached to the vehicle component 2338A, 2338B and 2338C (hereinafter, vehicle component 2338, unless specifically noted otherwise), respectively, may include one or more sensors, such as, but not limited to, accelerometers and gyrometers. In some embodiments, the acceleration values with respect to the four-wheeled vehicles are lateral (side-to-side motion) and longitudinal g's (forward and backwards motion). In other embodiments, the acceleration values with respect to four-wheeled vehicles are lateral g's, longitudinal g's and vertical g's (up and down motion). In still other embodiments, the acceleration values for embodiments with respect to the two-wheeled vehicles measure vertical g's. User-induced inputs, according to embodiments, are those inputs by a user that cause a movement to a vehicle component of the vehicle. For example, user-induced inputs may include, but are not limited to any of the following: turning a steering wheel; pressing a brake pedal (the ON/OFF resultant position of the brake pedal being pressed is measured); and pressing a throttle pedal (a velocity and/or position of the throttle pedal is measured). Thus, a set of values associated with the user-induced inputs may any of the following: a measured velocity value of the turning of a steering wheel; a brake's on/off status; velocities associated with pressing down on the brake and/or the throttle pedal; and the difference in the positions of the throttle pedal before and after being pressed (or the absolute throttle position). Of note, the user-induced inputs that are measured are inputs received before acceleration is measured, yet relevant in quickly determining corrective damping forces required to control the roll, pitch and heave once experienced. Thus, the user-induced inputs are precursors to the sensed accelerations of various vehicle components (e.g., vehicle wheels).

Once these values (measured acceleration value and the set of values associated with the user-induced inputs) are accessed by the control signal accessor 2356, the first comparer 2306 and the second comparer 2310 compare these values to threshold values, such as those found in database 2316 (a store of information). Further, according to embodiments, the activation signal sender 2350 sends an activation signal to the power source 2358 to deliver a current to the electronic valve 1500, and more particularly, a valve (e.g., of the pilot valve assembly 1505), based upon the following: 1) the comparison made between the measured acceleration value and the predetermined acceleration threshold value 2318 discussed herein; 2) the comparison made between the measured velocity of the steering wheel as it is being turned (the set of values associated with user-induced inputs) and the predetermined velocity threshold value 2320 of the predetermined user-induced inputs threshold values 2348; and 3) the monitoring of the state of the electronic valve 1500.

It should be appreciated that embodiments may include, but are not limited to, other configurations having a control system in wire/wireless communication with the vehicle suspension damper to which it is controlling, such as: 1) a vehicle with only one control system that is wire and/or wirelessly connected to all vehicle suspension dampers attached thereto; 2) a vehicle with one control system attached to one vehicle suspension damper, wherein the one control system controls the other control systems attached to other vehicle suspension dampers (that are attached to different wheels) of the vehicle; and 3) a vehicle with one control system that is not attached to a vehicle suspension damper, wherein the one control system controls other control systems that are attached to vehicle suspension dampers on the vehicle.

In embodiments, the system has at least four user selectable modes: a soft mode; a firm mode; an auto mode; and a remote mode.

According to embodiments, in the soft mode, all the vehicle suspension dampers are soft for compression and rebound.

According to embodiments, in the firm mode, all rebound and/or compression are firm. The firmness of the rebound and/or compression is adjustable through system settings. In one embodiment, the adjustable system settings are factory set and are finite in number. In another embodiment, an infinite number of adjustable system settings are provided. In yet another embodiment, the user may customize and re-configure a finite number of system settings.

According to embodiments, in the auto mode, all vehicle suspension dampers are placed in the soft setting with the control system transiently setting various vehicle suspension dampers to be firm.

In the remote mode, a wireless browser interface enables the soft, firm and auto mode to be selected. In one embodiment, the control system 2304 monitors the position setting of a mechanical switch positioned on the vehicle, wherein the position setting may be set at one of the following modes: soft; firm; auto; and remote (i.e., at least partially wireless). Compression and rebounds are used to reduce the tilt of the vehicle frame. Particular advantages associated with using rebound adjustments are at least the following: a vehicle suspension damper in a hard rebound mode lowers the vehicle's center gravity; and the suspension is allowed to compress and absorb bumps while performing a controlled turn, thereby reducing the feeling of a harsh ride.

When the vehicle suspension damper is in the auto mode, the control system 2304 causes the damping force within the vehicle suspension dampers to be adjusted when the trigger logic described below is found to be accurate for the roll and pitch positive and negative modes. The desired state of the vehicle suspension damper that is achieved from this adjustment is considered to be a control mode. "Trigger Logic" is logic implemented by the control system 2304 that determines whether or not the vehicle suspension damper is allowed to pass into one of the control modes when the vehicle suspension damper is in an auto mode. Operational examples of trigger logic implemented by the control system 2304 are described below. "Hold Logic" is logic that is implemented by the control system 2304 that holds the system in a given control mode even after the possibly transient trigger logic has become false (becomes inaccurate). Operational examples of hold logic implemented by the control system will be described below.

Embodiments also provide various damper control settings available to be implemented for each control mode. A damper control setting is one in which the damping force within the vehicle suspension damper is adjusted for one or more of the vehicle suspension dampers attached to the vehicle.

In embodiments, the vehicle's roll and pitch are ultimately determined from measuring the vehicle's acceleration and measuring the vehicle component movement caused by user-induced inputs. In measuring the vehicle's roll and pitch, both have defined positive and negative directions. For example, the vehicle axis is defined as having an x-axis, a z-axis, and a y-axis. The x-axis is defined as being out the front of the vehicle. The z-axis is defined as being up. The y-axis is defined as following the right hand rule, which means the y-axis is out the left side of the vehicle.

Thus, a roll positive mode is defined as a positive rotation about the x-axis of the vehicle associated with a left turn. A roll negative mode is defined as a negative rotation about the x-axis of the vehicle associated with a right turn.

A pitch positive mode, occurring during a dive, is defined as a positive rotation about the y-axis of the vehicle associated with braking. A pitch negative mode, occurring during a squat, is defined as a negative rotation about the y-axis of the vehicle associated with throttling.

Below is a description of the control modes: 1) roll positive and roll negative control modes; 2) pitch positive control mode—dive; and 3) pitch negative control mode—squat. Further, the trigger and hold logic associated with each, the damper control setting options available for each, is also described in accordance with various embodiments:

It should be appreciated that information associated with the control modes, the trigger and hold logic associated with each control mode and the damper control setting options available for each control mode are stored, in one embodiment, in database 2316. The information is accessible by first comparer 2306, second comparer 2310 and control mode determiner 2322.

1) Roll Positive and Roll Negative Control
Modes—Trigger Logic, Hold Logic, and Damper
Control Settings Available Upon exceeding a threshold (defined by the trigger logic below) while the vehicle experiences a roll positive or a roll negative, the control system 2304 causes the pilot valve assembly 1505 to adjust to achieve a control state in which the roll positive and the roll negative are reduced or eliminated. Implementation options also available to achieve such a control state are listed below. With regard to the roll positive and roll negative controls that define circumstances when the roll positive and roll negative control modes are triggered or the control modes are held in place, the following definitions apply:

"ThreshSteerVelTrigger"—This is the threshold required for steering wheel velocity to trigger a roll control, subject to the side acceleration being above at least "threshSideAccelRollAllow". The main advantage of triggering a damping force change on steering wheel velocity over side acceleration is that the side acceleration signal lags that of the signal for the velocity value corresponding to the turning of the steering wheel. This threshold is adjustable and may be tuned for trigger and hold logic (tuned by the end user or hard coded).

"ThreshSideAccelRollAllow"—This is the threshold required for side acceleration to allow threshSteerVelTrigger to trigger roll control. The threshSideAccelRollAllow is nominally set less than zero given that it is used to ensure the steering wheel velocity signal is not inconsistent with the side acceleration signal which, for example, would be the case in a counter steer maneuver. Setting this threshold too high adversely affects the system response time by forcing it to wait for the side acceleration signal to build up. This threshold is adjustable and may be tuned for trigger and hold logic (tuned by the end user or hard coded).

"ThreshSideAccelRollTrigger"—This is the threshold required for side acceleration to trigger roll control, without the need for any other trigger. This allows the system to initiate roll control even if the steering wheel velocity signal does not. This is nominally set high on the order of 0.7 g or greater, values that are normally only reached in a sustained turn. This condition could be reached, for example, when coming out of a corner steer maneuver, or if the terrain were to help turn the vehicle sideways. This threshold is adjustable and may be tuned for trigger and hold logic (tuned by the end user or hard coded).

"ThreshSideAccelRollHold"—This threshold is required for side acceleration to keep the system in roll control after it's already triggered. The level of side acceleration required to stay in roll control should be lower than the value required to trigger it. This adds hysteresis to the system and reduces the tendency to bounce in and out of the control mode when the signals are near their thresholds. Nominally, this value is set between maybe 0.2-0.5 g's. This threshold is adjustable and may be tuned for trigger and hold logic (tuned by the end user or hard coded).

"ThreshSteerPosHold"—This threshold is required for the steering wheel angle to keep the system in roll control. This threshold is adjustable and may be tuned for trigger and hold logic (tuned by the end user or hard coded).

1) Roll Positive and Roll Negative Control Logic
  A. Roll Positive Control and Roll Negative Control Trigger Logic
   i. Roll Positive Control Trigger Logic:
    a. ((steer velocity>threshSteerVelTrigger) AND (side acceleration>threshSideAccelRollAllow)); OR
    b. (side acceleration>threshSideAccelRollTrigger).
   ii. Roll Negative Control Trigger Logic:
    a. ((steer velocity←threshSteerVelTrigger) AND (side acceleration←threshSideAccelRollAllow)); OR
    b. (side acceleration←threshSideAccelRollTrigger).
  B. Roll Positive Control and Roll Negative Control Hold Logic
   i. Roll Positive Control Hold Logic:
    a. (side acceleration>threshSideAccelRollHold); OR
    b. (steer position>threshSteerPosHold).

ii. Roll Negative Control Hold Logic:
   a. (side acceleration←threshSideAccelRollHold); OR
   b. (steer position←threshSteerPosHold).
C. Roll Positive Control and Roll Negative Damper Control Settings Available
   Option 1: Firm inside rebound front and back.
   Option 2: Firm outside compression front and back.
   Option 3: (1) Firm inside rebound front and back; and (2) Firm outside compression front and back.
   Option 4: (1) Firm inside rebound front and back; (2) Firm outside compression front and back; and (3) Firm outside rebound front and back.

In discussion of embodiments comparing the measured values to the threshold values, the following example is given with regard to trigger logic. A driver of a vehicle turns a steering wheel to the left. The vehicle then turns left. As a result of these actions, the steering wheel has a velocity value associated with it, and the vehicle has a side acceleration associated with it.

A control signal accessor 2356 of the vehicle accesses a set of control signals 2342 that includes the measured side acceleration value and the measured steering wheel velocity value. The first comparer 2306 compares the measured side acceleration value to the predetermined acceleration threshold values 2318 (stored at the database 2316). The first comparer 2306 determines if the measured acceleration value is more or less than the predetermined acceleration threshold value. The first comparer 2306 accesses the database 2316 to find trigger logic that matches the statement in which the comparison between the measured acceleration value and the predetermined acceleration threshold value holds true.

The trigger logic is linked to a particular control mode that is pre-assigned to that particular trigger logic. If the trigger logic describes the comparison between the measured values and the predetermined threshold values accurately, then the trigger logic is determined to be true. The control system 2304 will then actuate the valve within the electronic valve 1500 according to the control mode assigned to the trigger logic statement.

Continuing with the example above, the first comparer 2306 finds that the measured side acceleration value was greater than the predetermined side acceleration threshold value. The second comparer 2310 finds that the measured steering wheel velocity value is greater than the predetermined user-induced input threshold value.

As described herein, one set of trigger logic that is linked to the roll positive control, is as follows:
a. ((steer velocity>threshSteerVelTrigger) AND (side acceleration>threshSideAccelRollAllow)); OR
b. (side acceleration>threshSideAccelRollTrigger).

Accordingly, if either of the statements "a" or "b" above is found to be accurate, then the control mode determiner 2354 determines which control mode is linked to these logic statements. Once the control mode is determined, the control system 2304 actuates a valve (e.g., pilot valve assembly 1510) within the electronic valve 1500 to adjust the vehicle suspension damper. In this example, the first comparer 2306 found that the following statement is accurate: (side acceleration>threshSideAccelRollTrigger). The control mode determiner 2354 determines that the accurate statement is linked to the roll positive control. Knowing under what control mode the vehicle suspension damper should operate (e.g., roll positive control, roll negative control), the control system 2304 actuates the electronic valve 1500, and more particularly, the pilot valve assembly 1510 therein. Thus, in this embodiment, the control system 2304 is enabled to implement the roll positive control mode, according to at least the options discussed herein with regard to the roll positive control mode.

Further, in this situation, the second comparer 2310 finds that the steer velocity value is greater than the predetermined steer velocity threshold value (of the predetermined velocity threshold values 2320). Thus, the second comparer 2310 finds the following first portion of a statement to be accurate: ((steer velocity>threshSteerVelTrigger). The second portion of the statement, (side acceleration>threshSideAccelRollTrigger), has already been compared and determined to be accurate.

Thus, in one embodiment, the control mode determiner 2354 may determine a control mode for a vehicle suspension damper in which trigger logic that includes only acceleration comparisons are used. However, in another embodiment, the control mode determiner 2354 may determine a control mode for a vehicle suspension damper in which trigger logic includes both acceleration comparisons and user-induced inputs comparisons.

The control mode determiner 2356 operates in a similar manner in interpreting the trigger logic and hold logic linked to other control modes. Thus, in one embodiment, should the trigger logic (a.k.a. control logic) be determined to be accurate, the control mode determiner 2356 follows the link from the trigger logic to find the control mode setting.

In discussion of embodiments comparing the measured values to the threshold values, the following examples are given with regard to hold logic. There are at least several situations that occur in which the system is held in a given control mode even after the trigger logic has become false. Below, examples are given of a few of these cases. For the three example scenarios described below, the following threshold values are set in the control system: the steering velocity threshold ("threshSteerVelTrigger") value is 10 rad./sec.; the acceleration trigger threshold ("threshSideAccelRollTrigger") value is 0.7 g's; the acceleration hold threshold ("threshSideAccelRollHold") value is 0.2 g's; and the acceleration allow threshold ("threshSideAccelRollAllow") value is −0.1 g's.

With reference to FIG. 23, a first example scenario involves the triggering of an adjustment of the vehicle suspension dampers upon receiving a steering wheel velocity measurement, but the holding of the control mode as to the vehicle suspension damper upon receiving a particular side acceleration value. For example, a vehicle rider turns a steering wheel while the vehicle is directed into a turn. The set of sensors 2342 send a velocity signal to the control signal accessor 2356. The second comparer 2310 compares the measured velocity value of 15 rad/sec. to the predetermined velocity threshold values 2320 and to the trigger logic also stored at the database 2316 and determines that the measured velocity value of 15 rad/sec. is higher than the predetermined velocity threshold value of 10 rad/sec. The set of sensors 2342 also sends to the control signal accessor 2356 a side acceleration value of 0.4 g's. The first comparer 2306 compares the measured side acceleration value of 0.4 g's to the predetermined acceleration trigger threshold value of the predetermined acceleration threshold values 2318 and to the trigger logic also stored at the database 2316 and determines that the measured side acceleration value of 0.4 g's is lower than the predetermined acceleration trigger threshold value for side acceleration of 0.7 g's. Since at least one of the trigger logics, namely, the steering wheel velocity, is true, then the control system 2304 is triggered to cause the power source 2358 to be actuated such that the electronic valve 1500 receives a current. The current causes the electronic valve to close into the firm mode.

However, after a small amount of time (e.g., a fraction of a second) during the turn, since the steering wheel is no longer being moved into a sharper or less sharp turning position, the steering wheel velocity value lessens to a value close to zero. Thus, the trigger logic has become false, even though, the vehicle is still experiencing g's and is still turning. Without "hold logic" ("threshSideAccelRollHold" of 0.2 g's), the control system 2304 would be triggered to cause the vehicle suspension damper to return to the soft mode (by causing the electronic valve 1500 to open). In this example, the logic requires the side acceleration value to fall below 0.7 g's before the control system 2304 is possibly triggered to adjust the damping of the vehicle suspension damper. However, the side acceleration g's that the vehicle is experiencing remains close to 0.4 g's throughout the turn, which is greater than 0.2 g's (the acceleration hold threshold value), the control system 2304 does not cause the vehicle suspension damper to be adjusted throughout the turn. When the vehicle then begins moving in a straight path, the side acceleration values fall below 0.2 g's and thus below the "threshSideAccelRollHold" value, and the control system 2304 is triggered to cause the vehicle suspension damper to adjust to the soft mode.

With continued reference to FIG. 23, a second example scenario involves the triggering of an adjustment of the vehicle suspension dampers upon receiving a first side acceleration value, and the holding of the control mode as to the vehicle suspension damper upon receiving a second side acceleration value. For example, if a vehicle is traveling down a straight path that has various obstacles causing the vehicle to jump and dip, then the vehicle is caused to rattle back and forth (i.e., from side-to-side). If the side acceleration trigger threshold value was set at 0.2 g's and there was no hold logic, then due to the measured side acceleration from the side-to-side movement, the control system would be constantly triggered to cause the vehicle suspension damper to switch in and out of the hard mode, as if the vehicle were in fact repeatedly turning. Additionally, if "hold logic" was not available to be programmed, then one would either have to program the trigger logic to have low acceleration trigger threshold values of about 0.2 g's and suffer the system constantly falsely triggering on bumps (due to the side-to-side rocking movement) that it perceives as turns, or set the trigger logic to have high acceleration trigger threshold values of about 0.7 g's and suffer the system not staying in the hard mode through an entire turn.

However, since the side acceleration trigger threshold value is set at 0.7 g's, it is not until the vehicle actually moves into a turn that the vehicle experiences g's above 0.7 g's. If the vehicle's side acceleration value is measured at 0.8 g's, then the control system causes the vehicle suspension to adjust to be in the hard mode. The hold logic ensures that the vehicle suspension damper will remain in the hard mode until the side acceleration g's are measured below the acceleration hold threshold value of 0.2 g·s.

With continued reference to FIG. 23, a third example scenario involves counter steering. For instance, suppose that a driver turns a steering wheel to the left as he heads into a turn. The steering wheel velocity is measured at 25 rad/sec. and the side acceleration g's are measured at 0.6 g's. Since the steering wheel velocity measured at 25 rad/sec. and the side acceleration g's measured at 0.6 g's are above the steering wheel threshold velocity ("threshSteerVelTrigger") of 10 rad./sec. and the side allow acceleration threshold ("threshSideAccelRollAllow") value of −0.1 g's, respectively, the control system causes the vehicle suspension damper to adjust to the firm mode. Next, while the vehicle is still turning to the left and the vehicle is still experiencing a side acceleration of 0.6 g's, the vehicle driver turns the steering wheel to the right with a velocity of 20 rad./sec. in the right direction. However, even though the steering wheel is being turned to the right at the velocity of 20 rad./sec. and above the steering wheel velocity threshold value of 10 rad./sec., the vehicle is still turning to the left and still experiencing side acceleration g's consistent with turning to the left, namely, positive 0.6 g's. This type of steering wheel action is termed "counter steering". In this example, counter steering is counter to that which is expected, such as when a driver turns a steering wheel to the right, it is expected that the resulting side acceleration g's will be directed to the right (negative Y-axis). However, in counter steering, such as in the foregoing example, the resulting side acceleration g's are directed to the left (positive). In this example scenario, since the side acceleration allow threshold value is at −0.1 g's; the measured side acceleration for a right turn must be below−(−0.1) g's (which is equal to +0.1 g's) (according to the "Roll Negative Control Trigger Logic" described above) for the acceleration allow threshold to be accurate. However, since 0.6 is greater than +0.1 g's, the measured side acceleration as compared to the side acceleration allow threshold value denotes that the trigger allow logic is inaccurate. Therefore, even though the steering velocity value of 20 rad./sec. is measured to be above the steering velocity threshold value of 10 rad./sec., based on the determination of inaccurate trigger acceleration allow logic, the control system will cause the vehicle suspension damper to remain in its current firm mode (will not cause the vehicle suspension dampers to adjust to a soft mode). Of note, following is an example which further explains the relationship between the vehicle, the vehicle's driver, the turning of the vehicle and the experienced acceleration during such a vehicle turn. When a vehicle's driver turns the vehicle to the right, the driver feels as if he is being pushed out the left of the vehicle. However, the vehicle is really being pushed to the right and is pushing the driver to the right also; the driver's inertia is resisting this acceleration. Similarly, when a vehicle's driver applies the brakes to the vehicle, the driver feels as if he is being pushed forward.

Pitch Positive Control Mode

Upon exceeding a threshold (defined by the trigger logic below) while the vehicle is experiencing a pitch positive (e.g., dive), the control system 2304 causes the pilot valve assembly 1505 to adjust to achieve a control state in which the pitch positive is reduced or eliminated. Implementation options also available to achieve such a control state are listed below. With regard to the pitch positive controls that define circumstances when the pitch positive control modes are triggered or the control modes are held in place, the following definitions apply:

"ThreshForwardAccelBrakeAllow"—The forward acceleration is required to be below this threshold in order that the brake-on-signal is allowed to trigger the pitch positive control mode. Note that the forward acceleration is negative during braking. Therefore, this control signal is nominally set greater than zero; given that it is used to ensure that the brake signal is not inconsistent with the forward acceleration. This can be used to detect a driver just touching the brake, or possibly driving with the left foot is pressing on the brake while the right foot is pressing on the throttle pedal.

This threshold is adjustable and may be tuned for trigger and hold logic (tuned by the end user or hard coded).

"ThreshForwardAccelBrakeTrigger"—The forward acceleration is required to be below this threshold in order that the pitch positive control may be triggered, even without the brake being engaged. This allows the control system 2304 to initiate a pitch positive control mode even if the brake is not detected. This threshold is nominally set below 1 g, effectively negating it. This threshold is adjustable and may be tuned for trigger and hold logic (tuned by the end user or hard coded).

2) Pitch Positive Control Mode—Trigger Logic and Hold Logic
  A. Pitch Positive Control—Dive—Trigger Logic
    i. ((brake on) AND
      (forward acceleration<threshForwardAccelBrakeAllow)); OR
    ii. (forward acceleration<threshForwardAccelBrakeTrigger)
  B. Pitch Positive Control—Dive—Hold Logic
    i. Forward acceleration<threshForwardAccelBrakeHold.
  C. Pitch Positive Control Damper Control Settings Available
    Option 1: (1) Firm rear rebound left and right.
    Option 2: (1) Firm front compression left and right.
    Option 3: (1) Firm rear rebound left and right; and (2) Firm front compression left and right.
    Option 4: (1) Firm rear rebound left and right; (2) Soft front rebound left and right; and (3) Soft front compression left and right.

Pitch Negative Control Mode

Upon exceeding a threshold (defined by the trigger logic below) while the vehicle is experiencing a pitch negative (e.g., squat), the control system 2304 causes the pilot valve assembly 1505 to adjust to achieve a control state in which the pitch negative is reduced or eliminated. Implementation options also available to achieve such a control state are listed below. With regard to the pitch negative controls defining circumstances when the pitch negative control modes are triggered or the control modes are held in place, the following definitions apply:

"ThreshThrottle"—This is the threshold required for the derivative of the throttle position to be above in order to trigger the pitch negative control mode, subject to the forward acceleration being above threshForwardAccelThrottleAllow. Pressing down on the throttle and giving the engine more gas is defined as positive throttle. The main advantage of triggering on the time derivative of the throttle position as opposed to simply the forward acceleration is that the acceleration signal lags that of the throttle. The derivative of the throttle is used because, in general, the steady state position of the throttle is related to velocity and not to the acceleration of the vehicle. This threshold is adjustable and may be tuned for trigger and hold logic (tuned by the end user or hard coded).

"ThreshForwardAccelThrottleAllow"—This is the threshold required for forward acceleration to be above in order to allow the derivative of the throttle position signal to trigger pitch negative control. This is used to ensure that the derivative of the throttle position is not inconsistent with the forward acceleration. This can be used to detect when one is driving with the left foot on the brake and the right foot is on the throttle. This threshold value is nominally set below 0 g. This threshold is adjustable and may be tuned for trigger and hold logic (tuned by the end user or hard coded).

"ThreshForwardAccelThrottleTrigger"—This is the threshold required for forward acceleration to be above in order to trigger negative pitch control, even without the changes in the throttle position. This allows the system to initiate negative pitch control even if the throttle is not being pressed. This threshold value is nominally set above 1 g, effectively negating it. This threshold is adjustable and may be tuned for trigger and hold logic (tuned by the end user or hard coded).

"ThreshForwardAccelThrottleHold"—Forward acceleration is required to be above this threshold value in order for the negative pitch control mode to remain in place after it's trigger logic has already been triggered. This is necessary given that the derivative of the throttle is used, and there can be relatively long delays in engine response and this signal. This threshold is adjustable and may be tuned for trigger and hold logic (tuned by the end user or hard coded).

3) Pitch Negative Control Mode—Trigger Logic and Hold Logic
  A. Pitch Negative Control—Squat—Trigger Logic
    i. ((throttle pedal velocity>threshThrottle) AND
      (forward acceleration>threshForwardAccelThrottleAllow)); OR
    ii. (forward acceleration>threshForwardAccelThrottleTrigger)
  B. Pitch Negative Control—Squat—Hold Logic
    i. Forward acceleration>threshForwardAccelThrottleHold
  C. Pitch Negative Control Damper—Squat—Control Settings Available
    Option 1: (1) Firm front rebound left and right.
    Option 2: (1) Firm rear compression left and right.
    Option 3: (1) Firm front rebound left and right; and (2) Firm rear compression left and right.
    Option 4: (1) Firm front rebound left and right; (2) Soft rear rebound left and right; and (3) Soft rear compression left and right.

As stated herein, FIG. 23 is a block diagram of the control system 2304, in accordance with an embodiment. In addition to those components of the control system 1725 described with reference to FIG. 17, embodiments further include: a hold-off timer 2326; a tracker 2330; a hold logic delayer 2332; a rebound settle timer 2328; a weighting applicator 2334; and a signal filter 2336.

The hold-off timer 2326 may be used when the vehicle suspension damper 2302 is in any of the roll and pitch positive and negative control modes. The hold-off timer 2326 enables a time to be set between the time that a first trigger logic is passed and the time that a second trigger logic is allowed to be passed. The implementation of the hold-off timer 2326 limits the amount of cycling the vehicle suspension damper 2302 will experience between passive damper settings. ("Cycling" refers to the vehicle suspension damper rapidly cycling between the soft and damper firm settings of the dampers. This may or may not be a significant problem for the rider of vehicle performance. Cycling is more wearing on the solenoids and power circuitry of the vehicle suspension damper. If the transients are much faster than the time constants of the vehicle dynamics, then the rider should not directly notice the effects of cycling.) To this end, the control system 2304 further optionally includes, in one embodiment, a tracker 2330 for tracking the times at which a trigger logic is passed. For example, the tracker 2330 tracks the time at which the trigger logic is passed and the hold-off timer 2326 is configured to disallow another pass until a minimum hold-off time is reached. If the trigger logic goes false before the hold-off time is reached, the trigger will not pass, and the hold-off timer 2326 is not reset. There is only a hold-off timer 2326 for going into the damper firm setting, and not coming out of it. This still limits cycling, without increasing the system minimum reaction response time to short stimulus.

In one embodiment, the hold logic delayer 2332 is programmed to provide a delay that gives time for the hold logic to become true after the trigger logic goes true. However, this has the disadvantage of increasing the minimum reaction response time of the vehicle suspension damper to even short stimulus (e.g., cycling). An example of where this delay may be useful is if the steering wheel is turned so fast that the side acceleration signals do not build up before the steering velocity signal drops back off again. Theoretically, the side accelerations values should present themselves to the control system as the wheels turn, but this is not necessarily true. For example, there are situations in which the front tires are not getting great traction at an exact moment. Another example in which this delay may be useful is when the gas pedal is slammed down faster than the engine has time to respond.

In one embodiment, the rebound settle timer 2328 establishes a period of time for the vehicle suspension to settle down before the compression is set firmed. This is a method for controlling the height of the vehicle's center of gravity in firm mode. This method can be reversed through user settings so that the vehicle has increased clearance.

In one embodiment, the weightings applicator 2334 resolves the situation in which different system control modes make conflicting requests to the same vehicle suspension damper. The weightings applicator 2334 provides weightings associated with each control mode for each of the vehicle suspension dampers that system control mode can affect. Then the weightings applicator 2334 implements the request with the highest weighting.

In one embodiment, the signal filter 2336 filters the control signals that are accessed by the control system 2304. In one embodiment, the control system 2304 includes the signal filter 2336. In another embodiment, the signal filter 2336 is external to the control system 2304. The signal filter 2336 reduces signal noise levels and helps filter extremely transient signals or glitches. The signal filter 2336, in one embodiment, also adds signal latency, which can have various effects on the control system 2304 and hence the vehicle suspension damper 2302, including reducing the need for system delays and dampers.

Example Methods of Use For Multi-Wheeled Vehicles (e.g., Side-By-Side)

Figure 24:
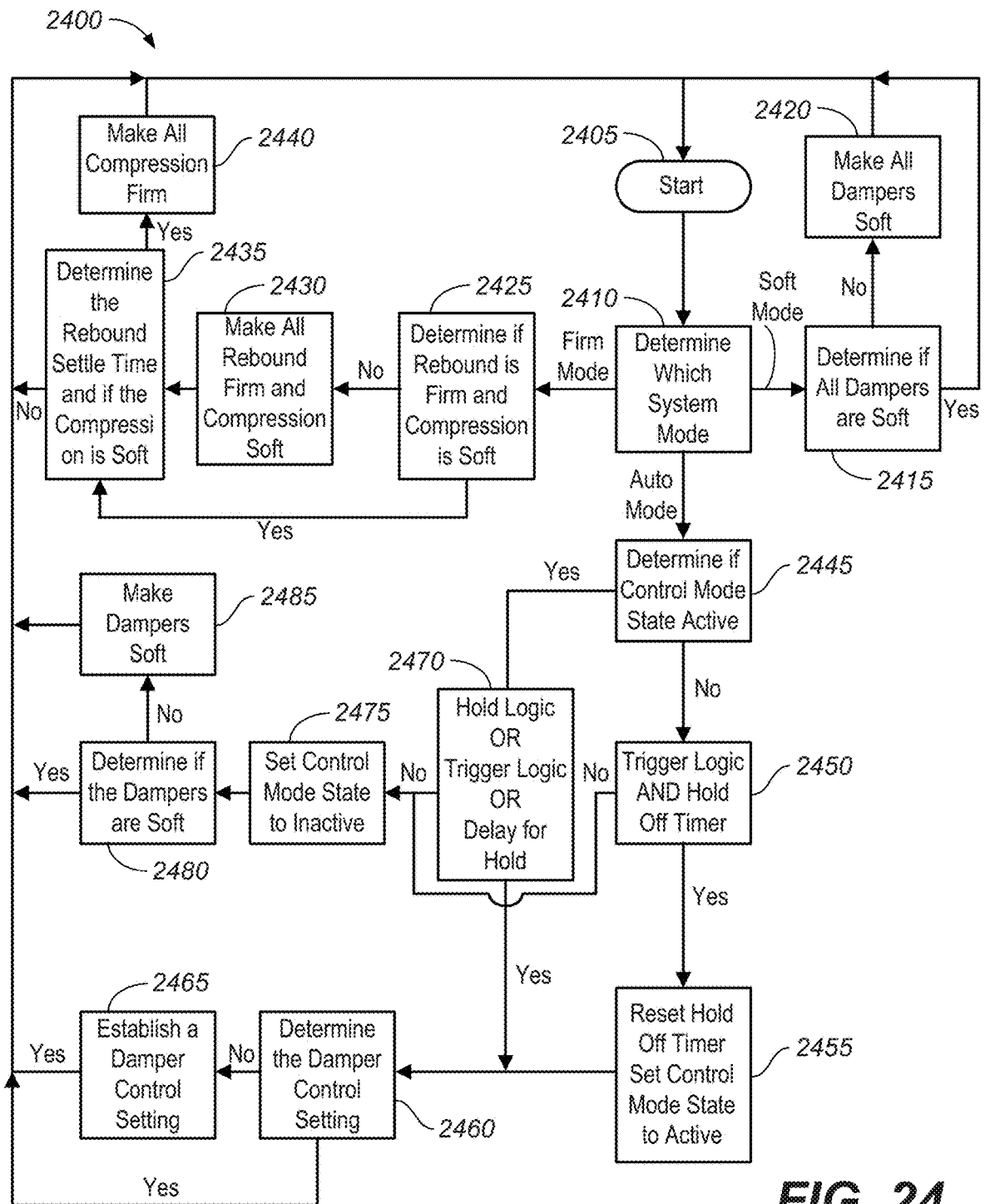
FIG. 24 is a flow diagram of a method 2400 for controlling vehicle motion, in accordance with an embodiment.
Figure 25A:
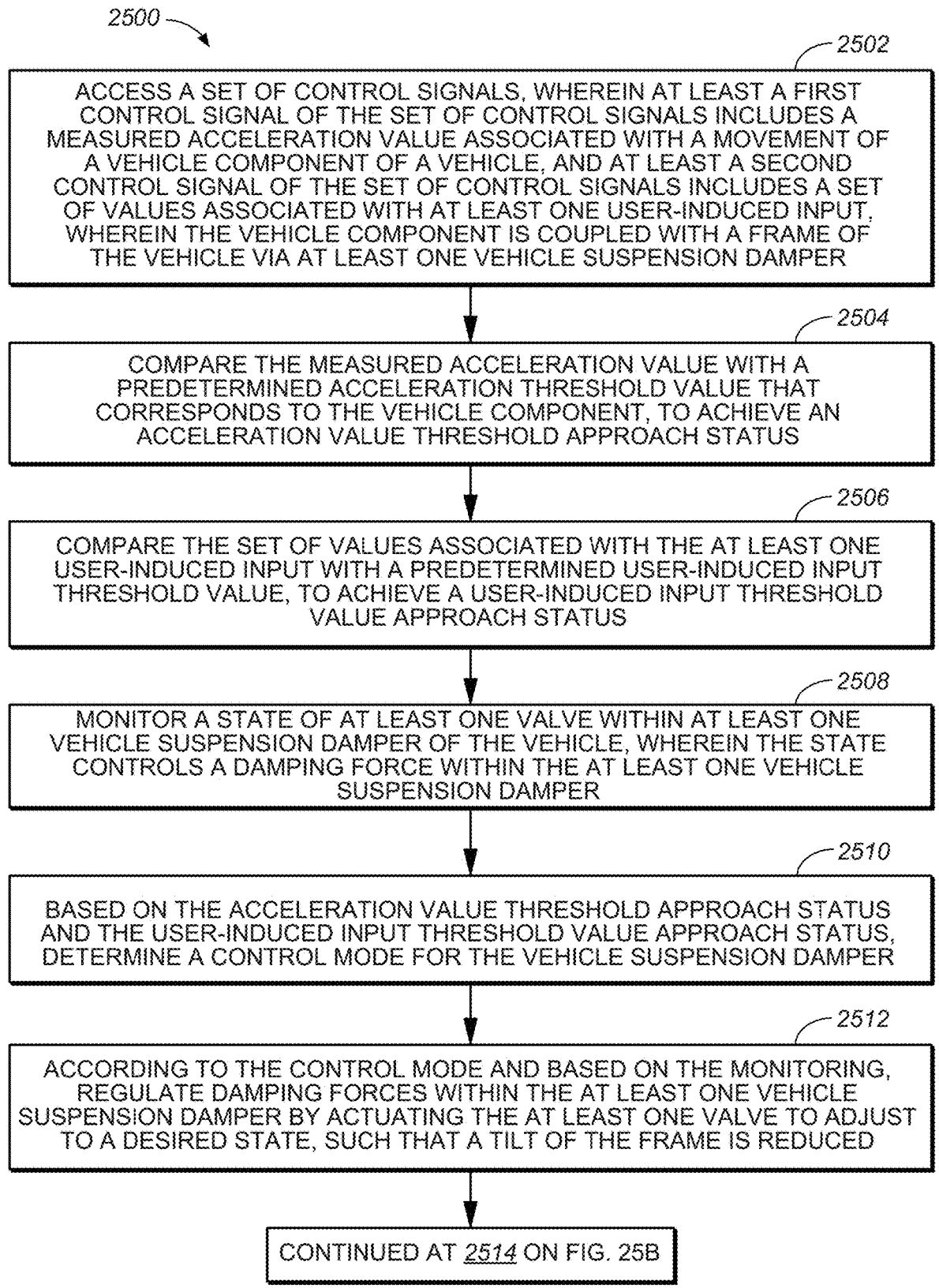
FIG. 25A, followed by FIG. 25B, is a flow diagram of a method 2500 for controlling vehicle motion, in accordance with embodiments.
Figure 25B:
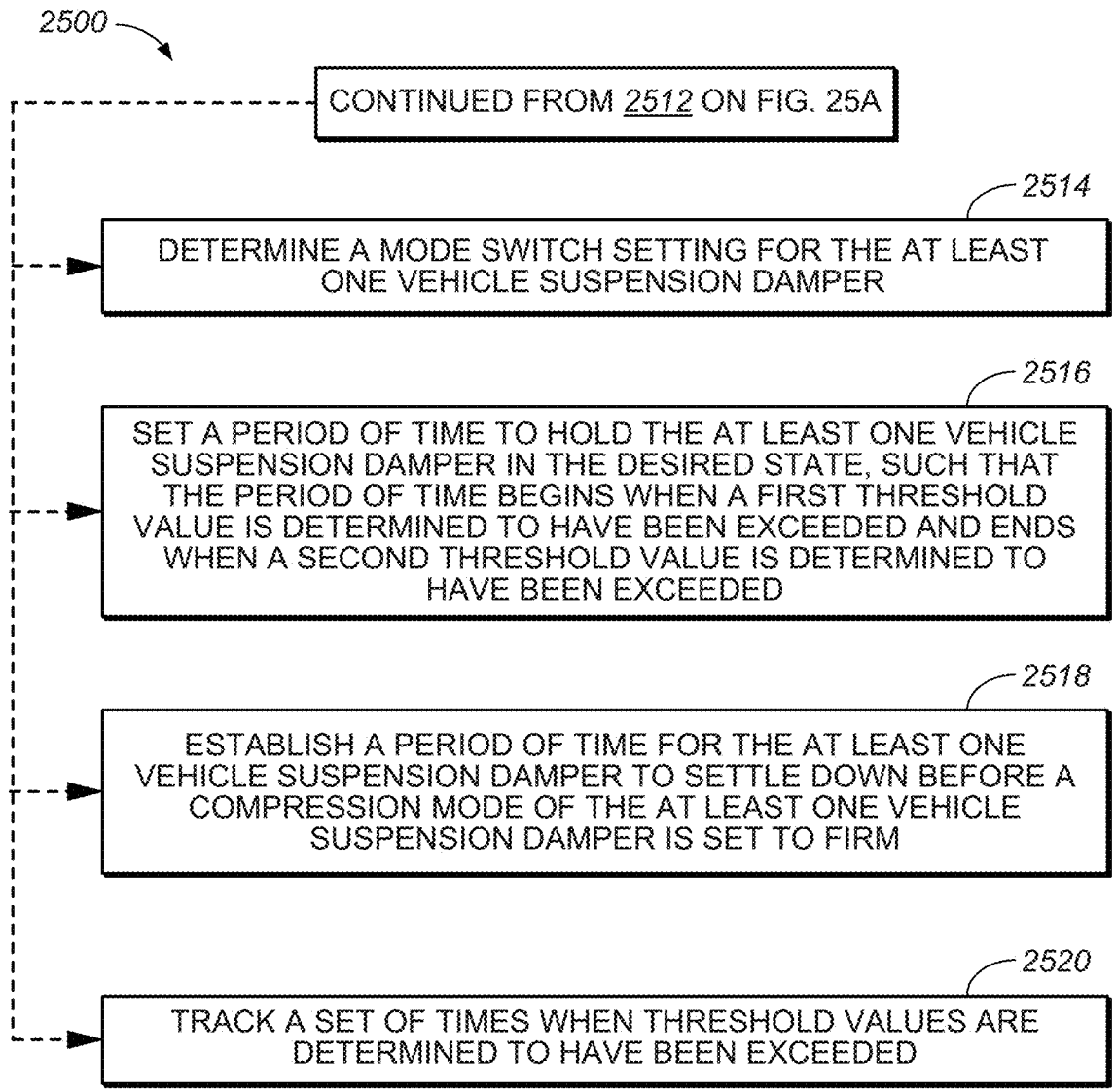

With reference to FIGS. 24, 25A and 25B, the flow diagrams thereof illustrate example methods 2400 and 2500 used by various embodiments. The flow diagrams include methods 2400 and 2500 and operations thereof that, in various embodiments, are carried out by one or more processors (e.g., processor(s) 2206 of FIG. 22) under the control of computer-readable and computer-executable instructions. It is appreciated that in some embodiments, the one or more processors may be in physically separate locations or electronic devices/computing systems. The computer-readable and computer-executable instructions reside, for example, in tangible data storage features such as volatile memory, non-volatile memory, and/or a data storage unit (see e.g., 2208, 2210, 2212 of FIG. 22). The computer-readable and computer-executable instructions can also reside on any tangible computer-readable media such as a hard disk drive, floppy disk, magnetic tape, Compact Disc, Digital versatile Disc, and the like. In some embodiments, the computer-readable storage media is non-transitory. The computer-readable and computer-executable instructions, which may reside on computer-readable storage media, are used to control or operate in conjunction with, for example, one or more components of a control system 2304, a user's electronic computing device or user interface thereof, and/or one or more of processors 2206. When executed by one or more computer systems or portion(s) thereof, such as a processor, the computer-readable instructions cause the computer system(s) to perform operations described by the methods 2400 and 2500 of the flow diagrams.

Although specific operations are disclosed in methods 2400 and 2500 of the flow diagrams, such operations are examples. That is, embodiments are well suited to performing various other operations or variations of the operations recited in the processes of flow diagrams. Likewise, in some embodiments, the operations of the methods 2400 and 2500 in the flow diagrams may be performed in an order different than presented, not all of the operations described in one or more of these flow diagrams may be performed, and/or more additional operations may be added.

The following discussion sets forth in detail the operation of some example methods 2400 and 2500 of operation of embodiments. With reference to FIGS. 24, 25A and 25B, flow diagrams illustrate example methods 2400 and 2500 used by various embodiments. The flow diagrams include some steps that, in various embodiments, are carried out by a processor under the control of computer-readable and computer-executable instructions. In this fashion, steps described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks", and optical disks, any or all of which may be employed with control system 2304. Although specific steps are disclosed in methods 2400 and 2500 on the flow diagrams (in FIGS. 24, 25A and 25B), such steps are examples. That is, embodiments are well suited to performing various other steps or variations of the steps recited in methods 2400 and 2500. Likewise, in some embodiments, the steps in methods 2400 and 2500 may be performed in an order different than presented and/or not all of the steps described in the methods 2400 and 2500 may be performed. It is further appreciated that steps described in the methods 2400 and 2500 may be implemented in hardware, or a combination of hardware with firmware and/or software

Example Methods for Controlling Vehicle Motion in Multi-Wheeled Vehicles (e.g., Side-by-Side)

Following is a discussion of FIGS. 24, 25A and 25B, flow diagrams for methods 2400 and 2500 for controlling vehicle motion, in accordance with embodiments, and relating to side-by-side roll and/or pitch control. FIG. 24 describes a method 2400 of an operation of control system 2304 detecting and responding to a detection of roll and/or pitch of a vehicle component. FIGS. 25A and 25B follow with a description of a method 2500 of controlling vehicle motion, wherein both translational acceleration (roll/pitch) and user-induced inputs are taken into consideration when determining a response to sensed acceleration. Reference will be made to elements of FIGS. 15 and 23 to facilitate the explanation of the operations of the methods of flow diagrams 2400 and 2500. In some embodiments, the methods 2400 and 2500 of the flow diagrams describe a use of or instructions for operation of control system 2304.

With reference still FIG. 24, the method 2100 starts at operation 2105. The method 2100 moves to operation 2110.

At operation 2410, in one embodiment, the control system 2304 determines under which system mode the vehicle suspension damper 2202 is operating, the soft mode, the firm mode or the auto mode. It should be appreciated that the system mode, in one embodiment, is selected by a user of the vehicle suspension damper 2202. In another embodiment, the system mode is preprogrammed to default to a particular mode, unless overridden by a user.

If the control system 2304 determines that the vehicle suspension damper 2202 is operating under the soft mode, then the method 2400 moves to operation 2415. At operation 2415, in one embodiment, the control system 2304 determines if all the vehicle suspension dampers on the vehicle are in the soft mode. If the control system 2304 determines that all of the vehicle suspension dampers are in the soft mode, then the method 2400 returns to start 2405. If the control system 2304 determines that all of the vehicle suspension dampers are not in the soft mode, then the method 2400 moves to operation 2420.

At operation 2420, in one embodiment, the control system 2304 causes any vehicle suspension damper that is not in the soft mode to adjust to become in the soft mode. After all vehicle suspension dampers are found to be in the soft mode according to the system setting, then the method 2400 returns to start 2405.

At operation 2410, in one embodiment, if the control system 2304 determines that the vehicle suspension damper 2402 is operating in the firm mode, then the method 2400 moves to operation 2425. At operation 2425, in one embodiment, the control system 2304 determines if the rebound is firm and the compression is soft. If the control system 2304 determines that the rebound of the vehicle suspension damper 2302 is firm and the compression of the vehicle suspension dampers is soft, then the method 2400 moves to operation 2435.

At operation 2425, in one embodiment, if the control system 2304 determines that the rebound of the vehicle suspension dampers is not firm OR the compression of the vehicle suspension dampers is not soft, then the method 2400 moves to operation 2430. At operation 2430, in one embodiment, the control system 2304 causes all rebound of the vehicle suspension dampers to become firm and all compression of the vehicle suspension dampers to become soft. The method 2400 then moves to operation 2435.

At operation 2435, in one embodiment, the control system 2304 determines if there is a rebound settle time remaining and if the compression of the vehicle suspension dampers is still soft. It the control system 2304 determines that there is rebound settle time remaining and the compression of the vehicle dampers is soft, then the method 2400 moves to operation 2440. At operation 2440, in one embodiment, the control system 2304 causes all of the compression in the vehicle suspension dampers to be firm. The method 2400 then returns to the start 2405.

At operation 2435, in one embodiment, if the control system 2304 determines that there is no rebound settle time remaining and the compression of the vehicle suspension dampers is soft, then the method 2400 moves to start 2405.

At operation 2410, in one embodiment, if the control system 2304 determines that the vehicle suspension damper 2302 is operating in the auto mode, then the method 2400 moves to operation 2445. At operation 2445, in one embodiment, the control system 2304 determines if the control mode state is active. If the control system 2304 determines that the control mode state is not active, then the method 2400 moves to operation 2450. At operation 2450, in one embodiment, the control system 2304 determines whether a trigger logic is passed AND if a time applied by a hold-off timer 2326 is in place. If the control system 2305 determines both conditions have occurred, then the method 2400 moves to operation 2455. At operation 2455, the control system 2304 resets the hold-off time and sets the control mode state to active.

At operation 2450, in one embodiment, if the control system 2304 determines that either a trigger logic has not passed OR a time has not been applied by the hold-off timer 2426, then the method 2400 moves to operation 2475. At operation 2475, in one embodiment, the control system 2304 sets the control mode state to inactive. The method 2400 then moves to operation 2480.

At operation 2445, in one embodiment, if the control system 2304 determines that the control mode state is active, then the method 2400 moves to operation 2470. At operation 2470, in one embodiment, the control system 2304 determines if the hold logic has passed OR if the trigger logic is passed OR if the delay for hold has passed.

At operation 2470, in one embodiment, if the control system 2304 determines that either a hold logic has passed OR a trigger logic has passed OR a delay for hold has passed, then the method 2400 moves to operation 2460. At operation 2460, in one embodiment, the control system 2304 determines under what damping control setting the vehicle suspension damper 2302 is operating.

At operation 2460, in one embodiment, if the control system 2304 determines that the vehicle suspension damper 2302 is operating under a particular damper control setting, then the method 2400 returns to the start 2405. At operation 2460, in one embodiment, if the control system 2304 determines that the vehicle suspension damper 2302 is operating under a different damper control setting then desired, the control system 2304 adjusts the vehicle suspension damper 2302 so that it operates under the desired damper control setting. The method 2400 then returns to start 2405.

At operation 2470, in one embodiment, if the control system 2304 determines that either a hold logic has not passed OR a trigger logic has not passed OR a delay for hold has not passed, then the method 2400 moves to operation 2475. At operation 2475, in one embodiment, the control system 2304 sets the control mode state to inactive. Then, the method 2400 moves to operation 2480. At operation 2480, in one embodiment, the control system 2304 determines if the vehicle suspension dampers are soft.

At operation 2480, in one embodiment, if the control system 2304 determines that the vehicle suspension dampers are soft, then the method 2400 returns to the start 2405. At operation 2480, in one embodiment, if the control system 2304 determines that the vehicle suspension dampers are not soft, then the method 2400 moves to operation 2485.

At operation 2485, in one embodiment, the control system 2304 functions, as described herein, to cause the vehicle suspension dampers to become soft. The method 2400 then returns to the start 2405.

Of note, the checks for whether or not a vehicle suspension damper is already set according to the method 2400 need to be done individually for each vehicle suspension damper.

FIGS. 25A and 25B is a flow diagram of a method 2500 for controlling vehicle motion, in accordance with embodiments.

With reference to FIGS. 23, 25A and 25B at operation 2502 of method 2500, in one embodiment, a set of control signals are accessed, wherein at least a first control signal of the set of control signals includes a measured acceleration value associated with a movement of a vehicle component of a vehicle, and at least a second control signal of the set of control signals comprises a set of values associated with user-induced inputs, wherein the vehicle component is coupled with a frame of the vehicle via at least one vehicle suspension damper.

At operation 2504 of method 2500, in one embodiment and as described herein, the measured acceleration value is compared with a predetermined acceleration threshold value that corresponds to the vehicle component to achieve an acceleration value threshold approach status. In various embodiments, the predetermined acceleration threshold values are located at the database 2316 and include the trigger logic, the hold logic, and the damper control setting options described herein. The control system 2304 compares the measured acceleration values with the acceleration threshold values expressed in the trigger logic and hold logic. The comparing, at step 2504, includes determining if the measured acceleration values do or do not exceed the predetermined acceleration threshold values corresponding to the relevant vehicle component. Further, the control system 2304 will pass into the appropriate control mode based on the comparisons made at step 2504 and 2506.

For example, and with reference to the trigger logic #1(A)(i) above relating to the "Roll Positive Control". If it is found that ((steer velocity>threshSteerVelTrigger) AND (side acceleration>threshSideAccelRollAllow)) is a true statement, OR (side acceleration>threshSideAccelRollTrigger) is a true statement, then the vehicle suspension damper, and the control system 2304 operating thereon, switches/passes into the roll positive control mode. Upon passing into the roll positive control mode, the control system 2304 selects which option to implement on the vehicle suspension dampers (e.g., setting individual dampers to firm or soft, etc.) of the options available and described herein for the Roll Positive Control Mode. It should be appreciated that the control system 2304 is preprogrammed to select a particular control mode implementation option. These implementation decisions may be factory settings or individually customized by the rider/user. Additionally, it should also be appreciated that in one embodiment, the rider may override the control system 2304's selection.

At operation 2506 of method 2500, in one embodiment and as described herein, the set of values associated with the user-induced inputs (already described herein) are compared to predetermined user-induced inputs threshold values to achieve a user-induced input threshold value approach status. In various embodiments, the predetermined user-induced inputs threshold values are located at the database 2316. Further, in various embodiments, the database 2316 includes at least one of, optionally the following which is described herein: the trigger logic; the hold logic; and the damper control setting options. The comparing, at step 2506 includes determining if the measured user-induced inputs (represented as values) does or does not exceed the user-induced inputs threshold values corresponding to the relevant vehicle component. Further, the control system 2304 will pass into the appropriate control mode based on the comparisons made at step 2504 and 2506.

At operation 2508 of method 2500, in one embodiment and as described herein, a state of at least one valve within at least one vehicle suspension damper of the vehicle is monitored, wherein the state controls a damping force within the at least one vehicle suspension damper.

At operation 2510 of method 2500, in one embodiment and as described herein, based on the acceleration value threshold approach status and the user-induced input threshold value approach status, determining a control mode for the vehicle suspension damper.

At operation 2512 of method 2500, in one embodiment and as described herein, according to the control mode and based on the monitoring, damping forces are regulated within the at least one vehicle suspension damper by actuating the at least one valve to adjust to a desired state, such that a tilt of the vehicle's frame is reduced.

At operation 2514 of method 2500, in one embodiment and as described herein, before the regulating at operation 2510, a mode switch setting for the at least one vehicle suspension damper is determined.

At operation 2516 of method 2500, in one embodiment and as described herein, a period of time to hold the at least one vehicle suspension damper in the desired state is set, such that the period of time begins when a first threshold value is determined to have been exceeded and ends when a second threshold value is determined to have been exceeded.

At operation 2518 of method 2500, in one embodiment and as described herein, a period of time for the at least one vehicle suspension damper to settle down before a compression mode of the at least one vehicle suspension damper is set to firm is established.

At operation 2520 of method 2500, in one embodiment and as described herein, a set of times when threshold values are determined to have been exceeded is tracked.

Blow-Off Valve Attached to Primary Valve of the Electronic Valve

Embodiments provide systems and method for better control of vehicle body motion during turns. For example, when the vehicle is moving straight, the vehicle suspension damper will generally be in a soft mode. However, when the driver of the vehicle turns the steering wheel in anticipation of turning a corner, embodiments sense the velocity of the turning steering wheel through a gyrometer, and sense the acceleration (roll) of the vehicle as per the turn. In response to receiving information regarding the steering wheel velocity and the translational acceleration of the vehicle, embodiments actuate the pilot valve assembly to acquire a closed position, such that the outside shocks of the vehicle may become firm.

During low speeds, when the vehicle rides over bumps while turning, firming up of the vehicle suspension dampers provides for better body control. However, during high speeds, the bumps during a turn come to feel very harsh and uncomfortable for the vehicle rider.

In one embodiment, during a turn event (e.g., bump detection during the turn), the vehicle suspension dampers are firmed up until a certain predetermined velocity is reached, such as, for example, 20 rad/sec. for the steering wheel). After the predetermined velocity threshold is exceeded, then the vehicle suspension damper reverts to a softer mode.

Figure 26:
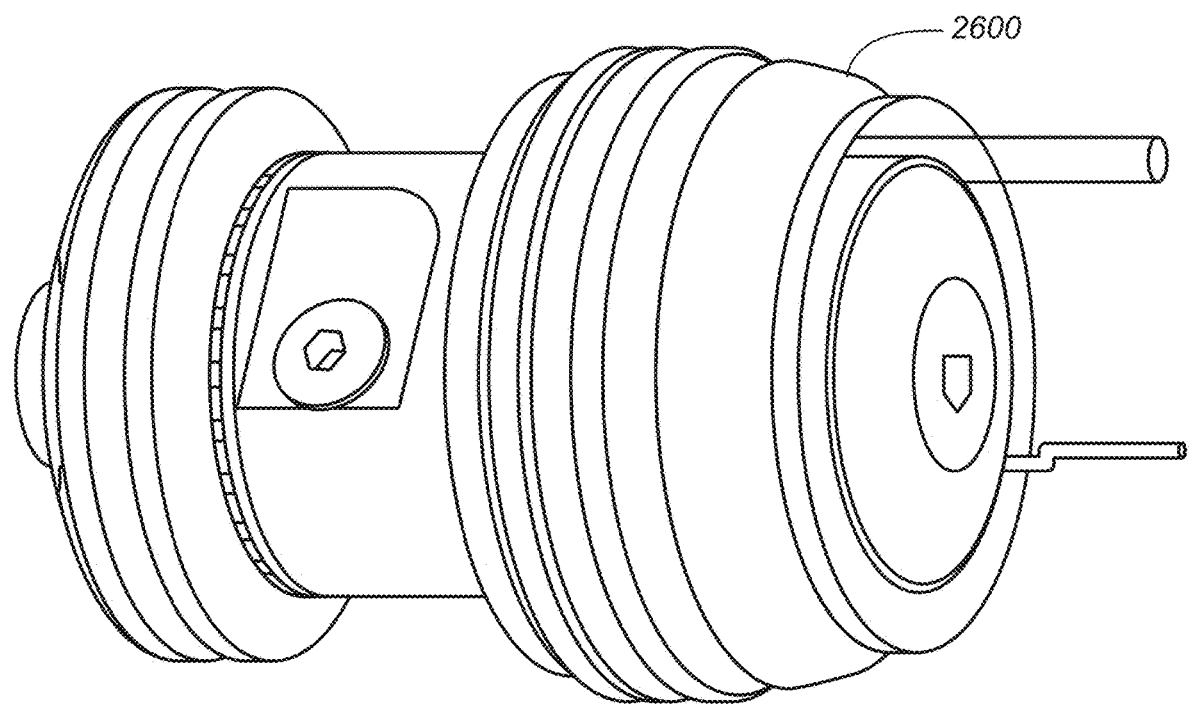
FIG. 26 is a flapper valve, in accordance with an embodiment.

In one embodiment, a pressure relief valve is disposed on the pilot valve assembly of the electronic valve. More particularly and with reference to FIGS. 15 and 26, in one embodiment, a flapper valve, like that shown in FIG. 26, is disposed onto the valve member 1540 of the electronic valve 1500. It should be appreciated that while a flapper valve is shown in FIG. 26, the pressure relief valve may be a valve other than a flapper valve.

In the case of an electronic valve 1500 not having a flapper valve, when the pilot pressure is removed from the primary valve 1505, the valve member 1540 applies less force on the valve shims 1530, thereby allowing the valve shims 1530 to open and release damping fluid into the reservoir 40.

Placing a blow-off valve onto the valve member 1540 enables the damping fluid to flow from the primary valve 1505, through the valve member 1540, and into the reservoir 40, thereby reducing the pressure in the primary valve 1505 area and reducing the force of the damping fluid against the inner surface area 1580 of the valve member, and thus reducing the force of the valve member 1540 against the shims 1530.

In one embodiment, upon a certain event being detected, such as a bump event (a bump of a certain magnitude), a current is delivered to the flapper valve, which actuates the opening of the flapper valve and releases a portion of the damping fluid there through. The damping fluid moves from the pilot pressure chamber 1520 to the reservoir 40.

In another embodiment, the blow-off valve is a passive valve and does not include components that communicate electronically with the control system 2304. Thus, pressure within the primary valve causes the blow-off valve to open, thereby releasing damping fluid into the reservoir 40 and providing a damping effect within the vehicle suspension damper.

Figure 27:
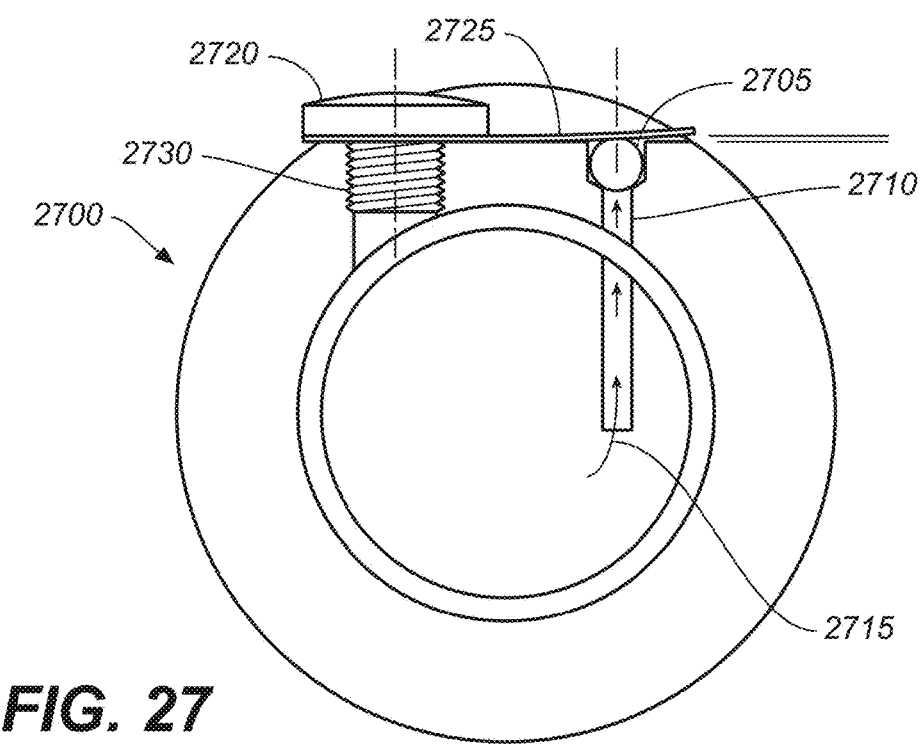
FIG. 27 is an illustration of a valve with a blow-off, in accordance with an embodiment.

FIG. 27 is an illustration of a blow-off valve 2700 enabled to be disposed onto the valve member 1540 of the electronic valve 1500, in accordance with embodiments. Shown in FIG. 27 is the steel ball 2705 blocking fluid flow 2715 from the pilot pressure chamber 1520, through the passageway 2710, and into the reservoir 40. The cap 2720 provides a preload to the piece 2725. A portion of the piece 2725 is trapped under the lid of the cap 2720. The more the cap 2720 is screwed or pushed down onto the threads 2730 of the blow-off valve 2700 (given the piece 2725 has a sufficiently rigid disposition), the greater resistance the piece 2725 provides against the steel ball 2705, thereby keeping the steel ball 2705 at the position on the top of the passageway 2710, thereby blocking the passageway 2710.

Thus, in one embodiment, a blow-off valve, such as the flapper valve 2600, is preloaded, enabling the piece 2725 to provide a certain predetermined amount of resistance to fluid flow 2715 through its passageway 2710. When the resistance threshold of the piece 2725 is exceeded, the steel ball 2705 is pushed away from its position blocking the passageway 2710, thereby providing an opening for damping fluid to flow there through. Thus, when the resistance threshold for the piece 2725 is exceeded, the flapper valve 2600 provides a blow off for the pressure build-up from the damping fluid being compressed within the pilot pressure chamber 1520. This blow-off operation causes the vehicle suspension damper to become more soft than the fully firm mode provided in turns during low vehicle speed.

Advantages to using the combination of the flapper vale with the electronic valve include conserving power by providing a mechanically operated blow-off during non-critical riding periods, but still enable the electronic valve to function as intended. Further, the flapper valve enables more sensitive adjustments to be made, and thus enabling a smoother ride, to the vehicle suspension dampers in response to bump detection events by allowing a smaller quantity of blow-off to occur than that which occurs during the opening and closing of the pilot valve assembly.

Thus, and with reference to FIGS. 15 and 27, on embodiment includes an electronic valve 1500 with a secondary valve (e.g., a flapper valve) attached thereto. The secondary valve is in fluid communication with the primary valve via the passageway 2710. The secondary valve includes a preloaded release valve (e.g., piece 2730) that can open upon the occurrence of a detection event (e.g., bump detection while detecting rolling). Upon opening, damping fluid flows there through, thus releasing the fluid pressure build up in the pilot pressure chamber 1520 when the pilot valve assembly 1510 is closed.

Of note, the following lists some examples of alternative embodiments that operate to provide damping functions; it should be appreciated that the list is not exhaustive. In one example, a range of damping force may be manually selected by a user by manually adjusting a needle and jet arrangement. In another example, if the valve assembly is located on the main piston (see 245 of FIG. 2), a position sensitive bottom-out needle arrangement may provide for a needle engaging a jet deep into the travel of the suspension, thereby influencing a damping. Another example includes a pneumatic source (e.g., air bag springs) on a semi-truck, in which the pneumatic source drives pressure in the pilot pressure chamber (see 1520 of FIG. 15). As the vehicle is loaded and thereby decreases the semi-truck's ride height, the air bag pressure is increased to enable the vehicle to return to the proper ride height. This increase in air pressure also corresponds to an appropriate increase in damping. Thus, in various embodiments: 1) if the set of sensors did not exist, or became inoperable for some reason, the components within embodiments are still enabled to provide damping functions; and/or 2) if the power source for some reason became unavailable, the components within embodiments are still enabled to provide damping functions. As described herein, various embodiments provide some damping function options in addition to the operation of the set of sensors in combination with the inertia valve. These options include the following: an electro-mechanical device (e.g., solenoid, latching solenoid, electric motor, piezoelectric actuator); a manually adjustable needle and jet arrangement; and a pressure signal from an outside pressure source (e.g., suspension air bag).

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. A non-transitory computer readable storage medium having stored thereon, computer-executable instructions that, when executed by a computer, cause said computer to perform a method for controlling vehicle motion, said method comprising:

accessing a set of control signals, wherein at least a first control signal of said set of control signals comprises a measured acceleration value associated with a movement of a vehicle component of a vehicle, and at least a second control signal of said set of control signals comprises a set of values associated with at least one user-induced input, wherein said vehicle component is coupled with a frame of said vehicle via at least one vehicle suspension damper;

comparing said measured acceleration value with a predetermined acceleration threshold value that corresponds to said vehicle component, to achieve an acceleration value threshold approach status;

comparing said set of values associated with said at least one user-induced input with a predetermined user-induced input threshold value, to achieve a user-induced input threshold value approach status;

monitoring a state of at least one valve within said at least one vehicle suspension damper, wherein said state controls a damping force within said at least one vehicle suspension damper;

based on at least one of said acceleration value threshold approach status and said user-induced input threshold value approach status, determining a control mode for said at least one vehicle suspension damper; and according to said control mode and based on said monitoring, regulating damping forces within said at least one vehicle suspension damper by actuating said at least one valve to adjust to a desired state, such that a tilt of said frame is reduced.

2. The non-transitory computer readable storage medium of claim 1 wherein the method further comprises the step of:
comparing said acceleration value threshold approach status and said user-induced input threshold value approach status; and
wherein said determining said control mode is further based on said comparing said acceleration value threshold approach status and said user-induced input threshold value approach status.

3. The non-transitory computer readable storage medium of claim 1 wherein the method further comprises the step of:
before said regulating, determining a mode switch setting for said at least one vehicle suspension damper.

4. The non-transitory computer readable storage medium of claim 1 wherein the method further comprises the step of:
setting a period of time to hold said at least one vehicle suspension damper in said desired state, such that said period of time begins when a first threshold value is determined to have been exceeded and ends when a second threshold value is determined to have been exceeded.

5. The non-transitory computer readable storage medium of claim 1 wherein the method further comprises the step of:
establishing a period of time for said at least one vehicle suspension damper to settle down before a compression mode of said at least one vehicle suspension damper is set to firm.

6. The non-transitory computer readable storage medium of claim 1 wherein the method further comprises the step of:
tracking a set of times when threshold values are determined to have been exceeded.

7. A system for controlling vehicle motion, said system comprising:
an electronic valve of at least one vehicle suspension damper attached to a vehicle, said electronic valve configured for adjusting a damping force therein; and
a control system coupled to said electronic valve, said control system comprising:
in use at least a first control signal of a set of control signals, which at least first control signal comprises a measured acceleration value associated with a movement of a vehicle component of said vehicle, and at least a second control signal of said set of control signals comprises a set of values associated with at least one user-induced input, wherein said vehicle component is coupled with a frame of said vehicle via said at least one vehicle suspension damper;
a first comparer configured for comparing said measured acceleration value with a predetermined acceleration threshold value that corresponds to said vehicle component, to achieve an acceleration value threshold approach status;
a second comparer configured for comparing said set of values associated with said at least one user-induced input to a predetermined user-induced input threshold value, to achieve a user-induced input threshold value approach status;
a valve monitor configured for monitoring a state of said electronic valve, wherein said state controls a damping force within said at least one vehicle suspension damper;
a control mode determiner configured for, based on said at least one of said acceleration value threshold approach status and said user-induced input threshold value approach status, determining a control mode for said vehicle suspension damper; and
an activation signal sender configured for, according to said control mode and based on said monitoring, regulating damping forces within said at least one vehicle suspension damper by actuating said electronic valve to adjust to a desired state, such that a tilt of said frame is reduced.

8. The system of claim 7, wherein the control system further comprises:
a hold-off timer configured for setting a period of time to hold said at least one vehicle suspension damper in said desired state, such that said period of time begins when a first threshold value is determined to have been exceeded and ends when a second threshold value is determined to have been exceeded.

9. The system of claim 7, wherein the control system further comprises:
a rebound settle timer configured for establishing a period of time for said at least one vehicle suspension damper to settle down before a compression mode is set to firm.

10. The system of claim 7, wherein the control system further comprises:
a tracker configured for tracking a set of times when threshold values are determined to have been exceeded.

11. The system of claim 7, wherein the control system further comprises:
a hold logic delayer configured for providing a delay that gives time for a hold logic to become true after a trigger logic becomes true, wherein said first comparer and said second comparer analyze said trigger logic in determining if threshold values are exceeded.

12. The system of claim 7, wherein the control system further comprises:
a weightings applicator configured for resolving a conflicting request made from different system control modes to said at least one vehicle suspension damper.

13. The system of claim 7, wherein the control system further comprises:
a signal filter configured for filtering said set of control signals to reduce signal noise levels.

* * * * *